United States Patent
Dellinger et al.

(10) Patent No.: US 11,019,193 B2
(45) Date of Patent: May 25, 2021

(54) DEVICE, METHOD, AND GRAPHICAL USER INTERFACE FOR ESTABLISHING A RELATIONSHIP AND CONNECTION BETWEEN TWO DEVICES

(71) Applicant: Apple Inc., Cupertino, CA (US)

(72) Inventors: Richard R. Dellinger, San Jose, CA (US); Andre M. J. Boule, San Jose, CA (US); Patrick L. Coffman, San Francisco, CA (US); Donald W. Pitschel, San Francisco, CA (US); Emily Clark Schubert, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/407,590

(22) Filed: May 9, 2019

(65) Prior Publication Data

US 2019/0334782 A1    Oct. 31, 2019

Related U.S. Application Data

(63) Continuation of application No. 14/863,069, filed on Sep. 23, 2015.
(Continued)

(51) Int. Cl.
*H04L 12/24* (2006.01)
*H04M 1/72409* (2021.01)
(Continued)

(52) U.S. Cl.
CPC ........ *H04M 1/72409* (2021.01); *H04L 41/12* (2013.01); *H04L 41/22* (2013.01);
(Continued)

(58) Field of Classification Search
CPC ............ H04L 41/12; H04L 41/22; H04W 4/80
See application file for complete search history.

(56) References Cited

U.S. PATENT DOCUMENTS

| 5,815,657 | A | 9/1998 | Williams et al. |
| 5,864,337 | A | 1/1999 | Marvin |

(Continued)

FOREIGN PATENT DOCUMENTS

| AU | 2016100796 A4 | 6/2016 |
| CN | 1443427 A | 9/2003 |

(Continued)

OTHER PUBLICATIONS

Advisory Action received for U.S. Appl. No. 14/863,099, dated Sep. 8, 2016, 3 pages.

(Continued)

*Primary Examiner* — Jeong S Park
(74) *Attorney, Agent, or Firm* — Dentons US LLP

(57) ABSTRACT

A device receives an instruction to authorize a relationship corresponding to communication over a first data connection with a peripheral display unit, and receives authentication data from the peripheral display unit over another data connection. The device then establishes a connection with the peripheral display unit over the first data connection, including providing the authentication information to the peripheral display unit. The device monitors a battery charge level and battery-usage patterns and provides alerts in accordance therewith. The device displays a reconfiguration interface for configuring the user interfaces of one or more peripheral display units, and detects a request to configure an interface of a peripheral. In response to detecting the request, the device displays an updated representation of the (Continued)

peripheral interface, and afterwards transmits instructions to the peripheral to display the user interface in accordance with the request.

39 Claims, 51 Drawing Sheets

Related U.S. Application Data

(60) Provisional application No. 62/111,100, filed on Feb. 2, 2015.

(51) Int. Cl.
*H04W 4/80* (2018.01)
*H04M 1/72412* (2021.01)
*H04W 12/06* (2021.01)

(52) U.S. Cl.
CPC ......... *H04M 1/72412* (2021.01); *H04W 4/80* (2018.02); *H04W 12/06* (2013.01); *Y02D 10/00* (2018.01)

(56) References Cited

U.S. PATENT DOCUMENTS

| | | | |
|---|---|---|---|
| 6,097,371 A | 8/2000 | Siddiqui et al. | |
| 6,416,471 B1 | 7/2002 | Kumar et al. | |
| 6,662,023 B1 | 12/2003 | Helle | |
| 6,847,387 B2 | 1/2005 | Roth | |
| 6,912,694 B1 | 6/2005 | Harrison et al. | |
| 7,302,650 B1 | 11/2007 | Allyn et al. | |
| 7,305,350 B1 | 12/2007 | Bruecken | |
| 7,406,666 B2 | 7/2008 | Davis et al. | |
| 7,773,460 B2 | 8/2010 | Holt | |
| 7,970,827 B1 | 6/2011 | Cumberbatch et al. | |
| 8,105,208 B2 | 1/2012 | Oleson et al. | |
| 8,121,945 B2 | 2/2012 | Rackle et al. | |
| 8,453,940 B2 | 6/2013 | Diamond | |
| 8,462,997 B2 | 6/2013 | Pettit et al. | |
| 8,467,770 B1 | 6/2013 | Ben Ayed | |
| 8,543,081 B2 | 9/2013 | Scott et al. | |
| 8,554,694 B1 | 10/2013 | Ward et al. | |
| 8,566,403 B2 | 10/2013 | Pascal et al. | |
| 8,595,798 B2 | 11/2013 | Anand et al. | |
| 8,624,836 B1 | 1/2014 | Miller et al. | |
| 8,666,361 B2 | 3/2014 | Chu et al. | |
| 8,700,158 B2 | 4/2014 | Mass et al. | |
| 8,706,628 B2 | 4/2014 | Phillips | |
| 8,825,445 B2 | 9/2014 | Hoffman et al. | |
| 8,931,703 B1 | 1/2015 | Mullen et al. | |
| 8,948,819 B2 | 2/2015 | Yun et al. | |
| 9,152,312 B1 | 10/2015 | Terleski et al. | |
| 9,338,242 B1 | 5/2016 | Suchland et al. | |
| 9,389,090 B1 | 7/2016 | Levine et al. | |
| 9,600,178 B2 | 3/2017 | Yun et al. | |
| 9,904,906 B2 | 2/2018 | Kim et al. | |
| 10,019,136 B1 | 7/2018 | Ozog | |
| 10,051,103 B1 | 8/2018 | Gordon et al. | |
| 10,251,034 B2 | 4/2019 | Langlois et al. | |
| 10,282,451 B1 | 5/2019 | Ho et al. | |
| 10,425,284 B2 * | 9/2019 | Dellinger ................ H04L 41/22 | |
| 2001/0031622 A1 | 10/2001 | Kivela et al. | |
| 2002/0029169 A1 | 3/2002 | Oki et al. | |
| 2002/0068600 A1 | 6/2002 | Chihara et al. | |
| 2002/0142734 A1 | 10/2002 | Wickstead | |
| 2003/0001898 A1 | 1/2003 | Bernhardson | |
| 2003/0002391 A1 | 1/2003 | Biggs | |
| 2003/0169302 A1 | 9/2003 | Davidsson et al. | |
| 2003/0182628 A1 | 9/2003 | Lira | |
| 2004/0077462 A1 | 4/2004 | Brown et al. | |
| 2004/0168107 A1 | 8/2004 | Sharp et al. | |
| 2004/0218472 A1 | 11/2004 | Narayanaswami et al. | |
| 2004/0225966 A1 | 11/2004 | Besharat et al. | |
| 2004/0246607 A1 | 12/2004 | Watson et al. | |
| 2005/0156873 A1 | 7/2005 | Walter et al. | |
| 2005/0197063 A1 | 9/2005 | White | |
| 2005/0202846 A1 | 9/2005 | Glass et al. | |
| 2006/0000900 A1 | 1/2006 | Fernandes et al. | |
| 2006/0010098 A1 | 1/2006 | Goodnow et al. | |
| 2006/0025923 A1 | 2/2006 | Dotan et al. | |
| 2006/0122748 A1 | 6/2006 | Nou | |
| 2006/0123353 A1 | 6/2006 | Matthews et al. | |
| 2006/0155578 A1 | 7/2006 | Eisenberger et al. | |
| 2006/0173749 A1 | 8/2006 | Ward et al. | |
| 2006/0217104 A1 | 9/2006 | Cho | |
| 2006/0271605 A1 * | 11/2006 | Petruzzo ................ G06F 16/178 | |
| 2007/0067733 A1 | 3/2007 | Moore et al. | |
| 2007/0096765 A1 | 5/2007 | Kagan | |
| 2007/0101279 A1 | 5/2007 | Chaudhri et al. | |
| 2007/0135043 A1 | 6/2007 | Hayes et al. | |
| 2007/0194110 A1 | 8/2007 | Esplin et al. | |
| 2007/0194113 A1 | 8/2007 | Esplin et al. | |
| 2007/0254712 A1 | 11/2007 | Chitti | |
| 2007/0261537 A1 | 11/2007 | Eronen et al. | |
| 2007/0271340 A1 | 11/2007 | Goodman et al. | |
| 2008/0016443 A1 | 1/2008 | Hiroshima et al. | |
| 2008/0040265 A1 | 2/2008 | Rackley, III et al. | |
| 2008/0076637 A1 | 3/2008 | Gilley et al. | |
| 2008/0077936 A1 | 3/2008 | Goel et al. | |
| 2008/0183909 A1 | 7/2008 | Lim et al. | |
| 2008/0259829 A1 | 10/2008 | Rosenblatt | |
| 2009/0005080 A1 | 1/2009 | Forstall et al. | |
| 2009/0027495 A1 | 1/2009 | Oskin et al. | |
| 2009/0037326 A1 | 2/2009 | Chitti et al. | |
| 2009/0057396 A1 | 3/2009 | Barbour et al. | |
| 2009/0060170 A1 | 3/2009 | Coughlan et al. | |
| 2009/0113315 A1 | 4/2009 | Fisher et al. | |
| 2009/0178008 A1 | 7/2009 | Herz et al. | |
| 2009/0195497 A1 | 8/2009 | Fitzgerald et al. | |
| 2009/0205041 A1 | 8/2009 | Michalske | |
| 2009/0216556 A1 | 8/2009 | Martin et al. | |
| 2009/0231960 A1 | 9/2009 | Hutcheson | |
| 2009/0262088 A1 | 10/2009 | Moll-Carrillo et al. | |
| 2009/0276463 A1 | 11/2009 | Miller | |
| 2009/0311993 A1 | 12/2009 | Horodezky | |
| 2009/0313579 A1 | 12/2009 | Poulson | |
| 2009/0319467 A1 | 12/2009 | Berg et al. | |
| 2010/0048358 A1 | 2/2010 | Tchao et al. | |
| 2010/0054519 A1 | 3/2010 | Mulvey et al. | |
| 2010/0064255 A1 | 3/2010 | Rottler et al. | |
| 2010/0082481 A1 | 4/2010 | Lin et al. | |
| 2010/0131190 A1 | 5/2010 | Terauchi et al. | |
| 2010/0151908 A1 | 6/2010 | Skarby et al. | |
| 2010/0151918 A1 | 6/2010 | Annambhotla et al. | |
| 2010/0157742 A1 | 6/2010 | Relyea et al. | |
| 2010/0190468 A1 | 7/2010 | Scott et al. | |
| 2010/0194692 A1 | 8/2010 | Orr et al. | |
| 2010/0198453 A1 | 8/2010 | Dorogusker et al. | |
| 2010/0202368 A1 | 8/2010 | Hans | |
| 2010/0211685 A1 | 8/2010 | Mcdowall et al. | |
| 2010/0223145 A1 | 9/2010 | Dragt | |
| 2010/0223563 A1 | 9/2010 | Green | |
| 2010/0225962 A1 | 9/2010 | Okigami et al. | |
| 2010/0226213 A1 | 9/2010 | Drugge et al. | |
| 2010/0281374 A1 | 11/2010 | Schulz et al. | |
| 2010/0292600 A1 | 11/2010 | Dibenedetto et al. | |
| 2010/0295795 A1 * | 11/2010 | Wilairat ................ G06F 3/04883 345/173 |
| 2010/0299601 A1 | 11/2010 | Kaplan et al. | |
| 2010/0332497 A1 | 12/2010 | Valliani et al. | |
| 2011/0004835 A1 | 1/2011 | Yanchar et al. | |
| 2011/0010195 A1 | 1/2011 | Cohn | |
| 2011/0040657 A1 | 2/2011 | Roswell | |
| 2011/0059769 A1 | 3/2011 | Brunolli | |
| 2011/0061010 A1 | 3/2011 | Wasko | |
| 2011/0074699 A1 | 3/2011 | Marr et al. | |
| 2011/0078025 A1 | 3/2011 | Shrivastav | |
| 2011/0083111 A1 | 4/2011 | Forutanpour et al. | |
| 2011/0088086 A1 | 4/2011 | Swink et al. | |
| 2011/0098928 A1 | 4/2011 | Hoffman et al. | |
| 2011/0106954 A1 | 5/2011 | Chatterjee et al. | |
| 2011/0137678 A1 | 6/2011 | Williams | |
| 2011/0159959 A1 | 6/2011 | Mallinson et al. | |

(56) References Cited

U.S. PATENT DOCUMENTS

| | | |
|---|---|---|
| 2011/0167058 A1 | 7/2011 | Van Os |
| 2011/0167369 A1 | 7/2011 | Van Os |
| 2011/0177845 A1 | 7/2011 | Fasold |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris et al. |
| 2011/0218765 A1 | 9/2011 | Rogers |
| 2011/0225549 A1 | 9/2011 | Kim |
| 2011/0227872 A1 | 9/2011 | Huska et al. |
| 2011/0234152 A1 | 9/2011 | Frossen et al. |
| 2011/0251892 A1 | 10/2011 | Laracey |
| 2011/0271223 A1 | 11/2011 | Cruz moreno et al. |
| 2011/0296324 A1 | 12/2011 | Goossens et al. |
| 2011/0304685 A1 | 12/2011 | Khedouri et al. |
| 2012/0001922 A1 | 1/2012 | Escher et al. |
| 2012/0015779 A1 | 1/2012 | Powch et al. |
| 2012/0035924 A1 | 2/2012 | Jitkoff et al. |
| 2012/0036029 A1 | 2/2012 | Esplin et al. |
| 2012/0036460 A1* | 2/2012 | Cieplinski ............ G06F 3/04883 715/769 |
| 2012/0044062 A1 | 2/2012 | Jersa et al. |
| 2012/0047447 A1 | 2/2012 | Haq |
| 2012/0059787 A1 | 3/2012 | Brown et al. |
| 2012/0060092 A1* | 3/2012 | Hill .................... H04N 21/4882 715/716 |
| 2012/0066628 A1 | 3/2012 | Ens et al. |
| 2012/0066630 A1 | 3/2012 | Kim et al. |
| 2012/0071770 A1 | 3/2012 | Grey et al. |
| 2012/0079122 A1 | 3/2012 | Brown et al. |
| 2012/0083258 A1 | 4/2012 | Rabii |
| 2012/0084210 A1 | 4/2012 | Farahmand |
| 2012/0092383 A1 | 4/2012 | Hysek et al. |
| 2012/0101887 A1 | 4/2012 | Harvey et al. |
| 2012/0116550 A1 | 5/2012 | Hoffman et al. |
| 2012/0117507 A1 | 5/2012 | Tseng et al. |
| 2012/0131441 A1 | 5/2012 | Jitkoff et al. |
| 2012/0136780 A1 | 5/2012 | El-awady et al. |
| 2012/0151331 A1 | 6/2012 | Pallakoff et al. |
| 2012/0169617 A1 | 7/2012 | Maenpaa |
| 2012/0191603 A1 | 7/2012 | Nuzzi |
| 2012/0197523 A1 | 8/2012 | Kirsch et al. |
| 2012/0209829 A1 | 8/2012 | Thomas et al. |
| 2012/0216146 A1 | 8/2012 | Korkonen |
| 2012/0258684 A1 | 10/2012 | Franz et al. |
| 2012/0310674 A1 | 12/2012 | Faulkner et al. |
| 2012/0310760 A1 | 12/2012 | Phillips et al. |
| 2012/0324390 A1 | 12/2012 | Tao |
| 2013/0013327 A1 | 1/2013 | Horseman |
| 2013/0027341 A1 | 1/2013 | Mastandrea |
| 2013/0031490 A1 | 1/2013 | Joo et al. |
| 2013/0044072 A1 | 2/2013 | Kobayashi et al. |
| 2013/0047034 A1 | 2/2013 | Salomon et al. |
| 2013/0050263 A1 | 2/2013 | Khoe et al. |
| 2013/0054634 A1 | 2/2013 | Chakraborty et al. |
| 2013/0055147 A1 | 2/2013 | Vasudev et al. |
| 2013/0063383 A1 | 3/2013 | Anderssonreimer et al. |
| 2013/0069893 A1 | 3/2013 | Brinda et al. |
| 2013/0093715 A1 | 4/2013 | Marsden et al. |
| 2013/0103814 A1 | 4/2013 | Carrasco et al. |
| 2013/0111579 A1 | 5/2013 | Newman et al. |
| 2013/0117696 A1 | 5/2013 | Robertson et al. |
| 2013/0137073 A1 | 5/2013 | Nacey et al. |
| 2013/0143512 A1 | 6/2013 | Hernandez et al. |
| 2013/0190083 A1 | 7/2013 | Toy et al. |
| 2013/0205210 A1 | 8/2013 | Jeon et al. |
| 2013/0222270 A1 | 8/2013 | Winkler et al. |
| 2013/0225118 A1 | 8/2013 | Jang et al. |
| 2013/0246202 A1 | 9/2013 | Tobin |
| 2013/0253980 A1 | 9/2013 | Blom et al. |
| 2013/0254685 A1 | 9/2013 | Batraski et al. |
| 2013/0254705 A1 | 9/2013 | Mooring et al. |
| 2013/0260896 A1 | 10/2013 | Miura et al. |
| 2013/0262155 A1 | 10/2013 | Hinkamp |
| 2013/0290013 A1 | 10/2013 | Forrester |
| 2013/0295872 A1 | 11/2013 | Guday et al. |
| 2013/0295961 A1 | 11/2013 | Lehtiniemi et al. |
| 2013/0304276 A1 | 11/2013 | Flies |
| 2013/0320080 A1 | 12/2013 | Olson et al. |
| 2013/0321340 A1 | 12/2013 | Seo et al. |
| 2013/0332113 A1 | 12/2013 | Piemonte et al. |
| 2013/0332856 A1 | 12/2013 | Sanders et al. |
| 2013/0344905 A1 | 12/2013 | Kim et al. |
| 2013/0345971 A1 | 12/2013 | Stamm et al. |
| 2013/0345978 A1 | 12/2013 | Lush et al. |
| 2013/0346408 A1 | 12/2013 | Duarte et al. |
| 2014/0011481 A1 | 1/2014 | Kho |
| 2014/0019522 A1 | 1/2014 | Weng et al. |
| 2014/0022183 A1 | 1/2014 | Ayoub et al. |
| 2014/0025737 A1 | 1/2014 | Kruglick |
| 2014/0058860 A1 | 2/2014 | Roh et al. |
| 2014/0058935 A1 | 2/2014 | Mijares |
| 2014/0059493 A1 | 2/2014 | Kim et al. |
| 2014/0068520 A1* | 3/2014 | Missig ................ G06F 3/04883 715/841 |
| 2014/0073298 A1 | 3/2014 | Rossmann |
| 2014/0074407 A1 | 3/2014 | Hernandez-silveira et al. |
| 2014/0074717 A1 | 3/2014 | Evans |
| 2014/0081854 A1 | 3/2014 | Sanchez et al. |
| 2014/0094124 A1 | 4/2014 | Dave et al. |
| 2014/0108978 A1 | 4/2014 | Yu et al. |
| 2014/0134947 A1 | 5/2014 | Stouder-studenmund |
| 2014/0143145 A1 | 5/2014 | Kortina et al. |
| 2014/0143678 A1 | 5/2014 | Mistry et al. |
| 2014/0149198 A1 | 5/2014 | Kim et al. |
| 2014/0164241 A1 | 6/2014 | Neuwirth |
| 2014/0176475 A1 | 6/2014 | Myers et al. |
| 2014/0181205 A1 | 6/2014 | Sherrets et al. |
| 2014/0187323 A1 | 7/2014 | Perry |
| 2014/0189584 A1 | 7/2014 | Weng et al. |
| 2014/0195972 A1 | 7/2014 | Lee et al. |
| 2014/0208250 A1* | 7/2014 | Ording ................ G06F 3/04817 715/769 |
| 2014/0244495 A1 | 8/2014 | Davis et al. |
| 2014/0245177 A1 | 8/2014 | Maklouf |
| 2014/0250391 A1 | 9/2014 | Jong et al. |
| 2014/0277843 A1 | 9/2014 | Langlois et al. |
| 2014/0278028 A1 | 9/2014 | Nye et al. |
| 2014/0280580 A1 | 9/2014 | Langlois et al. |
| 2014/0281957 A1 | 9/2014 | Weng et al. |
| 2014/0282103 A1 | 9/2014 | Crandall |
| 2014/0287821 A1 | 9/2014 | Barclay et al. |
| 2014/0289660 A1 | 9/2014 | Min et al. |
| 2014/0293755 A1 | 10/2014 | Geiser et al. |
| 2014/0304635 A1 | 10/2014 | Kristinsson et al. |
| 2014/0304738 A1 | 10/2014 | Nakaoka et al. |
| 2014/0310618 A1 | 10/2014 | Venkatesh |
| 2014/0317543 A1 | 10/2014 | Kim |
| 2014/0317555 A1 | 10/2014 | Choi et al. |
| 2014/0325384 A1 | 10/2014 | Kobayashi |
| 2014/0325408 A1 | 10/2014 | Leppanen et al. |
| 2014/0336931 A1 | 11/2014 | Wilkins |
| 2014/0337207 A1 | 11/2014 | Zhang et al. |
| 2014/0337450 A1 | 11/2014 | Choudhary et al. |
| 2014/0362056 A1* | 12/2014 | Zambetti ............... G06F 3/0485 345/179 |
| 2014/0365126 A1 | 12/2014 | Vulcano et al. |
| 2015/0006376 A1 | 1/2015 | Nuthulapati et al. |
| 2015/0012425 A1 | 1/2015 | Mathew |
| 2015/0026615 A1 | 1/2015 | Choi et al. |
| 2015/0039494 A1 | 2/2015 | Sinton et al. |
| 2015/0066758 A1 | 3/2015 | Denardis et al. |
| 2015/0067513 A1 | 3/2015 | Zambetti et al. |
| 2015/0098309 A1 | 4/2015 | Adams et al. |
| 2015/0100982 A1* | 4/2015 | Sirpal ................ H04N 21/4126 725/37 |
| 2015/0121405 A1 | 4/2015 | Ekselius et al. |
| 2015/0130830 A1 | 5/2015 | Nagasaki et al. |
| 2015/0160856 A1 | 6/2015 | Jang et al. |
| 2015/0180980 A1 | 6/2015 | Welinder et al. |
| 2015/0185995 A1 | 7/2015 | Shoemaker et al. |
| 2015/0205509 A1 | 7/2015 | Scriven et al. |
| 2015/0217163 A1 | 8/2015 | Amis et al. |
| 2015/0256491 A1 | 9/2015 | Eatough et al. |

(56) References Cited

U.S. PATENT DOCUMENTS

| | | |
|---|---|---|
| 2015/0269848 A1 | 9/2015 | Yuen et al. |
| 2015/0286391 A1 | 10/2015 | Jacobs et al. |
| 2015/0295901 A1 | 10/2015 | Woodward et al. |
| 2015/0301506 A1 | 10/2015 | Koumaiha |
| 2015/0324751 A1 | 11/2015 | Orenstein et al. |
| 2015/0334546 A1 | 11/2015 | Diamond |
| 2015/0347711 A1 | 12/2015 | Soli et al. |
| 2015/0348009 A1 | 12/2015 | Brown et al. |
| 2015/0350861 A1 | 12/2015 | Soli et al. |
| 2016/0004393 A1 | 1/2016 | Faaborg et al. |
| 2016/0014266 A1 | 1/2016 | Bhatt |
| 2016/0022202 A1 | 1/2016 | Peterson et al. |
| 2016/0027420 A1 | 1/2016 | Eronen |
| 2016/0028869 A1 | 1/2016 | Bhatt |
| 2016/0044269 A1 | 2/2016 | Kang |
| 2016/0058336 A1 | 3/2016 | Blahnik et al. |
| 2016/0065505 A1 | 3/2016 | Iskander |
| 2016/0066005 A1 | 3/2016 | Davis et al. |
| 2016/0073034 A1 | 3/2016 | Mukherjee et al. |
| 2016/0098137 A1 | 4/2016 | Kim et al. |
| 2016/0150063 A1 | 5/2016 | Choi et al. |
| 2016/0180568 A1 | 6/2016 | Bullivant et al. |
| 2016/0188181 A1 | 6/2016 | Smith et al. |
| 2016/0202889 A1 | 7/2016 | Shin et al. |
| 2016/0217601 A1 | 7/2016 | Tsuda et al. |
| 2016/0226713 A1 | 8/2016 | Dellinger et al. |
| 2016/0239724 A1 | 8/2016 | Arfvidsson et al. |
| 2016/0253864 A1 | 9/2016 | Weber et al. |
| 2016/0261675 A1 | 9/2016 | Block et al. |
| 2016/0327911 A1 | 11/2016 | Eim et al. |
| 2016/0357363 A1 | 12/2016 | Decker et al. |
| 2016/0358133 A1 | 12/2016 | Van os et al. |
| 2016/0358134 A1 | 12/2016 | Van os et al. |
| 2016/0358180 A1 | 12/2016 | Van os et al. |
| 2016/0370879 A1 | 12/2016 | Sharma |
| 2017/0004507 A1 | 1/2017 | Henderson et al. |
| 2017/0013408 A1 | 1/2017 | Grzywaczewski et al. |
| 2017/0026430 A1 | 1/2017 | Beckhardt et al. |
| 2017/0063753 A1 | 3/2017 | Probasco et al. |
| 2017/0093780 A1 | 3/2017 | Lieb et al. |
| 2017/0123571 A1 | 5/2017 | Huang et al. |
| 2017/0134321 A1 | 5/2017 | Ushio et al. |
| 2017/0169185 A1 | 6/2017 | Weng |
| 2017/0269792 A1 | 9/2017 | Xu et al. |
| 2017/0344257 A1 | 11/2017 | Gnedin et al. |
| 2017/0353815 A1 | 12/2017 | Jagannathan et al. |
| 2017/0354845 A1 | 12/2017 | Williams et al. |
| 2017/0357433 A1 | 12/2017 | Boule et al. |
| 2017/0357439 A1 | 12/2017 | Lemay et al. |
| 2017/0359623 A1 | 12/2017 | Folse et al. |
| 2018/0034765 A1 | 2/2018 | Keszler et al. |
| 2018/0039406 A1 | 2/2018 | Kong et al. |
| 2018/0081515 A1 | 3/2018 | Block et al. |
| 2018/0108243 A1 | 4/2018 | Scherer |
| 2018/0143761 A1 | 5/2018 | Choi et al. |
| 2018/0225297 A1 | 8/2018 | Andrew et al. |
| 2018/0350144 A1 | 12/2018 | Rathod |
| 2018/0356243 A1 | 12/2018 | Mehta et al. |
| 2019/0220243 A1 | 7/2019 | Decker et al. |
| 2019/0232110 A1 | 8/2019 | Williams et al. |
| 2019/0232111 A1 | 8/2019 | Williams et al. |
| 2019/0250813 A1 | 8/2019 | Block et al. |
| 2019/0297478 A1 | 9/2019 | Langlois et al. |
| 2019/0334907 A1 | 10/2019 | Rodden et al. |
| 2019/0339822 A1 | 11/2019 | Devine et al. |
| 2019/0349463 A1 | 11/2019 | Soli et al. |
| 2020/0120170 A1 | 4/2020 | Amitay et al. |
| 2020/0159894 A1 | 5/2020 | Keen et al. |
| 2020/0213437 A1 | 7/2020 | Bhatt |
| 2020/0358897 A1 | 11/2020 | Dellinger et al. |
| 2021/0042028 A1 | 2/2021 | Block et al. |

FOREIGN PATENT DOCUMENTS

| | | |
|---|---|---|
| CN | 1536511 A | 10/2004 |
| CN | 1782685 A | 6/2006 |
| CN | 1786906 A | 6/2006 |
| CN | 1997050 A | 7/2007 |
| CN | 101061484 A | 10/2007 |
| CN | 101505320 A | 8/2009 |
| CN | 101822020 A | 9/2010 |
| CN | 101827363 A | 9/2010 |
| CN | 101828411 A | 9/2010 |
| CN | 102081502 A | 6/2011 |
| CN | 102646081 A | 8/2012 |
| CN | 102801649 A | 11/2012 |
| CN | 102989159 A | 3/2013 |
| CN | 103154954 A | 6/2013 |
| CN | 103297610 A | 9/2013 |
| CN | 103581456 A | 2/2014 |
| CN | 104288983 A | 1/2015 |
| CN | 105874447 A | 8/2016 |
| CN | 107710197 A | 2/2018 |
| EP | 1705883 A1 | 9/2006 |
| EP | 2426902 A1 | 3/2012 |
| EP | 2632139 A2 | 8/2013 |
| GB | 2550639 A | 11/2017 |
| JP | 2002-73486 A | 3/2002 |
| JP | 2003-296246 A | 10/2003 |
| JP | 2004-258738 A | 9/2004 |
| JP | 2005-339017 A | 12/2005 |
| JP | 2008-272301 A | 11/2008 |
| JP | 2009-147889 A | 7/2009 |
| JP | 2010-12335 A | 1/2010 |
| JP | 2012-53642 A | 3/2012 |
| JP | 2012-533117 A | 12/2012 |
| JP | 2013-29925 A | 2/2013 |
| JP | 2013-54468 A | 3/2013 |
| JP | 2014-44724 A | 3/2014 |
| JP | 2014-216868 A | 11/2014 |
| JP | 2015-531916 A | 11/2015 |
| KR | 10-2004-0067514 A | 7/2004 |
| KR | 10-2013-0109466 A | 10/2013 |
| KR | 10-2014-0105309 A | 9/2014 |
| TW | 498240 B | 8/2002 |
| TW | 200512616 A | 4/2005 |
| TW | 201210368 A | 3/2012 |
| TW | 201240499 A | 10/2012 |
| WO | 2007/000012 A1 | 1/2007 |
| WO | 2007/142703 A1 | 12/2007 |
| WO | 2007/149731 A1 | 12/2007 |
| WO | 2007/100944 A3 | 8/2008 |
| WO | 2014/002711 A1 | 1/2014 |
| WO | 2014/022711 A1 | 2/2014 |
| WO | 2014/074407 A1 | 5/2014 |
| WO | 2016/126733 A1 | 8/2016 |

OTHER PUBLICATIONS

Dharmasena, Anusha, "iMessage-Send as Text Message Option", YouTube, Available online at: https://www.youtube.com/watch?v=hXG-MdIW6FA, Feb. 18, 2013, 1 page.

Examiner's Answer to Appeal Brief received for U.S. Appl. No. 14/774,664, mailed on May 31, 2018, 28 pages.

Examiner's Answer to Appeal Brief received for U.S. Appl. No. 14/863,099, mailed on Jul. 28, 2017, 31 pages.

Final Office Action received U.S. Appl. No. 14/774,664, dated Aug. 25, 2017, 23 pages.

Final Office Action received for U.S. Appl. No. 14/863,099, dated Apr. 21, 2016, 20 pages.

International Preliminary Report on Patentability received for PCT Patent Application No. PCT/US2014/027882, dated Sep. 24, 2015, 8 pages.

International Search Report and Written Opinion received for PCT Patent Application No. PCT/US2013/032498, dated Feb. 10, 2014, 18 pages.

International Search Report and Written Opinion received for PCT Patent Application No. PCT/US2014/027882, dated Oct. 10, 2014, 11 pages.

(56) References Cited

OTHER PUBLICATIONS

Invitation to Pay Addition Fees received for PCT Patent Application No. PCT/US2014/027882, dated Aug. 5, 2014, 2 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Non-Final Office Action received for U.S. Appl. No. 15/411,110, dated Jul. 22, 2019, 29 pages.
Notice of Allowance received for Japanese Patent Application No. 2017-545918, dated Jul. 22, 2019, 4 pages (1 page of English Translation and 3 pages of Official Copy).
Office Action received for Chinese Patent Application No. 201510284850.3, dated Jun. 21, 2019, 10 pages (4 pages of English Translation and 6 pages of Official Copy).
Office Action received for Chinese Patent Application No. 201610371774.4, dated Jul. 8, 2019, 6 pages (3 pages of English Translation and 3 pages Of Official copy).
Office Action received for Korean Patent Application No. 10-2017-7024570, dated Jul. 10, 2019, 6 pages (3 pages of English Translation and 3 pages of Official Copy).
Decision to Grant received for European Patent Application No. 16706081.3, dated Nov. 29, 2018, 2 pages.
Extended European Search Report received for European Patent Application No. 18213157.3, dated Apr. 12, 2019, 8 pages.
Final Office Action received for U.S. Appl. No. 14/863,069, dated Jul. 5, 2018, 19 pages.
Intention to Grant received for European Patent Application No. 16706081.3, dated Jul. 18, 2018, 8 pages.
Intention to Grant received for European Patent Application No. 16706081.3, dated Jun. 11, 2018, 7 pages.
International Preliminary Report on Patentability received for PCT Patent Application No. PCT/US2016/016216, dated May 4, 2017, 14 pages.
International Search Report and Written Opinion received for PCT Patent Application No. PCT/US2016/016216, dated Jun. 27, 2016, 18 pages.
Invitation to Pay Addition Fees and Partial International Search Report received for PCT Patent Application No. PCT/US2016/016216, dated Apr. 20, 2016, 6 pages.
Invitation to Restrict or Pay Additional Fees received for PCT Patent Application No. PCT/US2016/016216, dated Dec. 19, 2016, 9 pages.
Non-Final Office Action received for U.S. Appl. No. 14/863,069, dated Oct. 5, 2017, 19 pages.
Notice of Acceptance received for Australian Patent Application No. 2016215440, dated Feb. 28, 2019, 3 pages.
Notice of Allowance received for U.S. Appl. No. 14/863,069, dated Feb. 6, 2019, 6 pages.
Office Action received for Australian Patent Application No. 2016215440, dated Jan. 22, 2019, 2 pages.
Office Action received for Australian Patent Application No. 2016215440, dated Mar. 13, 2018, 3 pages.
Supplemental Notice of Allowance received for U.S. Appl. No. 14/863,069, dated Mar. 29, 2019, 3 pages.
Supplemental Notice of Allowance received for U.S. Appl. No. 14/863,069, dated Mar. 1, 2019, 3 pages.
Written Opinion Issued from International Preliminary Examining Authority for PCT Application No. PCT/USZ016/016216, dated Feb. 20, 2017, 12 pages.
Certificate of Examination received for Australian Patent Application No. 2018101855, dated Aug. 6, 2019, 02 pages.
Office Action received for Australian Patent Application No. 2019100490, dated Jul. 26, 2019, 4 pages.
Supplemental Notice of Allowance received for U.S. Appl. No. 14/863,069, dated Aug. 15, 2019, 3 pages.
Supplementary European Search Report received for European Patent Application No. 17810749.6, dated Aug. 6, 2019, 6 pages.
Advisory Action received for U.S. Appl. No. 15/554,204, dated Mar. 12, 2020, 3 pages.
Final Office Action received for U.S. Appl. No. 15/411,110, dated Mar. 5, 2020, 30 pages.
Notice of Allowance received for U.S. Appl. No. 15/614,121, dated Mar. 6, 2020, 8 pages.
Decision on Appeal received for U.S. Appl. No. 14/863,099, mailed on Aug. 22, 2019, 9 pages.
Invitation to Pay Additional Fee received for Pot Patent Application No. PCT/US2019/024790, dated Jul. 18, 2019, 10 pages.
Office Action received for European Patent Application No. 17810749.6, dated Aug. 20, 2019, 9 pages.
Office Action received for Japanese Patent Application No. 2016-569945, dated Jul. 29, 2019, 5 pages (2 pages of English Translation and 3 pages of Official Copy).
Applicant-Initiated Interview Summary received for U.S. Appl. No. 15/614,121, dated Feb. 13, 2020, 4 pages.
Non-Final Office Action received for U.S. Appl. No. 16/145,033, dated Mar. 4, 2020, 50 pages.
Office Action received for Australian Patent Application No. 2018206772, dated Feb. 6, 2020, 4 pages.
Applicant-Initiated Interview Summary received for U.S. Appl. No. 15/554,204, dated Jan. 31, 2020, 3 pages.
Intention to Grant received for Danish Patent Application No. PA201870385, dated Jan. 24, 2020, 2 pages.
Office Action received for Australian Patent Application No. 2018279037, dated Jan. 17, 2020, 4 pages.
Summons to Attend Oral Proceedings received for European Patent Application No. 16804040.0, dated Jan. 24, 2020, 11 pages.
Wikipedia, "Emoji", Available online at: https://en.wikipedia.org/w/index.php?title=Emoji&oldid=648831795, Feb. 25, 2015, 12 pages.
Wikipedia, "Ennoticon", Available online at: https://en.wikipedia.org/w/index.php?title=Emoticon&oldid=648776142, Feb. 25, 2015, 9 pages.
Extended European Search Report received for European Patent Application No. 19163212.4, dated Jun. 25, 2019, 11 pages.
Office Action received for Australian Patent Application No. 2018279037, dated Jun. 18, 2019, 5 pages.
Wikipedia, "Enhanced Multi-Level Precedence and Pre-emption Service", Available online at: https://de.wikipedia.org/w/index.php?%20title=Enhanced%20Multi%E3%83%BCLevel_Precedence_And_Pre-emption_Service&oldid=123047429, Oct. 2013, 2 pages. (Official copy only) (See Communication under 37 CFR § 1.98(a) (3)).
Applicant Initiated Interview Summary received for U.S. Appl. No. 15/411,110, dated Oct. 28, 2019, 6 pages.
Certificate of Examination received for Australian Patent Application No. 2019100490, dated Oct. 16, 2019, 2 pages.
Final Office Action received for U.S. Appl. No. 15/554,204, dated Oct. 31, 2019, 22 pages.
Non-Final Office Action received for U.S. Appl. No. 15/614,121, dated Nov. 4, 2019, 44 pages.
Office Action received for Australian Patent Application No. 2018206772, dated Nov. 6, 2019, 4 pages.
Office Action received for Korean Patent Application No. 10-2019-7029673, dated Nov. 5, 2019, 10 pages (4 pages of English Translation and 6 pages of Official Copy).
[PC] Pre-Customization of Black Desert's Characters, Online Available at:—https://blog.naver.com/hsh6051/220209813968, Dec. 14, 2014, 41 pages (21 pages of English translation and 20 pages of Official Copy).
Extended European Search Report received for European Patent Application No. 17813824.4, dated Dec. 5, 2019, 7 pages.
"How to Send and Receive files over Bluetooth on an Android Phone", Online Available at: https://web.archive.org/web/20160529062240/http://www.androidtipsandhacks.com/android/send-receive-files-bluetooth-android-phone/, May 29, 2016, 7 pages.
"Kamcord—Wikipedia", Online Available at: https://en.wikipedia.org/w/index.php?title=Kamcord&oldid=712263010>, Mar. 28, 2016, 2 pages.
"Kamcord Developers", Online Available at: https://web.archive.org/web/20140827043641 /http://www.kamcord.com/developers/>, Aug. 27, 2014, 7 pages.

(56) References Cited

OTHER PUBLICATIONS

"Kamcord Developers—Quick Start Guide", Online Available at: https://web.archive.org/web/20140801055705/https://www.kamcord.com/developers/docs/ios/features-and-settings/, Aug. 1, 2014, 10 pages.
Office Action received for Chinese Patent Application No. 201610371774.4, dated Dec. 2, 2019, 6 pages (3 pages of English Translation and 3 pages of Official Copy).
Office Action received for Chinese Patent Application No. 201811330077.X, dated Nov. 13, 2019, 14 pages (6 pages of English Translation and 8 pages of Official Copy).
Final Office Action received for U.S. Appl. No. 14/869,877, dated Jun. 11, 2019, 35 pages.
Notice of Allowance received for U.S. Appl. No. 14/863,069, dated Jun. 18, 2019, 6 pages.
Office Action received for Australian Patent Application No. 2016270323, dated May 29, 2019, 4 pages.
Office Action received for Korean Patent Application No. 10-2017-7034558, dated Jun. 4, 2019, 7 pages (3 pages of English Translation and 4 pages of Official Copy).
Extended European Search Report received for European Patent Application No. 17813879.8, dated Jan. 8, 2020, 8 pages.
Notice of Allowance received for Japanese Patent Application No. 2016-569945, dated Jan. 7, 2020, 4 pages (1 page of English Translation and 3 pages of Official Copy).
Decision on Appeal received for U.S. Appl. No. 14/774,664, mailed on Sep. 12, 2019, 8 pages.
International Search Report and Written Opinion received for PCT Patent Application No. PCT/US2019/024790, dated Sep. 11, 2019, 18 pages.
Office Action received for Danish Patent Application No. PA201870385, dated Aug. 23, 2019, 3 pages.
Applicant-Initiated Interview Summary received for U.S. Appl. No. 15/554,204, dated Oct. 11, 2019, 5 pages.
Notice of Allowance received for Japanese Patent Application No. 2017-562330, dated Sep. 20, 2019, 4 pages (1 page of English Translation and 3 pages of Official Copy).
Office Action received for Chinese Patent Application No. 201680008151.9, dated Aug. 27, 2019, 24 pages (11 pages of English Translation and 13 pages of Official Copy).
Office Action received for Korean Patent Application No. 10-2017-7034558, dated Sep. 25, 2019, 9 pages (4 pages of English Translation and 5 pages of Official Copy).
Advisory Action received for U.S. Appl. No. 14/841,606, dated Feb. 28, 2019, 3 pages.
Advisory Action received for U.S. Appl. No. 14/869,877, dated Jan. 5, 2017, 3 pages.
Advisory Action received for U.S. Appl. No. 14/870,793, dated Apr. 13, 2017, 3 pages.
Certification of Examination received for Australian Patent Application No. 2018100158, dated Oct. 23, 2018, 2 pages.
Codrington, Simon, "Intuitive Scrolling Interfaces with Css Scroll Snap Points", Online Available at: https://www.sitepoint.com/intuitive-scrolling-interfaces-with-css-scroll-snap-points/, Dec. 8, 2015, 14 pages.
Examiner's Answer to Appeal Brief received for U.S. Appl. No. 14/870,793, mailed on Apr. 16, 2018, 15 pages.
Extended European Search Report received for European Patent Application No. 16762356.0, dated Nov. 9, 2018, 10 pages.
Extended European Search Report received for European Patent Application No. 16804040.0, dated Feb. 26, 2018, 9 pages.
Final Office Action received for U.S. Appl. No. 14/599,424, dated Jun. 28, 2018, 12 pages.
Final Office Action received for U.S. Appl. No. 14/599,425, dated Jun. 12, 2018, 45 pages.
Final Office Action received for U.S. Appl. No. 14/599,425, dated May 19, 2017, 24 pages.
Final Office Action received for U.S. Appl. No. 14/599,425, dated Oct. 8, 2015, 20 pages.
Final Office Action received for U.S. Appl. No. 14/841,606, dated Sep. 7, 2018, 34 pages.
Final Office Action received for U.S. Appl. No. 14/864,759, dated Sep. 4, 2018, 24 pages.
Final Office Action received for U.S. Appl. No. 14/869,877, dated Apr. 26, 2018, 18 pages.
Final Office Action received for U.S. Appl. No. 14/869,877, dated Aug. 3, 2016, 13 pages.
Final Office Action received for U.S. Appl. No. 14/870,726, dated Apr. 19, 2017, 17 pages.
Final Office Action received for U.S. Appl. No. 14/870,793, dated Jan. 19, 2017, 16 pages.
Final Office Action received for U.S. Appl. No. 15/614,121, dated Apr. 8, 2019, 32 pages.
International Preliminary Report on Patentability received for PCT Patent Application No. PCT/US2015/032474, dated Dec. 15, 2016, 7 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2016/014997, dated Dec. 21, 2017, 16 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/034175, dated Dec. 14, 2017, 14 pages.
International Preliminary Report on Patentability received for PCT Patent Application No. PCT/US2017/035554, dated Dec. 20, 2018, 39 pages.
International Preliminary Report on Patentability received for PCT Patent Application No. PCT/US2017/036608, dated Dec. 27, 2018, 12 pages.
International Preliminary Report on Patentability received for PCT Patent Application No. PCT/US2017/037057, dated Dec. 27, 2018, 24 pages.
International Search Report & Written Opinion received for PCT Patent Application No. PCT/US2016/014997, dated Aug. 31, 2016, 21 pages.
International Search Report and Written Opinion received for PCT Patent Application No. PCT/US2015/032474, dated Aug. 19, 2015, 8 pages.
International Search Report and Written Opinion received for PCT Patent Application No. PCT/US2015/053353, dated May 9, 2016, 21 pages.
International Search Report and Written Opinion received for PCT Patent Application No. PCT/US2016/021403, dated May 12, 2016, 23 pages.
International Search Report and Written Opinion received for PCT Patent Application No. PCT/US2016/034175, dated Oct. 7, 2016, 17 pages.
International Search Report and Written Opinion received for PCT Patent Application No. PCT/US2017/035554, dated Sep. 22, 2017, 42 pages.
International Search Report and Written Opinion received for PCT Patent Application No. PCT/US2017/036608, dated Oct. 20, 2017, 15 pages.
International Search Report and Written Opinion received for PCT Patent Application No. PCT/US2017/037057, dated Aug. 29, 2017, 26 pages.
Invitation to Pay Addition Fees and Partial International Search Report received for PCT Patent Application No. PCT/US2016/014997, dated May 2, 2016, 5 pages.
Invitation to Pay Addition Fees received for PCT Patent Application No. PCT/US2017/036608, dated Aug. 14, 2017, 2 pages.
Invitation to Pay Additional Fees received for PCT Patent Application No. PCT/US2015/053353, dated Jan. 21, 2016, 7 pages.
Invitation to Pay Additional Fees received for PCT Patent Application No. PCT/US2016/034175, dated Aug. 11, 2016, 3 pages.
Invitation to Pay Additional Fees received for PCT Patent Application No. PCT/US2017/035554, dated Jul. 20, 2017, 2 pages.

(56) References Cited

OTHER PUBLICATIONS

"iOS Security", White Paper, Available online at htttps://web.archive.org/web/20150526223200/http://www.apple.com/business/docs/iOS_Security_Guide.pdf, Apr. 2015, 55 pages.
"iphone User Guide for Ios 7.1 Software", available online at https://manuals.info.apple.com/Manuals/1000/MA1681/en_US/iphone_ios7_user_guide.pdf,Mar. 10, 2014, pp. 1-162.
"Mugs", Online Available at: https://web.archive.org/web/20151029034349/http://le-mugs.com/, Oct. 29, 2015.
Non-Final Office Action received for U.S. Appl. No. 15/554,204, dated Apr. 17, 2019, 19 pages.
Non-Final Office Action received for U.S. Appl. No. 14/503,372, dated Dec. 5, 2014, 11 pages.
Non-Final Office Action received for U.S. Appl. No. 14/599,424, dated Jan. 17, 2018, 13 pages.
Non-Final Office Action received for U.S. Appl. No. 14/599,425, dated Jan. 11, 2018, 42 pages.
Non-Final Office Action received for U.S. Appl. No. 14/599,425, dated Mar. 17, 2015, 16 pages.
Non-Final Office Action received for U.S. Appl. No. 14/599,425, dated Oct. 26, 2016, 22 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/864,759, dated Mar. 20, 2018, 20 pages.
Non-Final Office Action received for U.S. Appl. No. 14/869,877, dated Jan. 29, 2016, 18 pages.
Non-Final Office Action received for U.S. Appl. No. 14/869,877, dated Jun. 16, 2017, 17 pages.
Non-Final Office Action received for U.S. Appl. No. 14/869,877, dated Oct. 5, 2018, 19 pages.
Non-Final Office Action received for U.S. Appl. No. 14/870,726, dated Sep. 16, 2016, 12 pages.
Non-Final Office Action received for U.S. Appl. No. 14/870,793, dated Apr. 19, 2016, 17 pages.
Non-Final Office Action received for U.S. Appl. No. 15/411,110, dated Dec. 13, 2018, 23 pages.
Non-Final Office Action received for U.S. Appl. No. 15/614,121, dated Nov. 30, 2018, 28 pages.
Notice of Acceptance received for Australian Patent Application No. 2015267240, dated Apr. 10, 2018, 3 pages.
Notice of Acceptance received for Australian Patent Application No. 2016229847, dated Sep. 12, 2018, 3 pages.
Notice of Allowance received for Chinese Patent Application No. 201520358505.5, dated Jan. 13, 2016, 3 pages (2 pages of English Translation and 1 page of Official copy).
Notice of Allowance received for Chinese Patent Application No. 201580028677.9, dated Apr. 2, 2019, 2 pages (1 pages of English Translation and 1 pages of Official copy).
Notice of Allowance received for Taiwanese Patent Application No. 104117509, dated Mar. 31, 2017, 3 pages (Official copy only) (See Communication under 37 CFR § 1.98(a) (3)).
Notice of Allowance received for U.S. Appl. No. 14/599,424, dated Dec. 13, 2018, 6 pages.
Notice of Allowance received for U.S. Appl. No. 14/599,425, dated Dec. 19, 2018, 9 pages.
Notice of Allowance received for U.S. Appl. No. 14/864,759, dated Dec. 14, 2018, 10 pages.
Notice of Allowance received for U.S. Appl. No. 14/870,726, dated Sep. 11, 2018, 9 pages.
Notice of Allowance received for U.S. Appl. No. 15/616,480, dated Jan. 3, 2019, 8 pages.
Office Action received for Australian Patent Application No. 2015100734, dated Jul. 29, 2015, 5 pages.
Office Action received for Australian Patent Application No. 2015267240, dated Apr. 10, 2017, 5 pages.
Office Action received for Australian Patent Application No. 2015267240, dated Mar. 21, 2018, 5 pages.
Office Action received for Australian Patent Application No. 2016100796, dated Aug. 26, 2016, 6 pages.
Office Action received for Australian Patent Application No. 2016100796, dated Feb. 13, 2017, 4 pages.
Office Action received for Australian Patent Application No. 2016229847, dated Jul. 3, 2018, 4 pages.
Office Action received for Australian Patent Application No. 2016270323, dated Nov. 26, 2018, 4 pages.
Office Action received for Australian Patent Application No. 2017100231, dated Apr. 13, 2017, 3 pages.
Office Action received for Australian Patent Application No. 2017100667, dated Aug. 3, 2017, 9 pages.
Office Action received for Australian Patent Application No. 2017101375, dated Dec. 1, 2017, 3 pages.
Office Action received for Australian Patent Application No. 2017101375, dated Feb. 19, 2018, 4 pages.
Office Action received for Australian Patent Application No. 2017286296, dated May 8, 2019, 4 pages.
Office Action received for Australian Patent Application No. 2018100158, dated Apr. 23, 2018, 5 pages.
Office Action received for Australian Patent Application No. 2018101855, dated Feb. 22, 2019, 4 pages.
Office Action received for Australian Patent Application No. 2018206772, dated Apr. 1, 2019, 4 pages.
Office Action received for Chinese Patent Application No. 201510284850.3, dated Jul. 9, 2018, 11 pp. (2 pages of English Translation and 9 pages of Official copy).
Office Action received for Chinese Patent Application No. 201510284850.3, dated Nov. 28, 2017, 15 pages (5 pages of English Translation and 10 pages of Official copy).
Office Action received for Chinese Patent Application No. 201580028677.9, dated May 25, 2018, 14 pages (4 pages of English Translation and 10 pages of Official copy).
Office Action received for Chinese Patent Application No. 201610371774.4, dated Dec. 19, 2018, 13 pages (5 pages of English Translation and 8 pages of Official copy).
Office Action received for Chinese Patent Application No. 201620509515.9, dated Nov. 9, 2016, 2 pages (1 page of English Translation and 1 page of Official copy).
Office Action received for Danish Patent Application No. PA201670362, dated Jan. 29, 2018, 3 pages.
Office Action received for Danish Patent Application No. PA201670362, dated Jun. 1, 2017, 6 pages.
Office Action received for Danish Patent Application No. PA201670362, dated Nov. 21, 2016, 11 pages.
Office Action received for Danish Patent Application No. PA201670749, dated Jan. 30, 2017, 11 pages.
Office Action received for Danish Patent Application No. PA201670749, dated Oct. 3, 2017, 3 pages.
Office Action received for Danish Patent Application No. PA201670751, dated Jan. 13, 2017, 9 pages.
Office Action received for Danish Patent Application No. PA201670751, dated Nov. 13, 2017, 2 pages.
Office Action received for Danish Patent Application No. PA201770423, dated Jun. 12, 2018, 7 pages.
Office Action received for Danish Patent Application No. PA201770423, dated Mar. 29, 2019, 6 pages.
Office Action received for European Patent Application No. 15730890.9, dated Aug. 3, 2017, 4 pages.
Office Action received for European Patent Application No. 16804040.0, dated May 13, 2019, 12 pages.
Office Action received for Japanese Patent Application No. 2016-569945, dated Nov. 10, 2017, 8 pages (4 pages of English Translation and 4 pages of Official copy).
Office Action received for Japanese Patent Application No. 2016-569945, dated Sep. 10, 2018, 11 pages (6 pages of English Translation and 5 pages of Official copy).
Office Action received for Japanese Patent Application No. 2017-545918, dated Sep. 14, 2018, 12 pages (7 pages of English Translation and 5 pages of Official copy).
Office Action received for Japanese Patent Application No. 2017-562330, dated Jan. 18, 2019, 11 pages (6 pages of English Translation and 5 pages of Official copy).

(56) References Cited

OTHER PUBLICATIONS

Office Action received for Korean Patent Application No. 10-2017-7024570, dated Sep. 28, 2018, 14 pages (6 pages of English Translation and 8 pages of Official copy).
Office Action received for Korean Patent Application No. 10-2017-7034558, dated Dec. 15, 2018, 15 pages (7 pages of English Translation and 8 pages of Official copy).
Office Action received for Taiwanese Patent Application No. 104117509, dated Aug. 22, 2016, 6 pages (3 pages of English Translation and 3 pages of Official copy).
Office Action received for Taiwanese Patent Application No. 104132636, dated Dec. 13, 2018, 26 pages (9 pages of English Translation and 17 pages of Official copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official copy).
Partial Supplementary European Search Report received for European Patent Application No. 17810749.6, dated Apr. 25, 2019, 8 pages.
Preliminary Opinion received for European Patent Application No. 15730890.9, dated Mar. 7, 2019, 4 pages.
Razykdreviews, "In Depth Review of Apple Watch Activity and Workout App", available at <URL: https://www.youtube.com/watch?v=GkKI3q1K0ow>, May 11, 2015, 1 page.
Rizknows, "Garmin Connect Mobile App—Review #2", https://www.youtube.com/watch?v=7my3wMpeRbE, Oct. 22, 2015, 1 page.
Search Report and Opinion received for Danish Patent Application No. PA201770423, dated Oct. 4, 2017, 10 pages.
Search Report and Opinion received for Danish Patent Application No. PA201870385, dated Nov. 16, 2018, 10 pages.
Summons to Attend Oral Proceedings received for European Patent Application No. 15730890.9, dated Sep. 10, 2018, 11 pages.
Supplemental Notice of Allowance received for U.S. Appl. No. 14/870,726, dated Mar. 6, 2019, 6 pages.
Supplemental Notice of Allowance received for U.S. Appl. No. 15/616,480, dated Mar. 28, 2019, 2 pages.
Tweedie, Steven, "Create and Customize Your Own Emojis with 'makemoji' for Iphone", Available online at: http://www.businessinsider.com/create-custom-emojis-with-makemoji-app-2014-8, Aug. 19, 2014, 6 pages
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Applicant Initiated Interview Summary received for U.S. Appl. No. 15/411,110, dated Apr. 21, 2020, 5 pages.
Non-Final Office Action received for U.S. Appl. No. 16/363,945, dated Apr. 24, 2020, 13 pages.
Office Action received for Chinese Patent Application No. 201710439448.7, dated Mar. 27, 2020, 13 pages (7 pages of English Translation and 6 pages of Official Copy).
Applicant-Initiated Interview Summary received for U.S. Appl. No. 16/145,033, dated Jun. 29, 2020, 5 pages.
Examiner's Answer to Appeal Brief received for U.S. Appl. No. 14/869,877, mailed on Jun. 26, 2020, 14 pages
Non-Final Office Action received for U.S. Appl. No. 15/411,110, dated Jun. 26, 2020, 32 pages.
Notice of Allowance received for Chinese Patent Application No. 201680008151.9, dated Jun. 16, 2020, 2 pages (1 page of English Translation and 1 page of Official Copy).
Office Action received for Chinese Patent Application No. 201811330077.X, dated May 18, 2020, 9 pages (3 pages of English Translation and 6 pages of Official Copy).
Office Action received for Korean Patent Application No. 10-2019-7038235, dated Mar. 9, 2020, 15 pages (7 pages of English Translation and 8 pages of Official Copy).
Brief Communication Regarding Oral Proceedings received for European Patent Application No. 16804040.0, dated May 28, 2020, 15 pages.
Non-Final Office Action received for U.S. Appl. No. 16/378,136, dated Jun. 2, 2020, 8 pages.
Notice of Allowance received for Chinese Patent Application No. 201610371774.4, dated Jun. 4, 2020, 2 pages (1 page of English Translation and 1 page of Official Copy).
Office Action received for Australian Patent Application No. 2017277971, dated Jun. 3, 2020, 3 pages.
Non-Final Office Action received for U.S. Appl. No. 16/377,892, dated May 21, 2020, 9 pages.
Notice of Acceptance received for Australian Patent Application No. 2017286296, dated May 1, 2020, 3 pages.
Notice of Acceptance received for Australian Patent Application No. 2018279037, dated May 13, 2020, 3 pages.
Office Action received for European Patent Application No. 18213157.3, dated May 15, 2020, 7 pages.
Office Action received for Chinese Patent Application No. 201680008151.9, dated Apr. 20, 2020, 6 pages (3 pages of English Translation and 3 pages of Official Copy).
Office Action received for Chinese Patent Application No. 201680013193.1, dated Mar. 25, 2020, 21 pages (8 pages of English Translation and 13 pages of Official Copy).
Applicant Initiated Interview Summary received for U.S. Appl. No. 16/389,722, dated Jul. 7, 2020, 5 pages.
Notice of Allowance received for U.S. Appl. No. 15/554,204, dated Jul. 13, 2020, 10 pages.
Decision to Grant received for Danish Patent Application No. PA201870385, dated Mar. 26, 2020, 2 pages.
Non-Final Office Action received for U.S. Appl. No. 16/389,722, dated Apr. 3, 2020, 15 pages.
Notice of Acceptance received for Australian Patent Application No. 2018206772, dated Mar. 17, 2020, 3 pages.
Applicant Initiated Interview Summary received for U.S. Appl. No. 16/389,722, dated Feb. 11, 2021, 4 pages.
Applicant-Initiated Interview Summary received for U.S. Appl. No. 16/533,540, dated Dec. 21, 2020, 4 pages.
Decision to Refuse received for European Patent Application No. 17810749.6, dated Jan. 29, 2021, 24 pages.
Final Office Action received for U.S. Appl. No. 16/377,892, dated Jan. 28, 2021, 11 pages.
Final Office Action received for U.S. Appl. No. 16/378,136, dated Jan. 28, 2021, 9 pages.
Final Office Action received for U.S. Appl. No. 16/389,722, dated Dec. 8, 2020, 18 pages.
Minutes of the Oral Proceedings received for European Patent Application No. 17810749.6, dated Jan. 26, 2021, 8 pages.
Non-Final Office Action received for U.S. Appl. No. 16/145,033, dated Feb. 9, 2021, 55 pages.
Notice of Allowance received for Chinese Patent Application No. 201710439448.7, dated Jan. 26, 2021, 2 pages (1 page of English Translation and 1 page of Official Copy).
Notice of Allowance received for Japanese Patent Application No. 2019-151358, dated Jan. 22, 2021, 4 pages (1 page of English Translation and 3 pages of Official Copy).
Office Action received for Australian Patent Application No. 2020204259, dated Nov. 30, 2020, 8 pages.
Office Action received for Australian Patent Application No. 2020204506, dated Dec. 7, 2020, 6 pages.
Office Action received for Chinese Patent Application No. 201780033621.1, dated Dec. 22, 2020, 30 pages (16 pages of English Translation and 14 pages of Official Copy).
Office Action received for European Patent Application No. 16762356.0, dated Dec. 11, 2020, 7 pages.
Office Action received for European Patent Application No. 19724963.4, dated Jul. 28, 2020, 6 pages.
Office Action received for Japanese Patent Application No. 2020-010239, dated Jan. 4, 2021, 6 pages (3 pages of English Translation and 3 pages of Official Copy).
Result of Consultation received for European Patent Application No. 17810749.6, dated Dec. 15, 2020, 3 pages.

(56) References Cited

OTHER PUBLICATIONS

Result of Consultation received for European Patent Application No. 17810749.6, dated Jan. 18, 2021, 3 pages.
Result of Consultation received for European Patent Application No. 17810749.6, dated Jan. 21, 2021, 18 pages.
Summons to Attend Oral Proceedings received for European Patent Application No. 19724963.4, dated Dec. 23, 2020, 8 pages.
Applicant Initiated Interview Summary received for U.S. Appl. No. 15/411,110, dated Nov. 17, 2020, 7 pages.
Applicant Initiated Interview Summary received for U.S. Appl. No. 16/363,945, dated Aug. 13, 2020, 5 pages.
Applicant-Initiated Interview Summary received for U.S. Appl. No. 16/145,033, dated Nov. 24, 2020, 4 pages.
Applicant-Initiated Interview Summary received for U.S. Appl. No. 16/377,892, dated Oct. 13, 2020, 5 pages.
Applicant-Initiated Interview Summary received for U.S. Appl. No. 16/378,136, dated Oct. 13, 2020, 4 pages.
Corrected Notice of Allowance received for U.S. Appl. No. 15/554,204, dated Aug. 19, 2020, 3 pages.
Decision to Refuse received for European Patent Application No. 16804040.0, dated Nov. 4, 2020, 18 pages.
Final Office Action received for U.S. Appl. No. 16/145,033, dated Sep. 22, 2020, 49 pages.
International Preliminary Report on Patentability received for PCT Patent Application No. PCT/US2019/024790, dated Nov. 19, 2020, 11 pages.
International Search Report and Written Opinion received for PCT Patent Application No. PCT/US2020/031528, dated Sep. 23, 2020, 18 pages.
Invitation to Pay Additional Fees received for PCT Patent Application No. PCT/US2020/031528, dated Jul. 30, 2020, 11 pages.
Minutes of the Oral Proceedings received for European Patent Application No. 16804040.0, dated Nov. 2, 2020, 6 pages.
Non-Final Office Action received for U.S. Appl. No. 16/533,540, dated Oct. 23, 2020, 34 pages.
Notice of Allowance received for U.S. Appl. No. 15/614,121, dated Aug. 27, 2020, 8 pages.
Notice of Allowance received for U.S. Appl. No. 16/363,945, dated Sep. 23, 2020, 10 pages.
Office Action received for Australian Patent Application No. 2017277971, dated Aug. 12, 2020, 3 pages.
Office Action received for Chinese Patent Application No. 201680013193.1, dated Sep. 7, 2020, 6 pages (3 pages Of English Translation and 3 pages of Official Copy).
Office Action received for Chinese Patent Application No. 201710439448.7, dated Oct. 10, 2020, 19 pages (8 pages of English Translation and 11 pages of Official Copy).
Office Action received for Chinese Patent Application No. 201811136445.7, dated Oct. 28, 2020, 17 pages (10 pages of English Translation and 7 pages of Official Copy).
Office Action received for European Patent Application No. 19163212.4, dated Oct. 12, 2020, 4 pages.
Office Action received for Japanese Patent Application No. 2019-151358, dated Oct. 2, 2020, 5 pages (2 pages of English Translation and 3 pages of Official Copy).
Office Action received for Korean Patent Application No. 10-2019-7029673, dated Sep. 3, 2020, 9 pages (4 pages of English Translation and 5 pages of Official Copy).
Summons to Attend Oral Proceedings received for European Patent Application No. 17810749.6, dated Aug. 12, 2020, 11 pages.
Advisory Action received for U.S. Appl. No. 16/389,722, dated Mar. 9, 2021, 5 pages.
Notice of Acceptance received for Australian Patent Application No. 2017277971, dated Feb. 17, 2021, 3 pages.

\* cited by examiner 702-a

712
THE SECOND DATA CONNECTION IS A WIRED DATA CONNECTION

714
WHILE A RELATIONSHIP HAS NOT BEEN ESTABLISHED WITH THE PERIPHERAL DISPLAY UNIT

716
RECEIVE A COMMUNICATION FROM THE PERIPHERAL DISPLAY UNIT OVER THE WIRED DATA CONNECTION BETWEEN THE DEVICE AND THE PERIPHERAL DISPLAY UNIT

718
IN RESPONSE TO RECEIVING THE COMMUNICATION, DISPLAY A FIRST USER INTERFACE PROMPTING THE USER TO AUTHORIZE A RELATIONSHIP WITH THE PERIPHERAL DISPLAY UNIT

720
DISPLAY A FIRST OPTION CORRESPONDING TO AUTHORIZING A WIRELESS RELATIONSHIP BETWEEN THE DEVICE AND THE PERIPHERAL DISPLAY UNIT

722
DISPLAY A SECOND OPTION CORRESPONDING TO AUTHORIZING A WIRED RELATIONSHIP BETWEEN THE DEVICE AND THE PERIPHERAL DISPLAY UNIT

724
DISPLAY A THIRD OPTION CORRESPONDING TO AUTHORIZING A CHARGING-ONLY CONNECTION BETWEEN THE DEVICE AND THE PERIPHERAL DISPLAY UNIT

730
THE SECOND DATA CONNECTION IS A WIRELESS DATA CONNECTION

732
WHILE A RELATIONSHIP HAS NOT BEEN ESTABLISHED WITH THE PERIPHERAL DISPLAY UNIT

734
DETECT, VIA ONE OR MORE OF THE FIRST AND SECOND DATA CONNECTIONS, THAT THE PERIPHERAL DISPLAY UNIT IS AVAILABLE FOR THE ESTABLISHMENT OF A RELATIONSHIP

736
IN RESPONSE TO DETECTING THAT THE PERIPHERAL DISPLAY UNIT IS AVAILABLE FOR THE ESTABLISHMENT OF A RELATIONSHIP, DISPLAY A FOURTH OPTION FOR AUTHORIZING A RELATIONSHIP WITH THE PERIPHERAL DISPLAY UNIT

738
THE FOURTH OPTION FOR AUTHORIZING A RELATIONSHIP IS AN ITEM IN A LIST OF BLUETOOTH-CAPABLE DEVICES

740
THE FOURTH OPTION FOR AUTHORIZING A RELATIONSHIP IS AN ITEM IN A LIST OF VEHICLES WITH PERIPHERAL DISPLAY UNITS

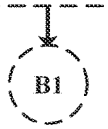

FIG. 7D 702-b

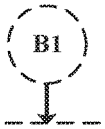

---
742
THE REQUEST FROM A USER TO ESTABLISH A RELATIONSHIP COMPRISES SELECTION OF THE FOURTH OPTION

---
744
DETECT SELECTION OF THE FOURTH OPTION

---
746
IN RESPONSE TO DETECTING SELECTION OF THE FOURTH OPTION, DISPLAY A SECOND USER INTERFACE PROMPTING THE USER TO AUTHORIZE A RELATIONSHIP WITH THE PERIPHERAL DISPLAY UNIT

748
THE SECOND USER INTERFACE COMPRISES A FIFTH OPTION CORRESPONDING TO AUTHORIZING A WIRELESS RELATIONSHIP BETWEEN THE DEVICE AND THE PERIPHERAL DISPLAY UNIT

750
THE SECOND USER INTERFACE COMPRISES A SIXTH OPTION CORRESPONDING TO AUTHORIZING A WIRED RELATIONSHIP BETWEEN THE DEVICE AND THE PERIPHERAL DISPLAY UNIT

---
752
THE REQUEST FROM THE USER TO ESTABLISH A RELATIONSHIP WITH THE PERIPHERAL DISPLAY UNIT COMPRISES SELECTION OF THE FIFTH OPTION

---
754
ESTABLISHING A RELATIONSHIP WITH THE PERIPHERAL DISPLAY UNIT INCLUDES DISPLAYING ON THE DISPLAY OF THE DEVICE A THIRD USER INTERFACE PROMPTING THE USER TO ENTER CREDENTIALS FOR THE WIRELESS DATA CONNECTION

*FIG. 7E*

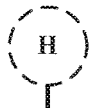

770
THE PERIPHERAL DISPLAY UNIT HAS A DISCOVERABLE STATE AND A NON-DISCOVERABLE STATE, AND THE PERIPHERAL DISPLAY UNIT COMPRISES A HARDWARE BUTTON CONFIGURED TO CAUSE THE PERIPHERAL DISPLAY UNIT TO ENTER THE DISCOVERABLE STATE

772
THE HARDWARE BUTTON IS FURTHER CONFIGURED TO ACTIVATE A NATIVE FUNCTION OF THE PERIPHERAL DISPLAY UNIT UNRELATED TO MAKING THE UNIT DISCOVERABLE

774
THE HARDWARE BUTTON IS FURTHER CONFIGURED TO ACTIVATE A FUNCTION OF THE DEVICE DISTINCT FROM THE NATIVE FUNCTION OF THE PERIPHERAL DISPLAY AND UNRELATED TO MAKING THE PERIPHERAL DISPLAY UNIT DISCOVERABLE

776
A SHORT-PRESS OF THE HARDWARE BUTTON ACTIVATES A NATIVE VOICE RECOGNITION FUNCTION OF THE PERIPHERAL DISPLAY UNIT, AND A LONG-PRESS OF THE HARDWARE BUTTON CAUSES THE PERIPHERAL DISPLAY UNIT TO ENTER THE DISCOVERABLE STATE

778
WHILE A CONNECTION BETWEEN THE DEVICE AND THE PERIPHERAL DISPLAY UNIT OVER THE FIRST DATA CONNECTION IS ACTIVE

780
DETECT A LONG-PRESS OF THE HARDWARE BUTTON

782
IN RESPONSE TO DETECTING THE LONG-PRESS OF THE HARDWARE BUTTON, ACTIVATE THE FUNCTION OF THE DEVICE

784
THE FUNCTION OF THE DEVICE IS A VOICE RECOGNITION FUNCTION

*FIG. 7H*

802
MONITOR BATTERY USAGE OF THE DEVICE, WHEREIN MONITORING BATTERY USAGE OF THE DEVICE INCLUDES MONITORING A CHARGE LEVEL OF ONE OR MORE BATTERIES OF THE DEVICE AND MONITORING BATTERY USAGE PATTERNS OF THE ONE OR MORE BATTERIES OF THE DEVICE

804
THE BATTERY USAGE PATTERNS BEING MONITORED INCLUDE ONE OR MORE OF: BATTERY AMOUNT USED SINCE ACTIVATING A FIRST MODE OF OPERATION, RATE OF BATTERY USAGE SINCE ACTIVATING A MODE OF OPERATION, BATTERY AMOUNT USED SINCE A PAST CONTEXTUAL EVENT, RATE OF BATTERY USAGE SINCE A PAST CONTEXTUAL EVENT, PREDICTED TIME OF THE BATTERY REACHING A PREDETERMINED THRESHOLD LEVEL, AND PREDICTED BATTERY LEVEL BY THE TIME OF A FUTURE CONTEXTUAL EVENT ( A )

806
WHILE MONITORING BATTERY USAGE OF THE DEVICE

808
IN ACCORDANCE WITH A DETERMINATION THAT A CHARGE LEVEL OF THE DEVICE MEETS CHARGE-LEVEL NOTIFICATION CRITERIA, PROVIDE A CHARGE-LEVEL ALERT THAT INDICATES A CURRENT CHARGE LEVEL OF THE ONE OR MORE BATTERIES

810
IN ACCORDANCE WITH A DETERMINATION THAT BATTERY USAGE OF THE DEVICE MEETS BATTERY-USAGE NOTIFICATION CRITERIA DIFFERENT FROM THE CHARGE-LEVEL NOTIFICATION CRITERIA, PROVIDE A BATTERY-USAGE ALERT THAT INDICATES A CURRENT BATTERY USAGE PATTERN ( B )

```
                           924
  THE CONFIGURATION INTERFACE FURTHER COMPRISES A REPRESENTATION OF A SECOND
             USER INTERFACE OF A SECOND PERIPHERAL DISPLAY UNIT
```

```
                              926
         DETECT A SECOND REQUEST TO CONFIGURE THE SECOND USER INTERFACE
```

```
                                928
   IN RESPONSE TO DETECTING THE SECOND REQUEST TO CONFIGURE THE SECOND USER
         INTERFACE, DISPLAY ON THE DISPLAY OF THE DEVICE A SECOND UPDATED
    REPRESENTATION OF THE SECOND USER INTERFACE, WHEREIN THE SECOND UPDATED
   REPRESENTATION IS GENERATED IN ACCORDANCE WITH THE SECOND DETECTED REQUEST

930
        DISPLAYING ON THE DISPLAY OF THE DEVICE THE SECOND UPDATED
    REPRESENTATION OF THE SECOND USER INTERFACE OCCURS WHILE A DATA
    CONNECTION CORRESPONDING TO THE RELATIONSHIP BETWEEN THE DEVICE AND
              THE SECOND PERIPHERAL DISPLAY UNIT IS NOT ACTIVE
```

FIG. 9C

934
AFTER DETECTING THE SECOND REQUEST TO CONFIGURE THE SECOND USER INTERFACE, TRANSMIT INSTRUCTIONS TO THE SECOND PERIPHERAL DISPLAY UNIT TO DISPLAY THE SECOND USER INTERFACE IN ACCORDANCE WITH THE DETECTED REQUEST

936
TRANSMITTING SECOND INSTRUCTIONS TO THE SECOND PERIPHERAL DISPLAY UNIT OCCURS WHEN THE DATA CONNECTION CORRESPONDING TO THE RELATIONSHIP BETWEEN THE DEVICE AND THE SECOND PERIPHERAL DISPLAY UNIT IS ESTABLISHED

938
STORE THE SECOND INSTRUCTIONS IN A MEMORY OF THE DEVICE AT LEAST UNTIL THE DATA CONNECTION CORRESPONDING TO THE RELATIONSHIP BETWEEN THE DEVICE AND THE SECOND PERIPHERAL DISPLAY UNIT IS ESTABLISHED

940
THE FIRST INSTRUCTION AND THE SECOND INSTRUCTION ARE SIMULTANEOUSLY STORED AT THE DEVICE

FIG. 9D 924-f

---
942
THE SECOND USER INTERFACE COMPRISES ONE OR MORE USER INTERFACE OBJECTS DIFFERENT FROM THE FIRST USER INTERFACE

---
944
THE SECOND USER INTERFACE COMPRISES AN ARRANGEMENT OF USER INTERFACE OBJECTS DIFFERENT FROM THE FIRST USER INTERFACE

---
946
THE SECOND PERIPHERAL DISPLAY UNIT HAS ONE OR MORE OF A SCREEN SIZE DIFFERENT FROM THE FIRST PERIPHERAL DISPLAY UNIT, A SCREEN ORIENTATION DIFFERENT FROM THE FIRST PERIPHERAL DISPLAY UNIT, AND A SCREEN RESOLUTION DIFFERENT FROM THE FIRST PERIPHERAL DISPLAY UNIT

---
948
THE CONFIGURATION USER INTERFACE COMPRISES A SECOND SET OF REPRESENTATIONS OF ONE OR MORE USER INTERFACE OBJECTS AVAILABLE TO BE ADDED TO THE SECOND USER INTERFACE, THE SECOND INSTRUCTIONS COMPRISE INSTRUCTIONS FOR ADDING TO THE USER INTERFACE A USER INTERFACE OBJECT CORRESPONDING TO ONE OF THE ONE OR MORE REPRESENTATIONS OF USER INTERFACE OBJECTS FROM THE SECOND SET, THE SECOND REQUEST TO CONFIGURE THE SECOND USER INTERFACE COMPRISES SECOND USER INPUT CORRESPONDING TO A LOCATION OF THE ONE OF THE ONE OR MORE REPRESENTATIONS OF USER INTERFACE OBJECTS FROM THE SECOND SET, AND THE FIRST SET AND THE SECOND SET COMPRISE REPRESENTATIONS OF DIFFERENT USER INTERFACE OBJECTS

*FIG. 9E*

DEVICE, METHOD, AND GRAPHICAL USER INTERFACE FOR ESTABLISHING A RELATIONSHIP AND CONNECTION BETWEEN TWO DEVICES

CROSS-REFERENCE TO RELATED APPLICATIONS

This application is a continuation of U.S. patent application Ser. No. 14/863,069 entitled "Device, method, and graphical user interface for establishing a relationship and connection between two devices," filed on Sep. 23, 2015, which claims priority to U.S. Provisional Patent Application No. 62/111,100, entitled "Device, method, and graphical user interface for establishing a relationship and connection between two devices," filed on Feb. 2, 2015, which are hereby incorporated by reference in their entireties.

This is related to the following applications: U.S. Provisional Patent Application No. 61/832,842, filed Jun. 8, 2013, entitled "Device, Method, and Graphical User Interface for Synchronizing Two or More Displays"; U.S. Provisional Application Ser. No. 61/793,924, filed Mar. 15, 2013, entitled "Voice and Touch User Interface"; U.S. application Ser. No. 13/032,614, filed Feb. 22, 2011, entitled "Pushing a Graphical User Interface to a Remote Device with Display Rules Provided by the Remote Device"; U.S. application Ser. No. 12/683,218, filed Jan. 6, 2010, entitled "Pushing a User interface to a Remote Device"; U.S. application Ser. No. 12/119,960, filed May 13, 2008, entitled "Pushing a User Interface to a Remote Device"; U.S. application Ser. No. 13/175,581, filed Jul. 1, 2011, entitled "Pushing a User Interface to a Remote Device"; U.S. application Ser. No. 13/161,339, filed Jun. 15, 2011, entitled "Pushing a Graphical User Interface to a Remote Device with Display Rules Provided by the Remote Device"; U.S. application Ser. No. 13/250,947, filed Sep. 30, 2011, entitled "Automatically Adapting User Interfaces for Hands-Free Interaction"; U.S. application Ser. No. 12/987,982, filed Jan. 10, 2011, entitled "Intelligent Automated Assistant"; U.S. Provisional Application Ser. No. 61/295,774, filed Jan. 18, 2010, entitled "Intelligent Automated Assistant"; U.S. Provisional Application Ser. No. 61/493,201, filed Jun. 3, 2011, entitled "Generating and Processing Data Items that Represent Tasks to Perform"; U.S. Provisional Application Ser. No. 61/657,744, filed Jun. 9, 2012, entitled "Automatically Adapting User Interface for Hands-Free Interaction"; U.S. application Ser. No. 12/207,316, filed Sep. 9, 2008, entitled "Radio with Personal DJ"; U.S. Provisional Application Ser. No. 61/727,554, filed Nov. 16, 2012, entitled "System and Method for Negotiating Control of a Shared Audio or Visual Resource"; U.S. Application Ser. No. 61/832,818, filed Jun. 8, 2013, entitled "Mapping Application with Several User Interfaces,"; U.S. Provisional Application Ser. No. 61/832,841, filed Jun. 8, 2013, entitled "Device and Method for Generating User Interfaces from a Template,"; U.S. application Ser. No. 13/913,428, filed Jun. 8, 2013, entitled "Application Gateway for Providing Different User Interfaces for Limited Distraction and Non-Limited Distraction Contexts," which applications are incorporated herein by reference in their entireties.

TECHNICAL FIELD

This relates generally to electronic devices, including but not limited to electronic devices that communicate wirelessly with peripheral electronic devices.

BACKGROUND

Users require convenient access to information stored on or accessed through their portable electronic devices in a variety of settings, including the home, the workplace, and in the car. The use of peripheral accessories such as peripheral display units can increase the ease of access to information stored on or accessible through portable electronic devices. For example, users operating motor vehicles may be unable to directly manipulate their portable electronic devices because it is inconvenient, unsafe, or illegal. Accordingly, peripheral display units and interfaces are required.

SUMMARY

Some solutions for connecting portable electronic devices with peripheral display units or peripheral accessories may require cumbersome processes for setting up a connection, including physically connecting the device and the peripheral/accessory and/or manually providing authentication data. Furthermore, reconnecting may be an inconvenient and slow process that requires the user to manually access his portable electronic device. Additionally, some solutions for connections with peripherals/accessories, especially wireless connections, are battery-intensive and can cause a user to inadvertently exhaust the battery of the portable electronic device. Finally, some solutions may provide a rigid, inflexible user interface on peripheral display units that is uniform across all peripherals or is difficult to reconfigure, or may only be configured through the cumbersome interface of the peripheral, if at all. Additionally, some solutions take too long and drain battery unnecessarily.

Accordingly, there is a need for improved methods, devices, and interfaces for easily and quickly establishing a relationship with an accessory/peripheral, and for conveniently reconnecting to the peripheral. Such methods, devices, and interfaces optionally compliment conventional methods for establishing relationships between a portable device and an accessory/peripheral display unit and for reconnecting to said accessory/peripheral in the future. Such methods, devices, and interfaces reduce the cognitive burden on a user and produce a more efficient human-machine interface. In addition, these methods, devices, and interfaces save time and thereby preserve energy, which is of particular importance in battery-operated devices. For peripherals and accessories integrated with motor vehicles, reducing the cognitive burden on a user also improves driver safety.

There is also a need for methods, devices, and interfaces for efficiently and conveniently accessing and understanding information about battery usage, particularly but not exclusively when connected via a connection with peripheral display units. These methods, devices, and interfaces facilitate the ability to access information about the battery-life implications of wireless connections with peripheral display units, including as such relationships relate to predicted user activity such as traveling to a destination. Such methods, devices, and interfaces reduce the cognitive burden on a user and produce a more efficient human-machine interface. In addition, these methods, devices, and interfaces save time and thereby preserve energy, which is of particular importance in battery-operated devices. Furthermore, these methods, devices, and interfaces improve and prolong device functioning by proactively encouraging users to expend battery life wisely and to take actions to preserve battery life.

There is also a need for methods, devices, and interfaces for efficiently and conveniently configuring the user interfaces of one or more accessories or peripherals, including configuring various peripheral interfaces independently of one another, configuring peripheral interfaces through the device (thereby bypassing the cumbersome interface of the peripheral itself), and configuring peripheral interfaces at a time when the device is not connected to the peripheral. Such methods, devices, and interfaces reduce the cognitive burden on a user and produce a more efficient human-machine interface. In addition, these methods, devices, and interfaces save time and thereby preserve energy, which is of particular importance in battery-operated devices. For peripherals and accessories integrated with motor vehicles, reducing the cognitive burden on a user also improves driver safety.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory, and one or more modules, programs, or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

In some embodiments, at an electronic device with one or more processors, a method is performed, comprising: receiving a request from a user to authorize a relationship that corresponds to a connection between the device and the peripheral display unit, wherein the connection is a connection over a first data connection with the peripheral display unit; in response to receiving the request to authorize a relationship, establishing a relationship with the peripheral display unit, wherein establishing the relationship includes receiving authentication information from the peripheral display unit via a second data connection that is different from the first data connection; while a connection between the device and the peripheral display unit over the first data connection is not active: detecting that the peripheral display unit is available for establishment of a connection; and in response to detecting that the peripheral display unit is available for establishment of a connection, establishing a connection between the device and the peripheral display unit, wherein the connection is a connection over the first data connection, and wherein establishing the connection between the device and the peripheral display unit comprises providing the authentication information to the peripheral display unit to establish the connection.

In some embodiments, at an electronic device with one or more processors and memory, a method is performed, comprising: monitoring battery usage of the device, wherein monitoring battery usage of the device includes monitoring a charge level of one or more batteries of the device and monitoring battery usage patterns of the one or more batteries of the device; while monitoring battery usage of the device: in accordance with a determination that a charge level of the device meets charge-level notification criteria, providing a charge-level alert that indicates a current charge level of the one or more batteries; and in accordance with a determination that battery usage of the device meets battery-usage notification criteria different from the charge-level notification criteria, providing a battery-usage alert that indicates a current battery usage pattern.

In some embodiments, at a portable electronic device having a display and a communication interface, a method is performed, comprising: displaying on the display of the device a configuration interface, wherein the configuration interface comprises a representation of a user interface of a peripheral display unit; detecting a request to configure the user interface of the peripheral display unit; in response to detecting the request to configure the user interface, displaying on the display of the device an updated representation of the user interface, wherein the updated representation is generated in accordance with the detected request; and after detecting the request to configure the user interface of the peripheral display unit, transmitting instructions to the peripheral display unit to display the user interface generated in accordance with the detected request.

In some embodiments, an electronic device includes a processing unit configured to: receive a request from a user to authorize a relationship that corresponds to a connection between the device and the peripheral display unit over a first data connection with the peripheral display unit; and in response to receiving the request to authorize a relationship, establish a relationship with the peripheral display unit, wherein establishing the relationship includes enabling receiving authentication information from the peripheral display unit via a second data connection that is different from the first data connection. The processing unit is further configured to, while a connection between the device and the peripheral display unit over the first data connection is not active: detect that the peripheral display unit is available for establishment of a connection; and in response to detecting that the peripheral display unit is available for establishment of a connection, establish a connection between the device and the peripheral display unit, wherein the connection is a connection over the first data connection, and wherein establishing the connection between the device and the peripheral display unit comprises enabling providing the authentication information to the peripheral display unit to establish the connection.

In some embodiments, an electronic device includes a processing unit configured to: monitor battery usage of the device, wherein monitoring battery usage of the device includes monitoring a charge level of one or more batteries of the device and monitoring battery usage patterns of the one or more batteries of the device; and, while monitoring battery usage of the device, in accordance with a determination that a charge level of the device meets charge-level notification criteria, enable providing a charge-level alert that indicates a current charge level of the one or more batteries; and, in accordance with a determination that battery usage of the device meets battery-usage notification criteria different from the charge-level notification criteria, enable providing a battery-usage alert that indicates a current battery usage pattern.

In some embodiments, an electronic device includes a display unit configured to display a graphical user interface, a communication unit configured to send data to a peripheral display unit, and a processing unit configured to: enable displaying on the display unit of the device a configuration interface, wherein the configuration interface comprises a representation of a user interface of a peripheral display unit; detect a request to configure the user interface of the peripheral display unit; in response to detecting the request to configure the user interface, enable displaying on the display unit of the device an updated representation of the user interface, wherein the updated representation is generated in accordance with the detected request. The processing unit is further configured to, after detecting the request to configure the user interface of the peripheral display unit, enable transmitting instructions to the peripheral display unit to display the user interface generated in accordance with the detected request.

In some embodiments, a non-transitory computer readable storage medium stores one or more programs, the one or more programs comprising instructions, which when executed by a portable multifunction device, cause the device to: receive a request from a user to authorize a relationship that corresponds to a connection between the device and a peripheral display unit, wherein the connection is a connection over a first data connection with the peripheral display unit; in response to receiving the request to authorize a relationship, establish a relationship with the peripheral display unit, wherein establishing the relationship includes receiving authentication information from the peripheral display unit via a second data connection that is different from the first data connection; and while a connection between the device and the peripheral display unit over the first data connection is not active: detect that the peripheral display unit is available for establishment of a connection; and in response to detecting that the peripheral display unit is available for establishment of a connection, establish a connection between the device and the peripheral display unit, wherein the connection is a connection over the first data connection, and wherein establishing the connection between the device and the peripheral display unit comprises providing the authentication information to the peripheral display unit to establish the connection.

In some embodiments, a non-transitory computer readable storage medium stores one or more programs, the one or more programs comprising instructions, which when executed by a portable multifunction device, cause the device to: monitor battery usage of the device, wherein monitoring battery usage of the device includes monitoring a charge level of one or more batteries of the device and monitoring battery usage patterns of the one or more batteries of the device; and while monitoring battery usage of the device: in accordance with a determination that a charge level of the device meets charge-level notification criteria, provide a charge-level alert that indicates a current charge level of the one or more batteries; and in accordance with a determination that battery usage of the device meets battery-usage notification criteria different from the charge-level notification criteria, provide a battery-usage alert that indicates a current battery usage pattern.

In some embodiments, a non-transitory computer readable storage medium stores one or more programs, the one or more programs comprising instructions, which when executed by a portable multifunction device with a display, cause the device to: display on the display of the device a configuration interface, wherein the configuration interface comprises a representation of a user interface of a peripheral display unit; detect a request to configure the user interface of the peripheral display unit; in response to detecting the request to configure the user interface, display on the display of the device an updated representation of the user interface, wherein the updated representation is generated in accordance with the detected request; and after detecting the request to configure the user interface of the peripheral display unit, transmit instructions to the peripheral display unit to display the user interface generated in accordance with the detected request.

In some embodiments, a transitory computer readable storage medium stores one or more programs, the one or more programs comprising instructions, which when executed by a portable multifunction device, cause the device to: receive a request from a user to authorize a relationship that corresponds to a connection between the device and a peripheral display unit, wherein the connection is a connection over a first data connection with the peripheral display unit; in response to receiving the request to authorize a relationship, establish a relationship with the peripheral display unit, wherein establishing the relationship includes receiving authentication information from the peripheral display unit via a second data connection that is different from the first data connection; and while a connection between the device and the peripheral display unit over the first data connection is not active: detect that the peripheral display unit is available for establishment of a connection; and in response to detecting that the peripheral display unit is available for establishment of a connection, establish a connection between the device and the peripheral display unit, wherein the connection is a connection over the first data connection, and wherein establishing the connection between the device and the peripheral display unit comprises providing the authentication information to the peripheral display unit to establish the connection.

In some embodiments, a transitory computer readable storage medium stores one or more programs, the one or more programs comprising instructions, which when executed by a portable multifunction device, cause the device to: monitor battery usage of the device, wherein monitoring battery usage of the device includes monitoring a charge level of one or more batteries of the device and monitoring battery usage patterns of the one or more batteries of the device; and while monitoring battery usage of the device: in accordance with a determination that a charge level of the device meets charge-level notification criteria, provide a charge-level alert that indicates a current charge level of the one or more batteries; and in accordance with a determination that battery usage of the device meets battery-usage notification criteria different from the charge-level notification criteria, provide a battery-usage alert that indicates a current battery usage pattern.

In some embodiments, a transitory computer readable storage medium stores one or more programs, the one or more programs comprising instructions, which when executed by a portable multifunction device with a display, cause the device to: display on the display of the device a configuration interface, wherein the configuration interface comprises a representation of a user interface of a peripheral display unit; detect a request to configure the user interface of the peripheral display unit; in response to detecting the request to configure the user interface display on the display of the device an updated representation of the user interface, wherein the updated representation is generated in accordance with the detected request; and after detecting the request to configure the user interface of the peripheral display unit, transmit instructions to the peripheral display unit to display the user interface generated in accordance with the detected request.

In some embodiments, a device comprises: one or more processors; and memory storing instructions that, when executed by the one or more processors, cause the device to: receive a request from a user to authorize a relationship that corresponds to a connection between the device and a peripheral display unit, wherein the connection is a connection over a first data connection with the peripheral display unit; in response to receiving the request to authorize a relationship, establish a relationship with the peripheral display unit, wherein establishing the relationship includes receiving authentication information from the peripheral display unit via a second data connection that is different from the first data connection; and while a connection between the device and the peripheral display unit over the first data connection is not active: detect that the peripheral display unit is available for establishment of a connection; and in response to detecting that the peripheral display unit is available for establishment of a connection, establish a connection between the device and the peripheral display unit, wherein the connection is a connection over the first data connection, and wherein establishing the connection between the device and the peripheral display unit comprises providing the authentication information to the peripheral display unit to establish the connection.

In some embodiments, a device comprises: one or more processors; and memory storing instructions that, when executed by the one or more processors, cause the device to: monitor battery usage of the device, wherein monitoring battery usage of the device includes monitoring a charge level of one or more batteries of the device and monitoring battery usage patterns of the one or more batteries of the device; and while monitoring battery usage of the device: in accordance with a determination that a charge level of the device meets charge-level notification criteria, provide a charge-level alert that indicates a current charge level of the one or more batteries; and in accordance with a determination that battery usage of the device meets battery-usage notification criteria different from the charge-level notification criteria, provide a battery-usage alert that indicates a current battery usage pattern.

In some embodiments, a device comprises: a display; one or more processors; and memory storing instructions that when executed by the one or more processors, cause the device to: display on the display of the device a configuration interface, wherein the configuration interface comprises a representation of a user interface of a peripheral display unit; detect a request to configure the user interface of the peripheral display unit; in response to detecting the request to configure the user interface, display on the display of the device an updated representation of the user interface, wherein the updated representation is generated in accordance with the detected request; and after detecting the request to configure the user interface of the peripheral display unit, transmit instructions to the peripheral display unit to display the user interface generated in accordance with the detected request.

In some embodiments, a device comprising: means for receiving a request from a user to authorize a relationship that corresponds to a connection between the device and a peripheral display unit, wherein the connection is a connection over a first data connection with the peripheral display unit; means for, in response to receiving the request to authorize a relationship, establishing a relationship with the peripheral display unit, wherein establishing the relationship includes receiving authentication information from the peripheral display unit via a second data connection that is different from the first data connection; and means for, while a connection between the device and the peripheral display unit over the first data connection is not active: detecting that the peripheral display unit is available for establishment of a connection; and in response to detecting that the peripheral display unit is available for establishment of a connection, establishing a connection between the device and the peripheral display unit, wherein the connection is a connection over the first data connection, and wherein establishing the connection between the device and the peripheral display unit comprises providing the authentication information to the peripheral display unit to establish the connection.

In some embodiments, a device comprises: means for monitoring battery usage of the device, wherein monitoring battery usage of the device includes monitoring a charge level of one or more batteries of the device and monitoring battery usage patterns of the one or more batteries of the device; and means for, while monitoring battery usage of the device: in accordance with a determination that a charge level of the device meets charge-level notification criteria, providing a charge-level alert that indicates a current charge level of the one or more batteries; and in accordance with a determination that battery usage of the device meets battery-usage notification criteria different from the charge-level notification criteria, providing a battery-usage alert that indicates a current battery usage pattern.

In some embodiments, a device comprises: means for displaying on the display of the device a configuration interface, wherein the configuration interface comprises a representation of a user interface of a peripheral display unit; means for detecting a request to configure the user interface of the peripheral display unit; means for, in response to detecting the request to configure the user interface, displaying on the display of the device an updated representation of the user interface, wherein the updated representation is generated in accordance with the detected request; and means for, after detecting the request to configure the user interface of the peripheral display unit, transmitting instructions to the peripheral display unit to display the user interface generated in accordance with the detected request.

Thus, in some embodiments, electronic devices with displays are provided with more efficient methods and interfaces for establishing and operating a relationship and connection between an electronic device and a peripheral display unit, for monitoring battery usage patterns of connected devices, and for configuring user interfaces of peripheral display units. The effectiveness, efficiency, and user satisfaction with such devices may thereby be increased. Such methods and interfaces can optionally complement or replace conventional methods.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 7A-7H are flow diagrams illustrating methods of establishing and operating a data connection between a device and a peripheral display unit in accordance with some embodiments.

FIGS. 8A-8D are flow diagrams illustrating methods of monitoring battery-usage patterns and providing battery-usage alerts in accordance with some embodiments.

FIGS. 9A-9E are flow diagrams illustrating methods of configuring a user interface of a peripheral display unit in accordance with some embodiments.

DESCRIPTION OF EMBODIMENTS

There is a need for improved devices, methods, and computer-readable media for establishing and operating a connection between an electronic device and a peripheral display unit. The embodiments described herein improve on current methods by allowing for efficient, convenient, fast, and intuitive ways to establish a relationship between a device and a peripheral display unit, establish and reestablish a data connection between a device and a peripheral display unit, display charge level notifications and battery-usage notifications that are useful when a device is connected with a peripheral display unit, and configure the interface of a peripheral display unit from a device, among other functions and features.

Figure 2:
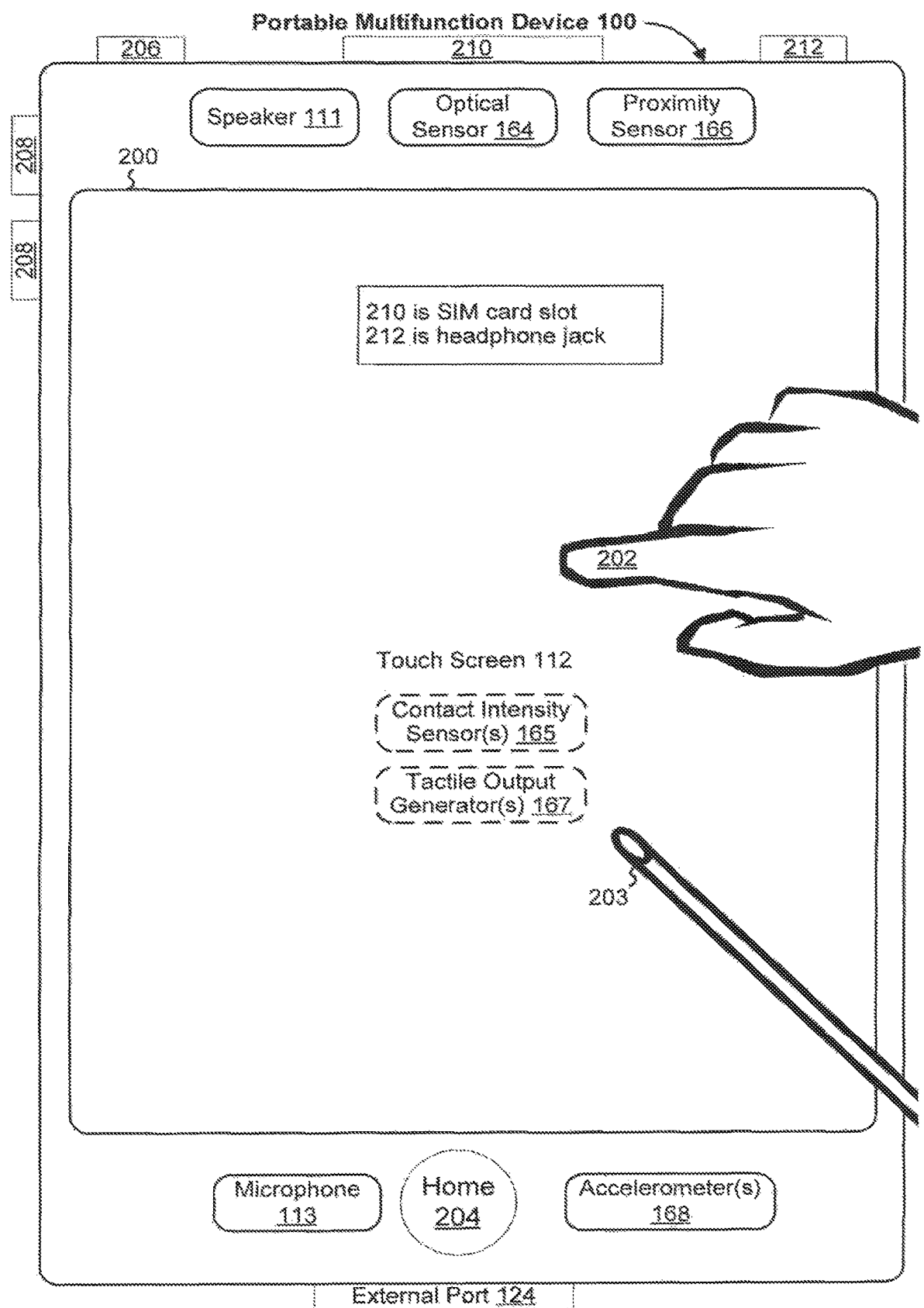
FIG. 2 illustrates a portable multifunction device having a touch screen in accordance with some embodiments.
Figure 3:
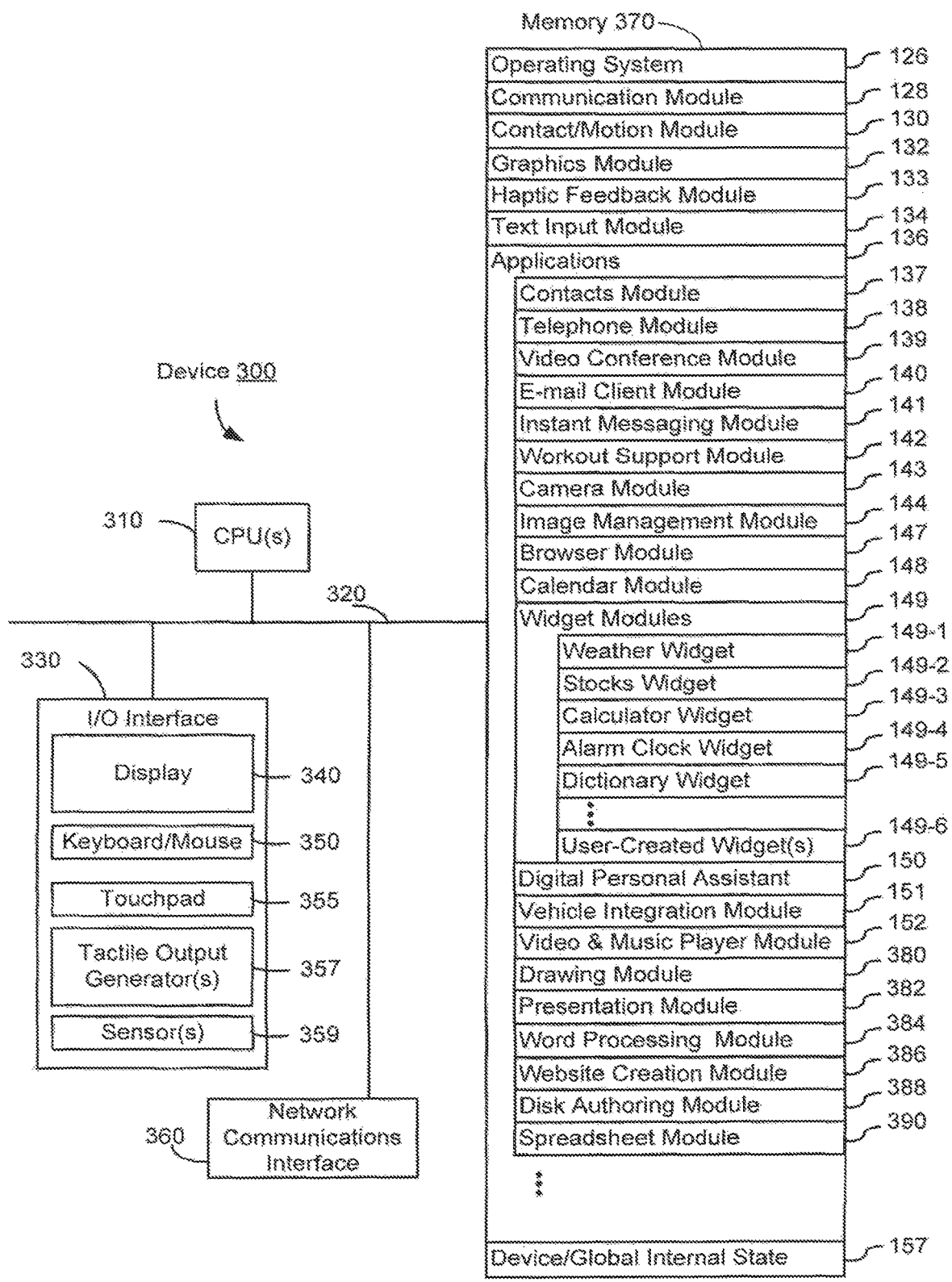
FIG. 3 is a block diagram of an exemplary multifunction device with a display and a touch-sensitive surface in accordance with some embodiments.
Figure 4A:
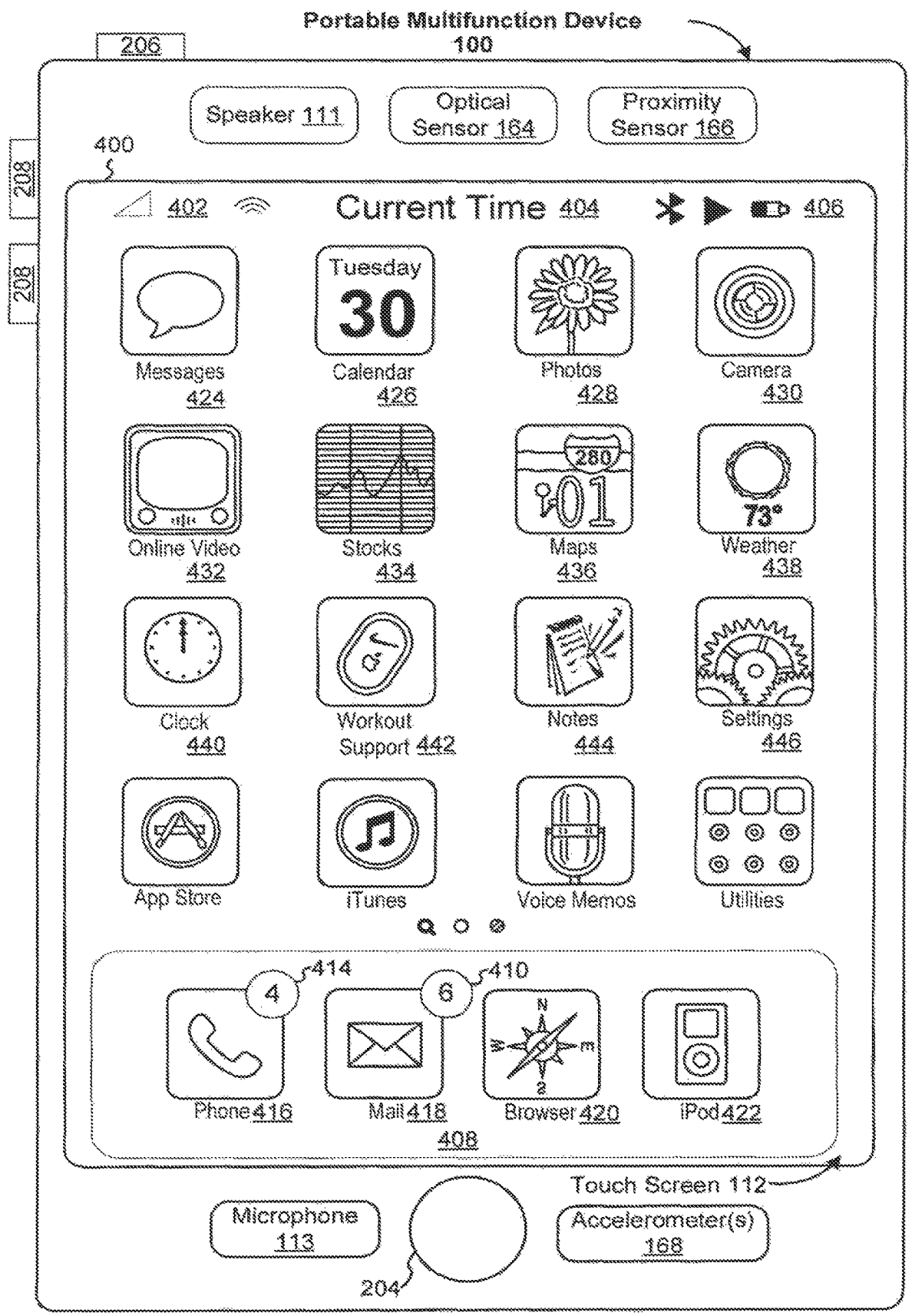
FIG. 4A illustrates an exemplary user interface for a menu of applications on a portable multifunction device in accordance with some embodiments.
Figure 4B:
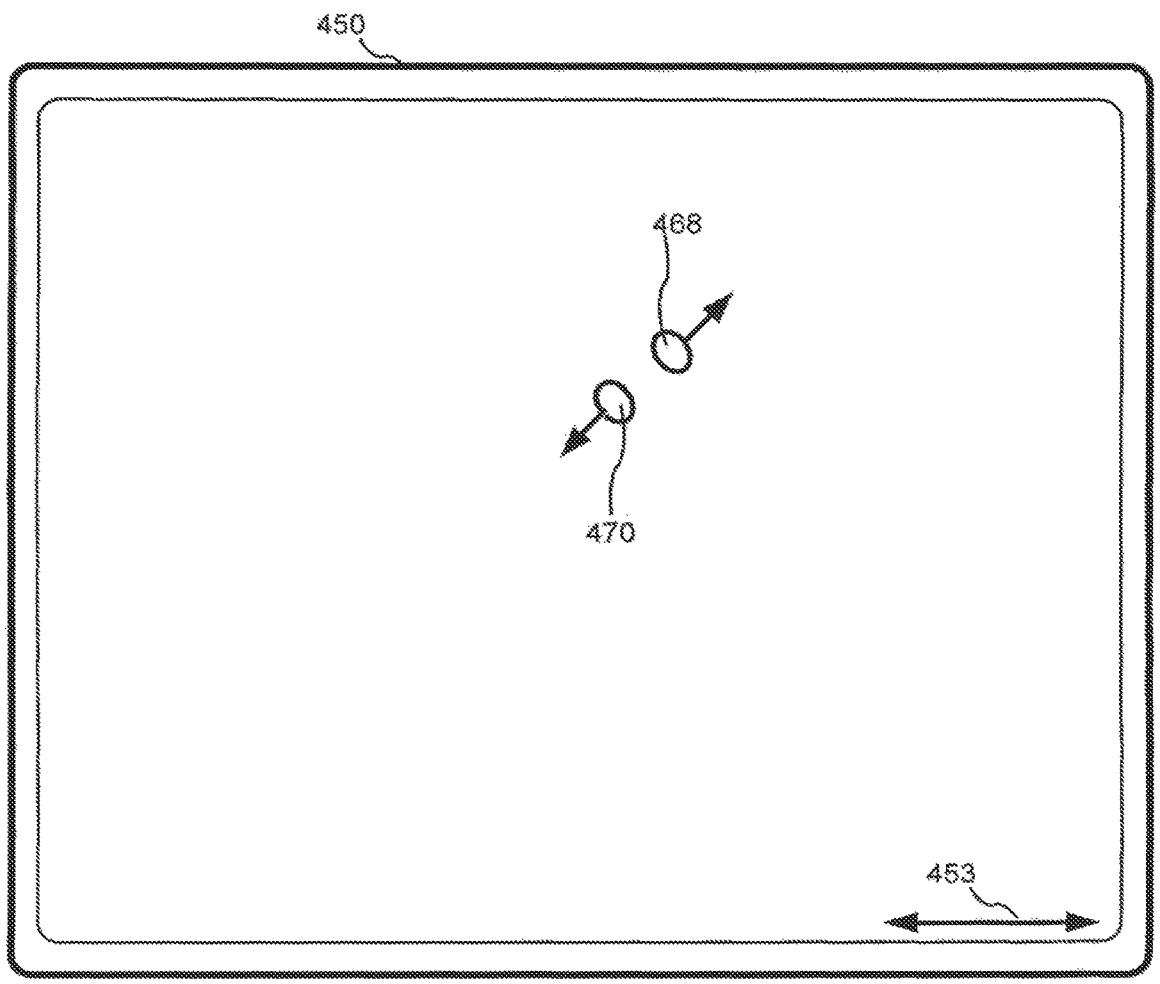
FIG. 4B illustrates an exemplary user interface for a multifunction device with a touch-sensitive surface that is separate from the display in accordance with some embodiments.
Figure 4B:
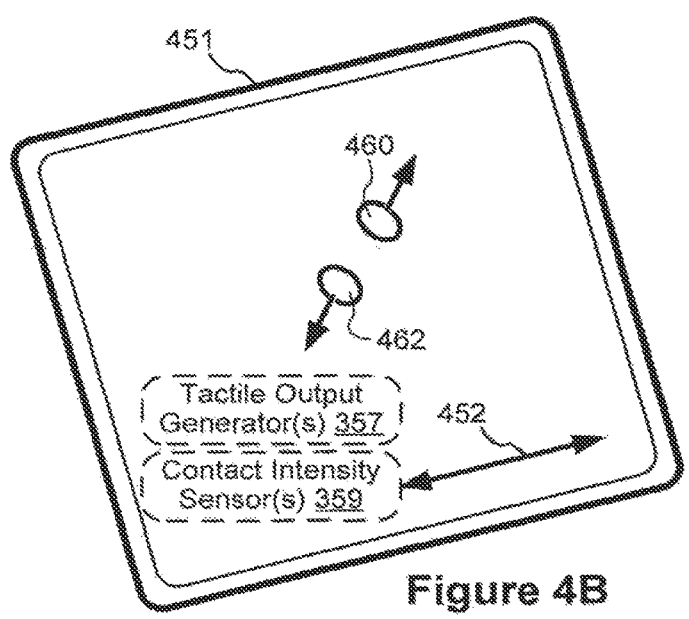
Figure 5A:
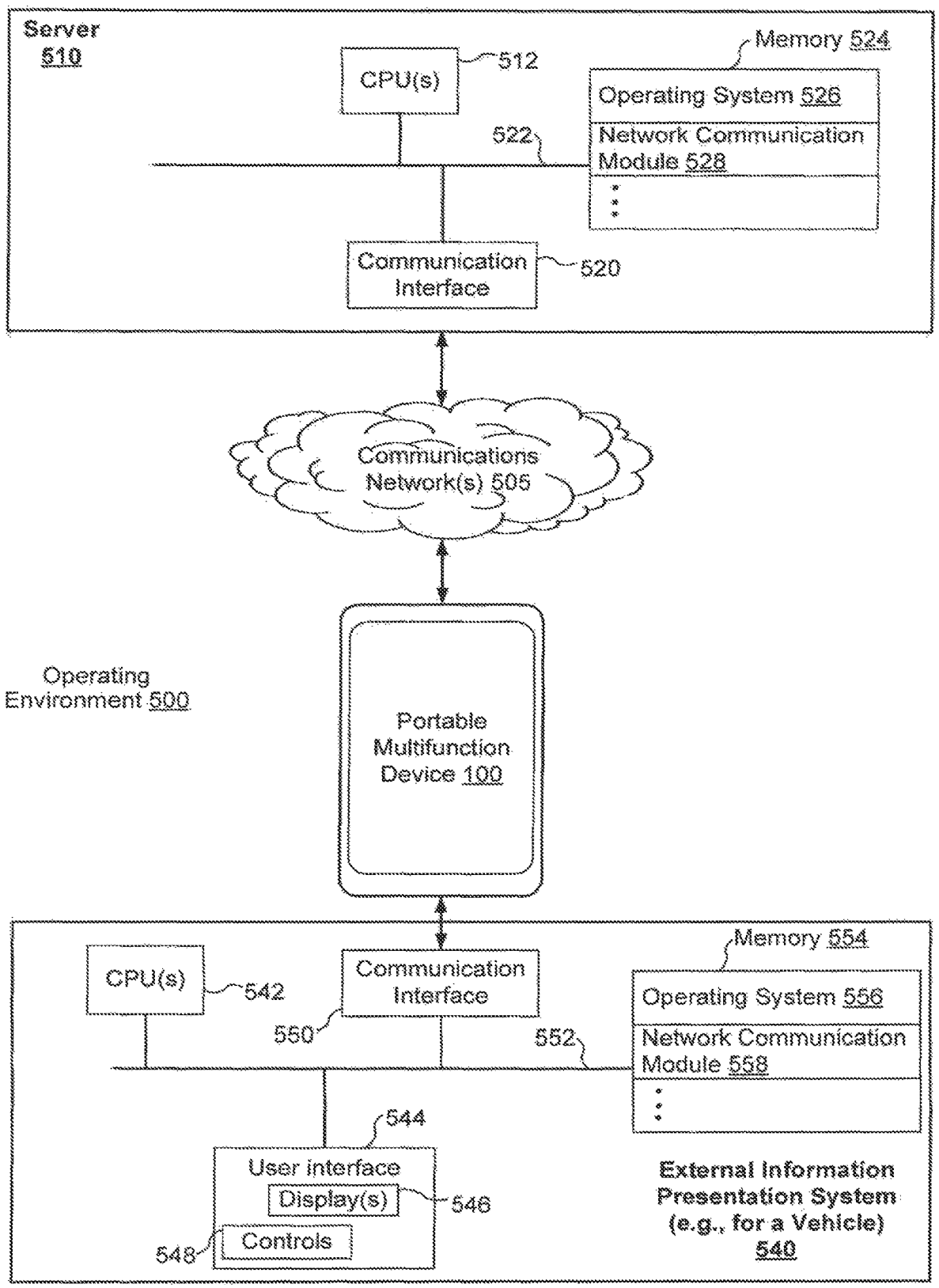
FIG. 5A is a block diagram illustrating an operating environment in which a portable multifunction device communicates with an external presentation system (e.g., peripheral display unit) and/or server in accordance with some embodiments.
Figure 5B:
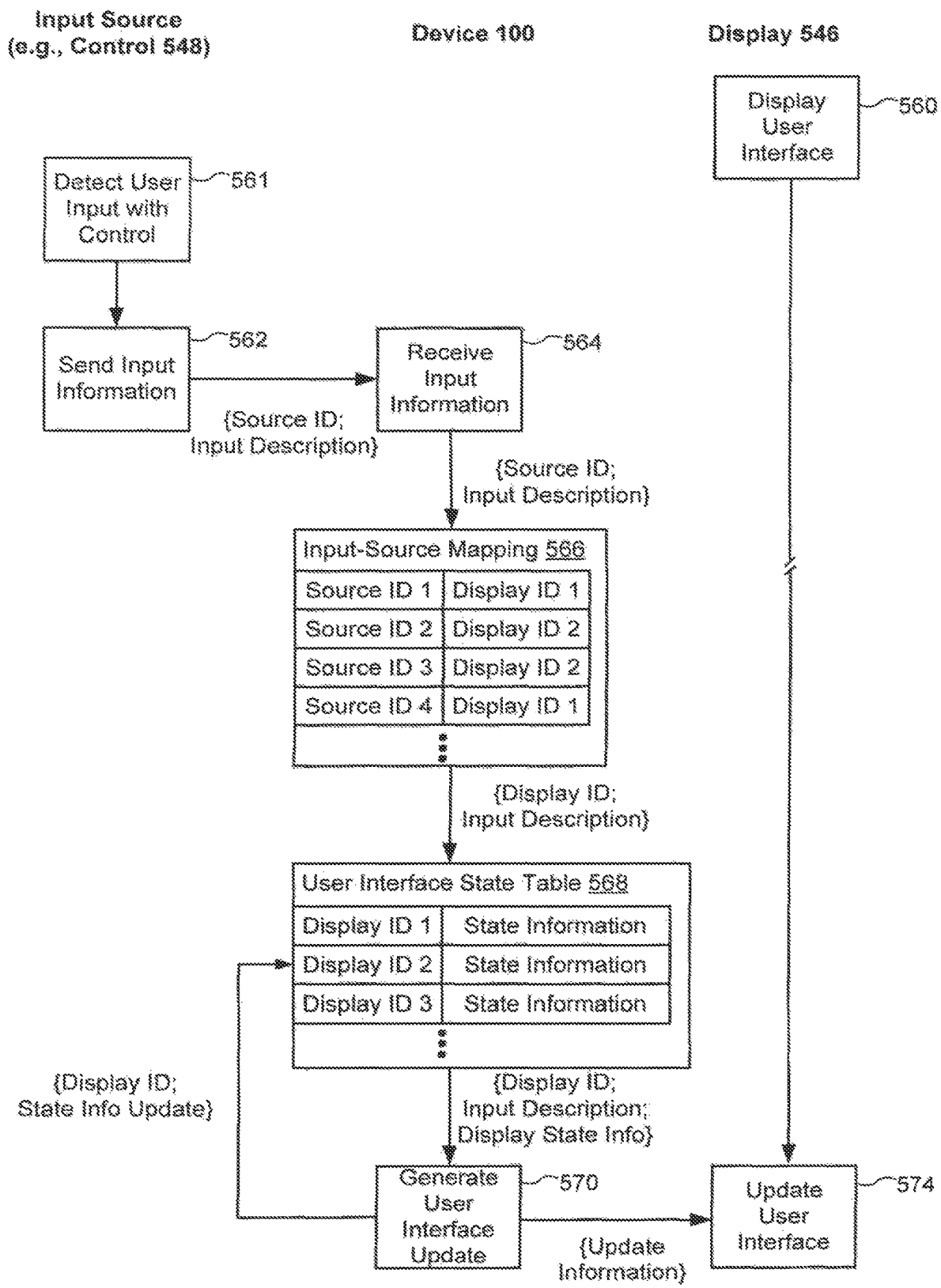
FIG. 5B is a flow diagram illustrating a method of sending update information to an affected display in accordance with some embodiments.
Figure 6A:
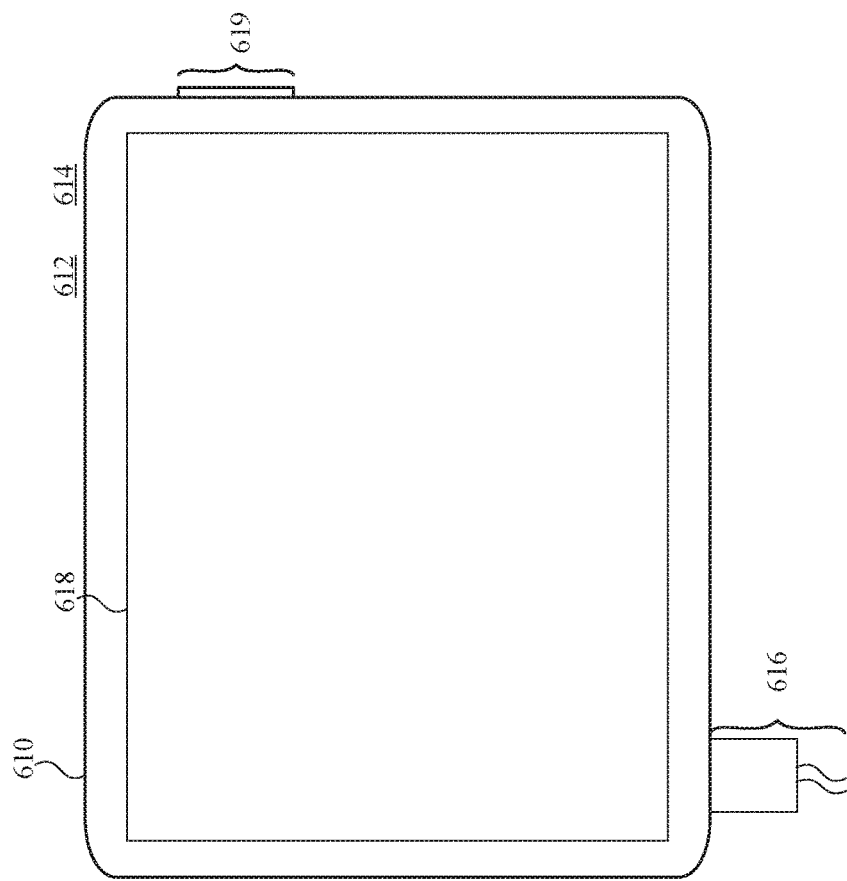
FIGS. 6A-6I illustrate user interfaces for establishing and operating a wireless data connection between a device and a peripheral display unit in accordance with some embodiments.
Figure 6A:
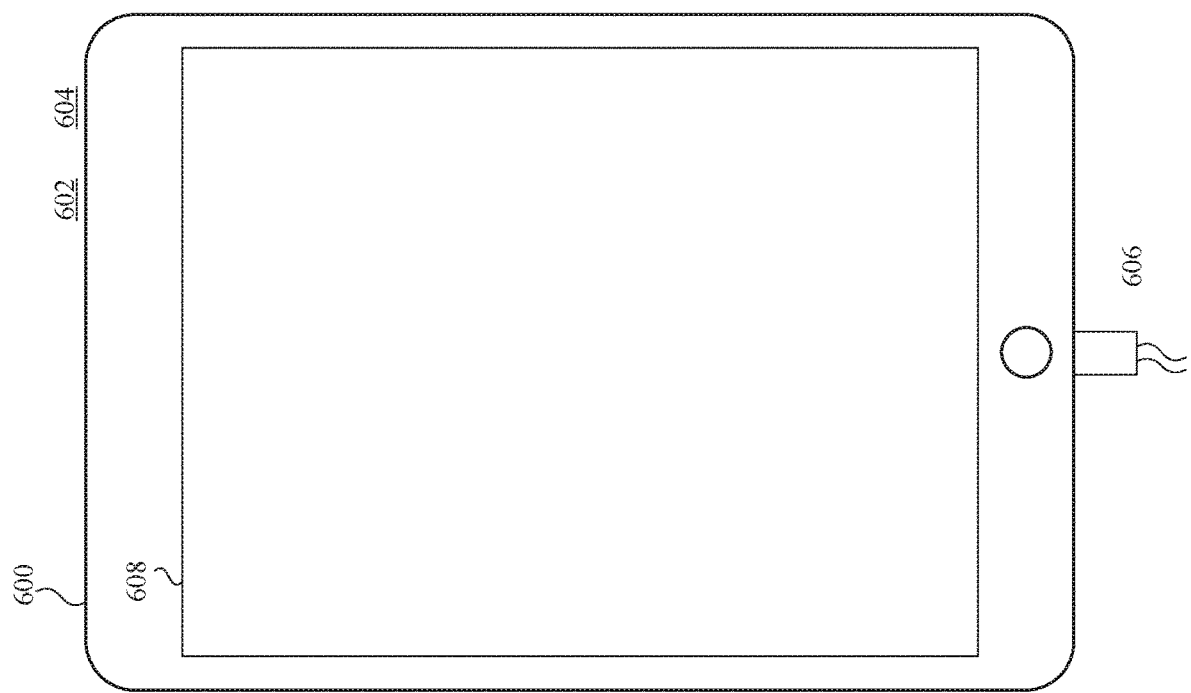
Figure 6B:
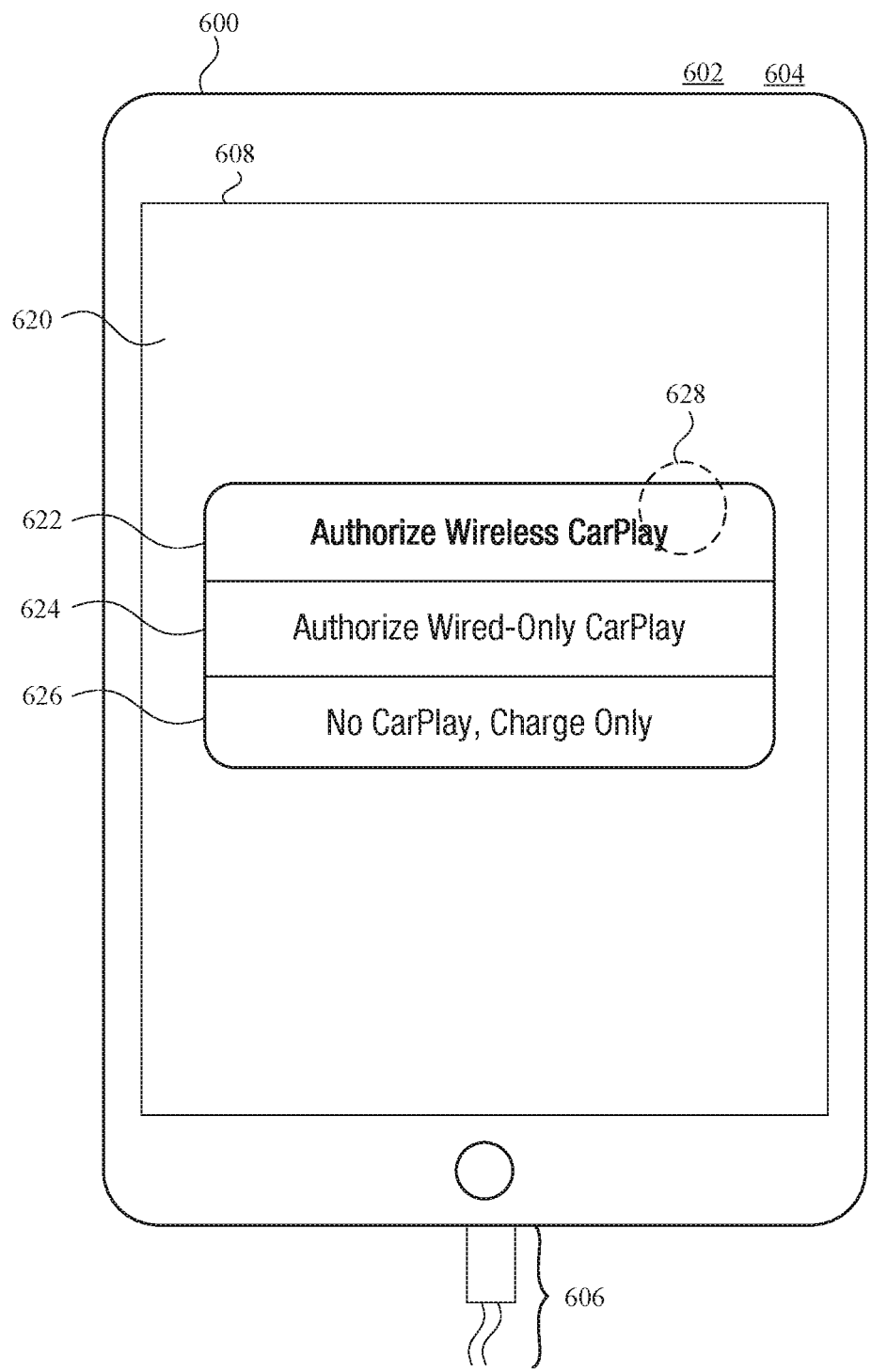
Figure 10:
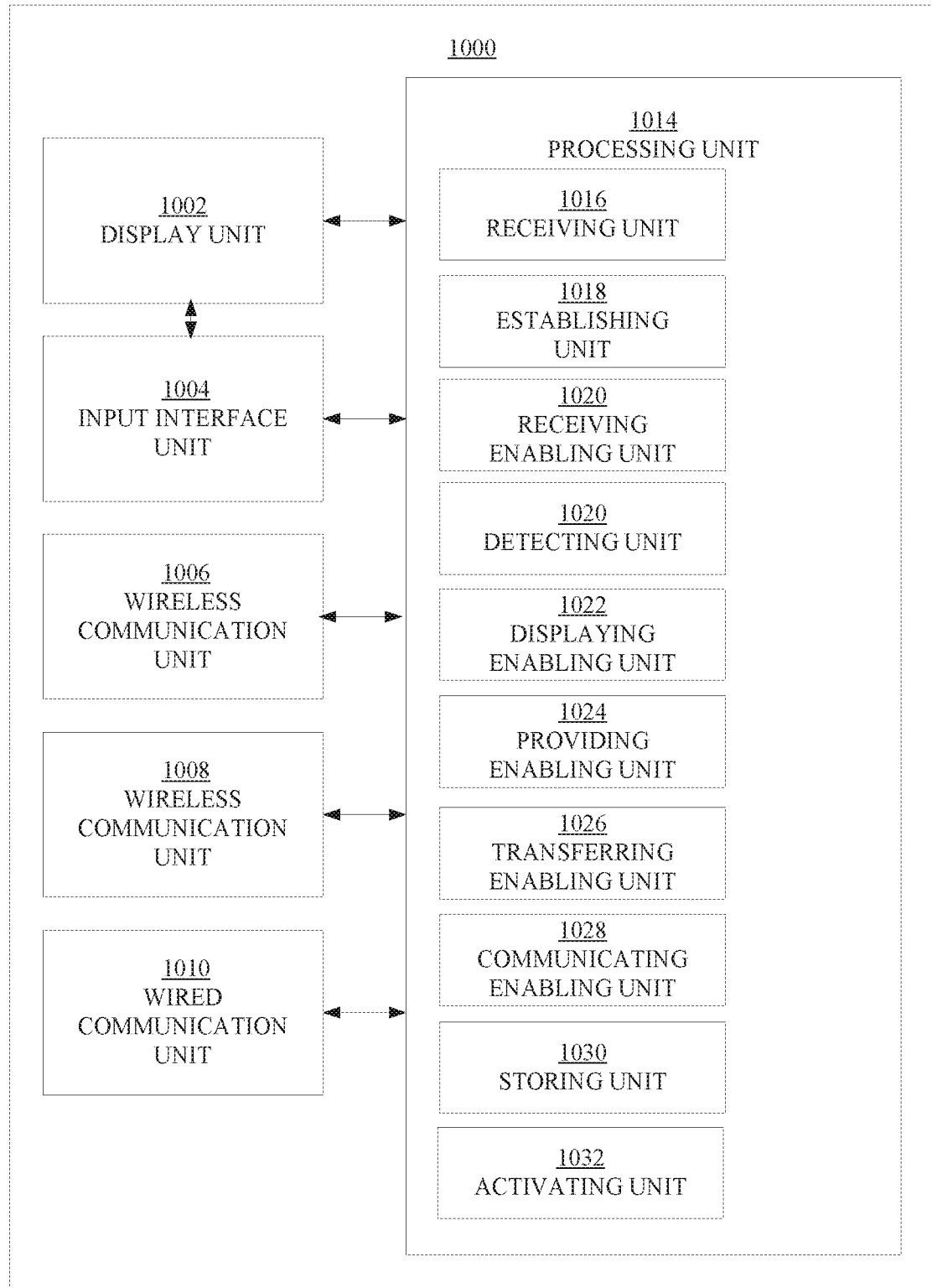
FIG. 10 is a functional block diagram of an electronic device in accordance with some embodiments.
Figure 11:
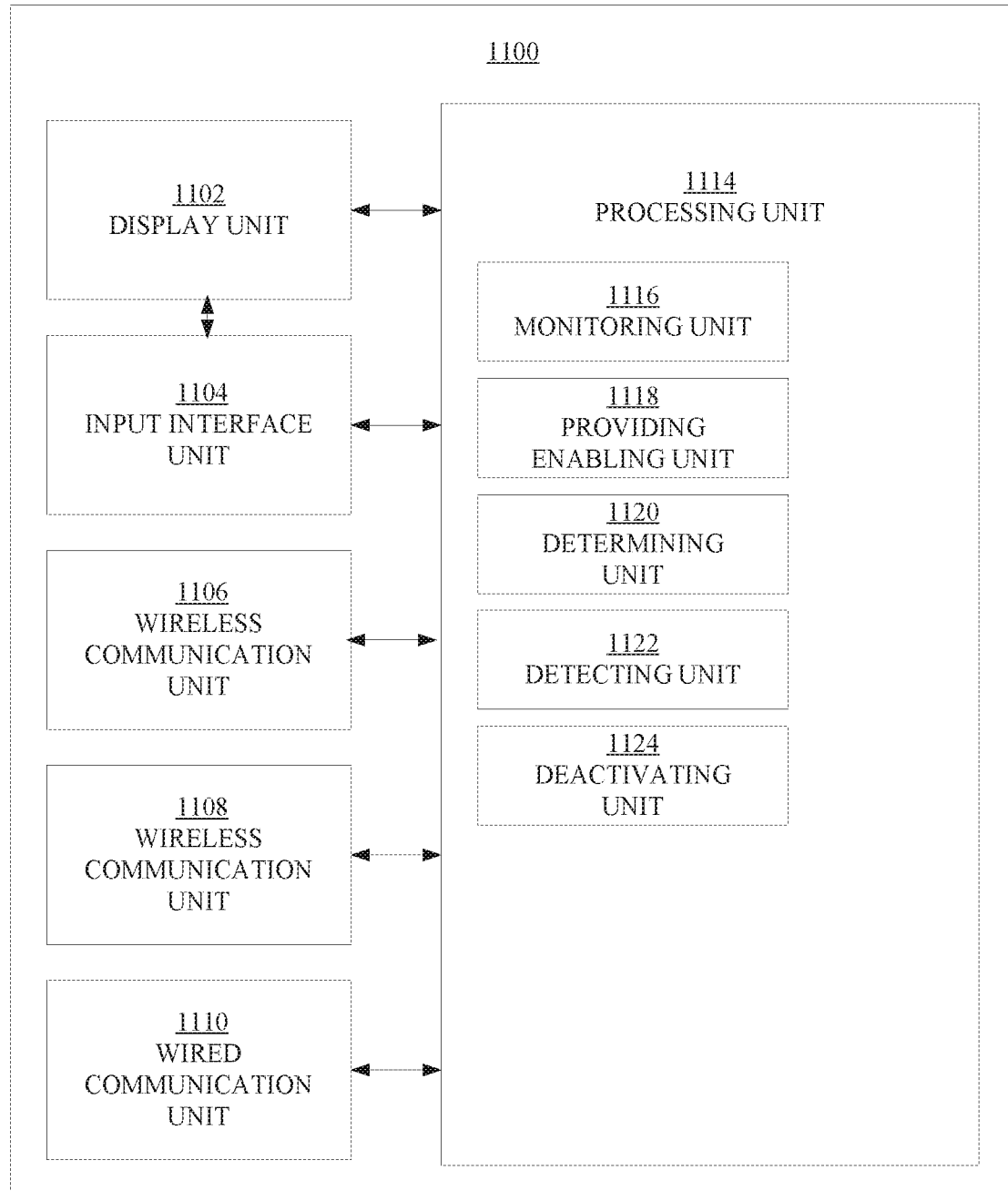
FIG. 11 is a functional block diagram of an electronic device in accordance with some embodiments.
Figure 12:
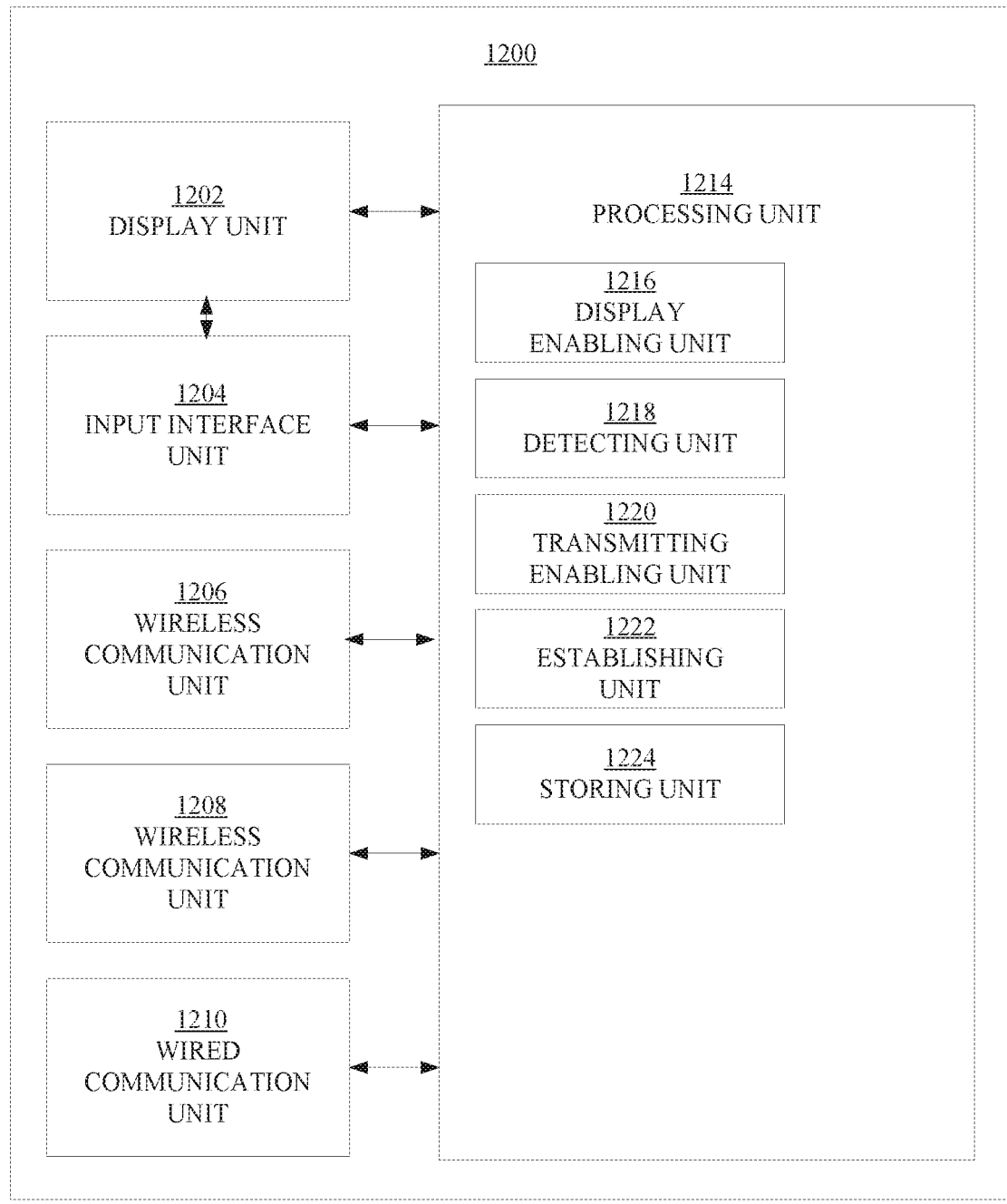
FIG. 12 is a functional block diagram of an electronic device in accordance with some embodiments.

Below, FIGS. 1A-1B, 2, and 3 provide a description of exemplary devices. FIGS. 4A-4B illustrate exemplary user interfaces. FIG. 5A illustrates an exemplary operating environment. FIG. 5B illustrates a flow diagram illustrating an exemplary method. FIGS. 6A-6W illustrate exemplary user interfaces. FIGS. 7A-7H, 8A-8D, and 9A-9E are flow diagrams illustrating exemplary methods. FIGS. 10, 11, and 12 are a functional block diagrams illustrating exemplary devices. The user interfaces in FIGS. 6A-6W are used to illustrate the processes in FIGS. 7A-7H, 8A-81D, and 9A-9E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can optionally be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or 'upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Examples of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
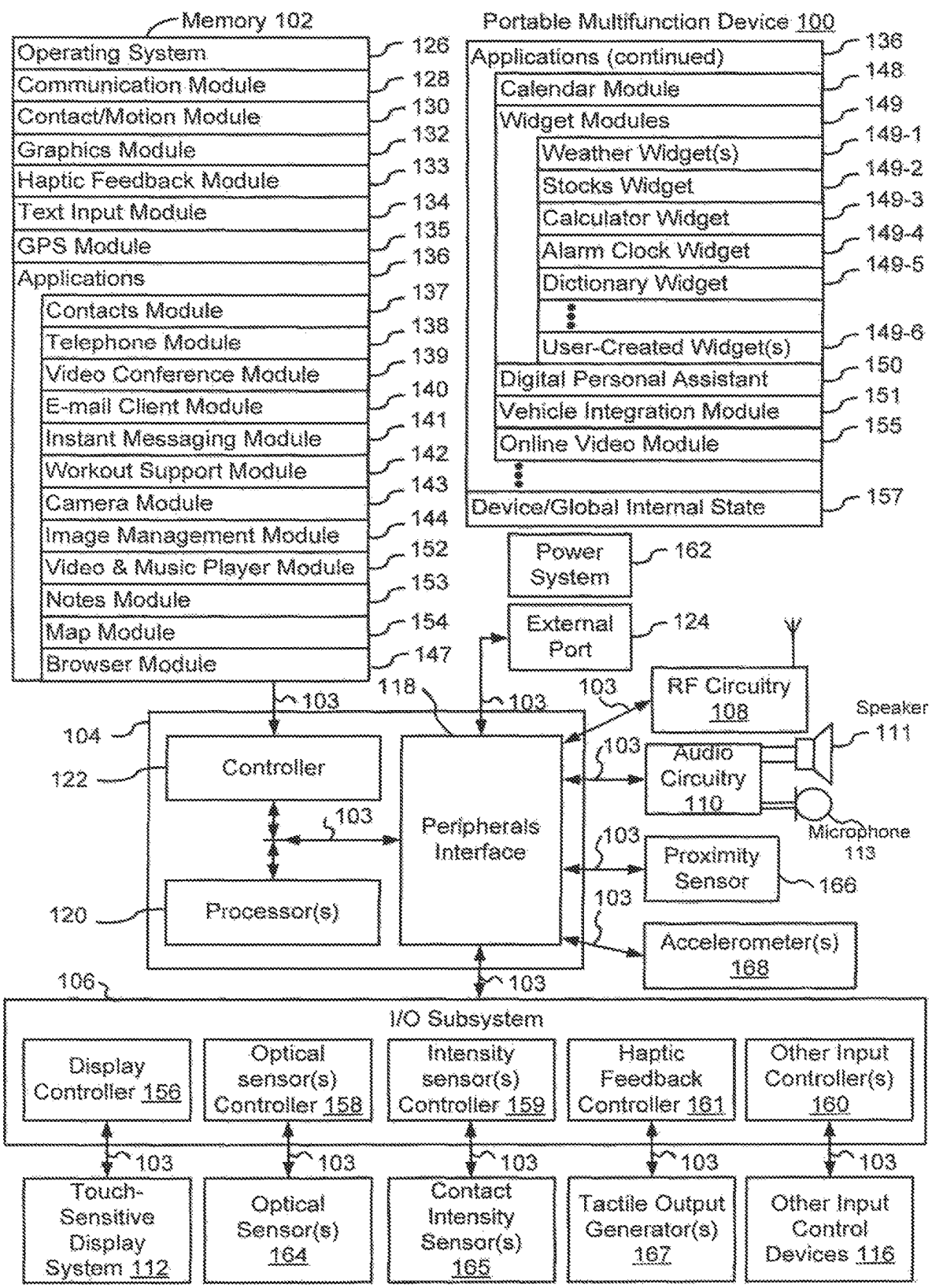
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA. (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for instant Messaging and Presence Leveraging Extensions (SIMPLE), instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an example, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for video conferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface. Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100 opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module (or set of instructions) 128, contact motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices. In some embodiments, the external port is a multi-pin (e.g., 8-pin) connector that is the same as, or similar to and/or compatible with the 8-pin connector (e.g., Lightning connector) used on iPhone and iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132 provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  digital personal assistant module 150;
  vehicle integration module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, video conferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions, conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (e.g., using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or vide (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!® Widgets).

In conjunction with RF circuitry 108, audio circuitry 110, speaker 111, microphone 113, touch screen 112, display controller 156, contact module 130, graphics module 132, and text input module 134, digital personal assistant module 150 records voice commands and sends information representative of the recorded voice commands to a server such as server 510 in FIG. 5A for analysis, and responds to the voice commands based on a response from the server.

Vehicle integration module 151 includes executable instructions for one or more intermediation processes that control a vehicle information display system in a vehicle (e.g., a car, a truck, a van, etc.) that provides a user interface on a respective display of the vehicle information display system (e.g., display 546 of peripheral display unit 540 in FIG. 5A), such as for a mapping application or a music application. The vehicle integration application converts information from third-party applications into content for display by the vehicle integration application on the respective display of the vehicle information display system.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise playback videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
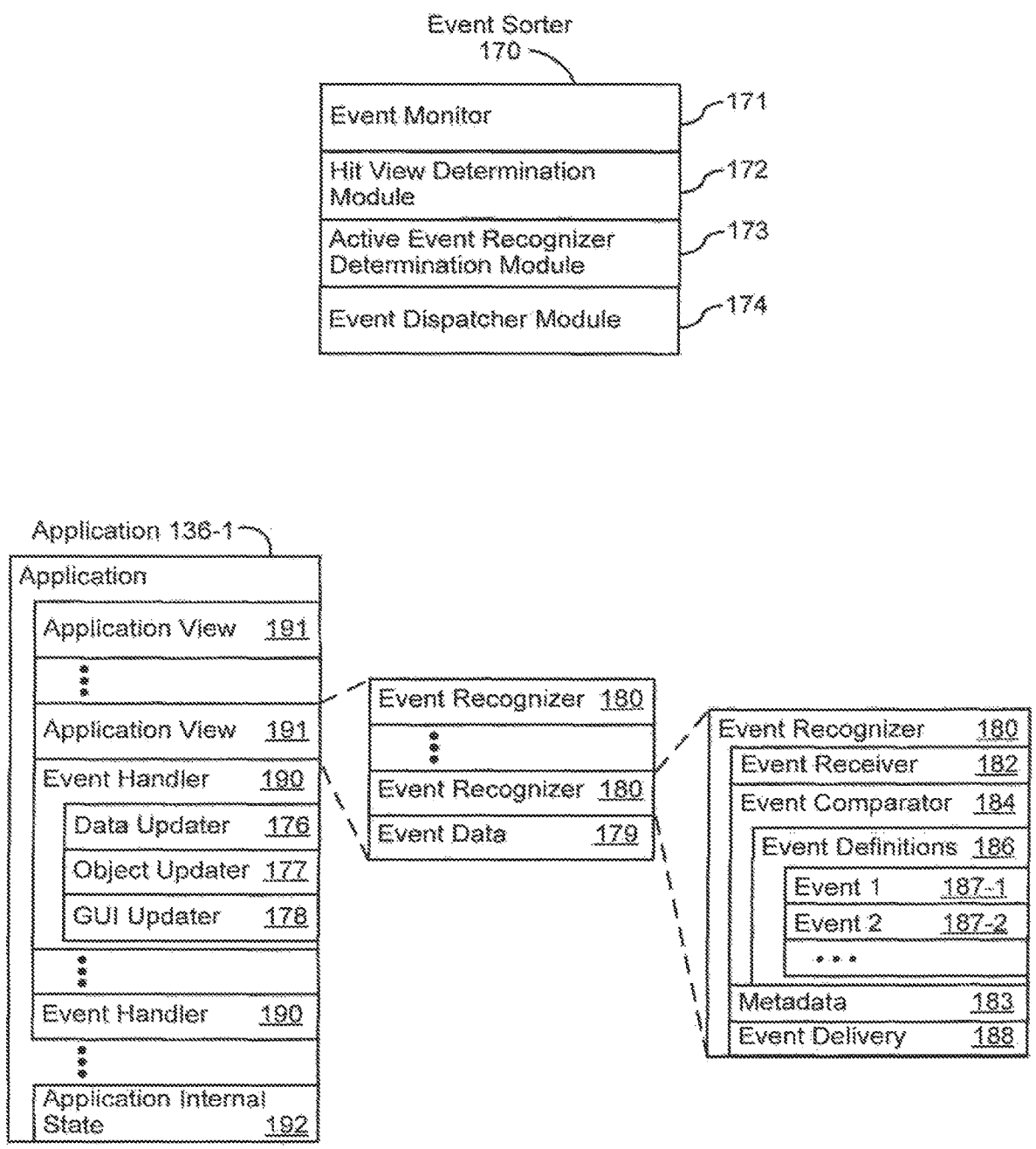
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from 0 subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physic allocation of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deterred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display (e.g., touch screen display 112). I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments, in some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser"; and
  Icon 422 for video and music player module 152, also referred to as iPod (trademark of Apple Inc.) module 152, labeled "iPod."
Icons for other applications, such as:
  Icon 424 for IM module 141, labeled "Text";
  Icon 426 for calendar module 148, labeled "Calendar";
  Icon 428 for image management module 144, labeled "Photos";
  Icon 430 for camera module 143, labeled "Camera";
  Icon 432 for online video module 155, labeled "Online Video";
  Icon 434 for stocks widget 149-2, labeled "Stocks";
  Icon 436 for map module 154, labeled "Map";
  Icon 438 for weather widget 149-1, labeled "Weather";
  Icon 440 for alarm clock widget 149-4, labeled "Clock";
  Icon 442 for workout support module 142, labeled "Workout Support";
  Icon 444 for notes module 153, labeled "Notes"; and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

FIG. 5A illustrates a block diagram of an operating environment 500 in accordance with some embodiments. Operating environment 500 includes a server 510, one or more communications networks 505, portable multifunction device 100, and peripheral display unit 540. In some embodiments, peripheral display unit 540 is an entertainment and/or navigation system that is implemented in a vehicle. In some embodiments, peripheral display unit 540 includes one or more displays. In some embodiments, a vehicle includes a plurality of peripheral display unit 540 communicatively coupled to device 100 in operating environment 500 each with a respective display. In some embodiments, peripheral display unit 540 is a peripheral display unit.

Server 510 typically includes one or more processing units (CPUs) 512 for executing modules, programs and/or instructions stored in memory 524 and thereby performing processing operations, one or more network or other communications interfaces 520, memory 524, and one or more communication buses 522 for interconnecting these components. Communication buses 522 optionally include circuitry (sometimes called a chipset) that interconnects and controls communications between system components. Memory 524 includes high-speed random access memory, such as DRAM, SRAM, DDR RAM or other random access solid state memory devices, and can optionally include non-volatile memory, such as one or more magnetic disk storage devices, optical disk storage devices, flash memory devices, or other non-volatile solid state storage devices. Memory 524 optionally includes one or more storage devices remotely located from the CPU(s) 512. Memory 524, or alternately the non-volatile memory device(s) within memory 524, comprises a non-transitory computer-readable storage medium. In some embodiments, memory 524, or the computer-readable storage medium of memory 524 stores the following programs, modules, and data structures, or a subset thereof:

- an operating system 526 that includes procedures for handling various basic system services and for performing hardware dependent tasks; and
- a network communication module 528 that is used for connecting (wired or wireless) server 510 to other computing devices via the one or more communication network interfaces 520 and one or more communication networks 505, such as the Internet, other wide area networks, local area networks, metropolitan area networks, and so on.

Portable multifunction device 100 (sometimes herein also called "device 100") typically includes the components described with reference to FIGS. 1A-1B and/or 3.

Peripheral display unit 540 (sometimes herein also called a "peripheral") typically includes one or more processing units (CPUs) 542 for executing modules, programs and/or instructions stored in memory 554 and thereby performing processing operations, one or more network or other communications interfaces 550, memory 554, and one or more communication buses 552 for interconnecting these components.

Communication interface 550 can optionally include a plurality of discrete communication interfaces capable of communicating independently and simultaneously. For example, communication interface 550 can optionally include one or more wired communication interfaces such as a USB data port. Communication interface 550 can optionally further include one or more wireless communication interfaces, such as a Wi-Fi communication interface and/or a Bluetooth communication interface. Communication interface 550 can optionally include additional communication interfaces.

Peripheral display unit 540, optionally, includes a user interface 544 comprising one or more display devices 546 and a plurality of controls 548 (e.g., jog dials, knobs, buttons, switches, a touch-sensitive surface such as a touch screen display, or other input sources). In some embodiments, the one or more displays 546 include a primary display 546-1 (e.g., a dashboard or vehicle navigation display) and an auxiliary display 546-2 (e.g., a rear-seat or entertainment display). In some embodiments, a respective display of the one or more displays 546 is a touch screen display that is capable of receiving user touch inputs (e.g., detecting finger contacts and gestures that correspond to the detection and movement of finger contacts). In some embodiments, a respective display of the one or more displays 546 is associated with one or more controls of the plurality of controls 548 (e.g., jog dials, knobs, buttons, switches, a touch-sensitive surface such as a touch screen display, or other input sources.). Communication buses 552 optionally include circuitry (sometimes called a chipset) that interconnects and controls communications between system components. Memory 554 includes high-speed random access memory, such as DRAM, SRAM, DDR RAM or other random access solid state memory devices, and, optionally, includes non-volatile memory, such as one or more magnetic disk storage devices, optical disk storage devices, flash memory devices, or other non-volatile solid state storage devices. Memory 554 optionally includes one or more storage devices remotely located from the CPU(s) 542. Memory 552, or alternately the non-volatile memory device(s) within memory 552, comprises a non-transitory computer-readable storage medium. In some embodiments, memory 552, or the computer-readable storage medium of memory 552 stores the following programs, modules, and data structures, or a subset thereof:

- an operating system 556 that includes procedures for handling various basic system services and for performing hardware dependent tasks; and
- a network communication module 558 that is used for connecting (wired or wireless) server 540 to other computing devices via the one or more communication network interfaces 550 and one or more communication networks 505, such as the Internet, other wide area networks, local area networks, metropolitan area networks, and so on.

In some embodiments, device 100 drives the one or more displays 546 of peripheral display unit 540. For example, device 100 sends a video signal to peripheral display unit 540, and CPU 542 of peripheral display unit 540 renders the video signal on the one or more displays 546. In some embodiments, device 100 sends a video signal directly to the one or more displays 546 and CPU 542 is not used to render the video signal (e.g., device 100 uses display 546 as an auxiliary display). In some embodiments, the user interface displayed on touch screen 112 of device 100 is synchronized with the user interface displayed on the one or more displays 546 of peripheral display unit 540, and, in some other embodiments, the user interface displayed on touch screen 112 of device 100 is not continuously synchronized with the user interface displayed on the one or more displays 546 of peripheral display unit 540 and at times (e.g., while a user of device 100 is viewing information about possible driving destinations but has not yet selected a driving destination) touchscreen 112 of device 100 displays different information from that displayed on display 546 of peripheral display unit 540 (e.g., touch screen 112 and display 546 are intermittently synchronized with periods in between the intermittent synchronization events where they are not synchronized).

In some embodiments, in response to detecting a user input (e.g., a user touch input associated with a respective display of the one or more displays 546 or a user input associated with a respective control of the plurality of controls 548), peripheral display unit 540 (or the respective display of the one or more displays 546, or the respective control of the plurality of controls 548) sends input information (e.g., an identifier for the input source and an input description describing the user input) corresponding to the user input to device 100. In turn, device 100 updates the user interface displayed on the respective display of the one or more displays 546 and/or touch screen 112 of device 100 in accordance with the received input information and/or the display state of the user interface displayed on the respective display of the one or more displays 546 at or before the user input.

FIG. 5B is a flow diagram illustrating a process of selecting an affected display and sending update information to the affected display. The affected display (e.g., primary display 546-1) displays (560) a user interface. A respective input source that is a control of peripheral display unit 540 detects (561) a user input. In some embodiments, the respective input source is one of controls 548 and the user input is an interaction with one of controls 548. For example, controls 548 include buttons, switches, dials, knobs, other mechanical affordances, touch-sensitive surfaces, or other input sources. For example, the user input is rotation of a knob or dial, depression of an affordance or knob, a touch input detected on a touch-sensitive surface or touch screen, or other user interaction with controls 548.

In response to detecting the user input, the respective input source sends (562) input information (e.g., {Source ID; Input Description}) to device 100. In some embodiments, the input information includes a unique identifier for the input source and input description information that describes the user input. For example, the input description information is raw input data such as the magnitude and direction of rotation of a jog dial, contact locations and movement amounts/directions detected on a touch-sensitive surface and/or gesture data describing a type of gesture that was performed on the touch-sensitive surface.

Device 100 receives (564) the input information from the respective input source. Device 100 selects an affected display by correlating the unique identifier (e.g., source ID) included in the input information with a display identifier tag (e.g., a display ID) based at least in part on input-source mapping 566. In some embodiments, the input-source mapping 566 is stored in memory of device 100. In some embodiments, multiple inputs sources are mapped to a same display. However, in some embodiments, each input source is mapped no more than a single display. In some embodiments, input-source mapping 566 is updated by device 100 in response to detecting input-source-mapping update events (e.g., a vehicle associated with the first display starting to back up and taking control of the first display, or an input associating a jog dial with the second display instead of the first display) and/or in accordance with a predetermined schedule.

After selecting the affected display, device 100 determines a respective state of the user interface displayed on the affected display by correlating the display ID (determined based on input-source mapping 566) for the affected display with display state information (e.g., what kind of user interface is displayed in the display, what user interface elements are displayed, and/or which controls are associated with which functions such as volume control or scrolling) based at least in part on user interface state table 568. In some embodiments, the user interface state table 568 is stored in memory of device 100. After determining the respective state of the user interface displayed on the affected display, device 100 generates (570) an updated user interface for the affected display in accordance with the respective state of the user interface displayed on the affected display and the input description information and device 100 sends the updated user interface (or information for generating an updated user interface) to the affected display. In some embodiments, device 100 also updates user interface state table 568 so that the state information associated with the display ID corresponding to the affected display reflects the updated user interface (e.g., for use in responding to subsequent input information received from the input source).

In response to receiving the updated user interface update information) from device 100, the affected display updates (574), the user interface displayed on the affected displayed so as to display the updated user interface (e.g., by replacing an image of a user interface previously provided by device 100 with an updated image of the user interface provided by device 100 in the update information).

User Interfaces and Associated Processes

Attention is now directed toward embodiments of user interfaces (UI) and associated processes that can optionally be implemented on an electronic device, such as device 300 or portable multifunction device 100.

FIGS. 6A-6W illustrate exemplary user interfaces. FIGS. 7A-7H, 8A-8D, and 9A-9E are flow diagrams illustrating exemplary methods. The user interfaces in FIGS. 6A-6W are used to illustrate the processes in FIGS. 7A-7B, 8A-8D, and 9A-9E.

Attention is now directed to techniques for establishing a relationship between an electronic device and a peripheral display unit. In some embodiments, these techniques may be useful in operating environments in which it is convenient for an electronic device, such as a smart phone, to share content with a peripheral display unit, such as an entertainment/navigation/media system in a vehicle (e.g., an accessory such as a car stereo head unit). The relationships established, in some embodiments, include an authorization for the device and the peripheral display unit to establish a data connection with one another.

In some embodiments, a data connection between a device and a peripheral display unit is established. The data connection is optionally called a "connection." When the data connection is over a wireless data connection, it is optionally called a "wireless connection." When the data connection is over a wired data connection, it is optionally called a "wired connection."

In some embodiments, a relationship is created between a device and a peripheral display unit in which information is exchanged and authorization to establish a connection is recorded/stored. The relationship that includes authorization to establish the connection is optionally called a "relationship." If the relationship authorizes wireless connection, it is optionally called a "wireless relationship." If the relationship authorizes wired connection, it is optionally called a "wired relationship."

In some embodiments, a setup process to create/establish a relationship (a wired relationship or a wireless relationship) is undertaken. The setup process can optionally be executed via a wired or wireless connection. Regardless of whether the setup process is undertaken via a wired or wireless connection, the relationship established can optionally itself be either a wired relationship or a wireless relationship. A setup process executed over a wired connection is optionally called "wired setup," while a setup process executed over a wireless connection is optionally called "wireless setup."

The versatility of various connection techniques, various relationships/authorizations, and various setup techniques improves efficiency and makes the experience more intuitive, more convenient, and quicker for a user.

FIG. 6A depicts an exemplary device 600 and an exemplary peripheral display unit 610, which together can optionally embody the techniques described herein. In some embodiments, device 600 is device 100 or 300 (FIGS. 1A, 3, and 5A). In some embodiments, peripheral display unit 610 is peripheral display unit 540 (FIG. 5A). In some embodiments, both device 600 and peripheral display unit 610 exist in operating environment 500 (FIG. 5A).

Device 600 has display 608, which is touch screen 112 (FIG. 1A) or display 340 (FIG. 3A) in some embodiments. Device 600 also comprises three communication interfaces: first wireless data interface 602, second wireless data interface 604, and wired data interface 606. In some embodiments, first wireless data interface 602 is a Wi-Fi data interface capable of sending and receiving information over the Wi-Fi communication standard. In some embodiments, second wireless data interface 604 is a Bluetooth communication interface, capable of sending and receiving information over the Bluetooth communication standard. In some embodiments, wired communication interface 606 is a computer bus and power connector interface capable of sending and receiving information on a wire and capable of sending and/or receiving a battery charge through the same wire. In some embodiments, the wired communication interface 606 is capable of interfacing with USB connections.

Peripheral display unit 610 has display 618, which is display 546 (FIG. 5A) in some embodiments. Peripheral display unit 610 also comprises hardware button 619, which can optionally be a physical button provided on the housing of peripheral display unit 610 or on some physical element connected thereto (as will be discussed later). Peripheral display unit 610 also comprises three communication interfaces: first wireless data interface 612, second wireless data interface 614, and wired data interface 616. In some embodiments, first wireless data interface 612 is a Wi-Fi data interface capable of sending and receiving information over the Wi-Fi communication standard. In some embodiments, second wireless data interface 614 is a Bluetooth communication interface, capable of sending and receiving information over the Bluetooth communication standard. In some embodiments, wired communication interface 616 is a computer bus and power connector interface capable of sending and receiving information on a wire and capable of sending and/or receiving a battery charge through the same wire. In some embodiments, the wired communication interface 606 is capable of interfacing with USB connections. In some embodiments, interfaces 612, 614, and 616 are part of communication interface 550.

All three communication interfaces of device 600 can optionally be used to communicate with peripheral display unit 610. Namely, first wireless interfaces 602 and 612 can optionally communicate with one another, second wireless interfaces 604 and 614 can optionally communicate with one another, and wired interfaces 606 and 616 can optionally communicate with one another. Each of the three corresponding pairs, when communicating between one another, may be said to have formed a "data connection," such as a first wireless data connection or a Wi-Fi data connection. These data connections can optionally be established or terminated independently of one another, simultaneously with one another, and/or in cooperation with one another.

In some embodiments, peripheral display unit 610 is an accessory, such as a dash mounted head unit of an entertainment/navigation/media system provided in a vehicle. In some such embodiments, peripheral display unit 610 can optionally also include, or be operatively coupled with, speakers for audio output and a microphone for audio input. In some embodiments, hardware button 619 can optionally be situated on the steering wheel of the vehicle for convenient access by a user's thumb.

Below, various techniques for establishing a relationship and operating a connection between a device and a peripheral display unit are described. The device can optionally be device 600 and the peripheral display unit can optionally be peripheral display unit 610. Specifically, the relationship established can optionally facilitate data communication over the first wireless data connection, such as a connection corresponding to first wireless data interfaces 602 and 612. The first wireless data connection can optionally be used to pass content between device 600 and peripheral display unit 610, including audio data, video data, phone call data, navigation data, web-browsing data, media data, user interface data, user input data, and more. This connection is optionally called a "wireless connection" or a "connection." When the first data connection is a Wi-Fi connection, it may be preferable as compared to Bluetooth data connections, in that it is more secure, has a longer range, and has a higher bandwidth. However, a Wi-Fi data connection may not be capable of reestablishing a connection as quickly as a Bluetooth data connection. As will be described in greater detail below, the techniques described herein harness the advantageous qualities of both wireless data connections and minimize the inconvenience or risk introduced by each of their drawbacks.

The relationship established can optionally facilitate the automatic reconnection of the connection between a device and a peripheral display unit; this automatic reconnection can optionally occur whenever the device and the peripheral display unit are within range of one another such that the required data connection(s) may be established. The device and the peripheral display unit can optionally each store information on respective local memories that is used to identify the other and securely and quickly reestablish the data connection with one another. Thus, it may be said that the device and the peripheral display unit establish a "stored" relationship, such that they "remember" one another, and can automatically reconnect with one another.

Attention is now directed to user interfaces for an exemplary technique for establishing, via a wired-setup process, a relationship between device 600 and peripheral display unit 610. FIG. 6B depicts a user interface for establishing a relationship between device 600 and peripheral display unit 610 over a wired data connection, namely wired setup user interface 620. Wired setup user interface 620 can optionally be displayed on display 608 in response to device 600 receiving a signal from peripheral display unit 610 over wired interface 606. That is, when the device 600 is connected to peripheral display unit 610, for example for the first time, peripheral display unit 610 can optionally send a signal to the device to indicate that the peripheral display unit 610 is capable of establishing a relationship response to this signal over the wired data connection, device 600 displays wired setup user interface 620.

In some embodiments, wired setup user interface 620 provides various options for a user, including wireless relationship affordance 622, wired relationship affordance 624, and charge-only affordance 626. Wireless relationship affordance 622 corresponds to authorization by the user for the device 600 to establish a wireless connection with the peripheral display unit 610. Wireless relationship affordance 622 can optionally also correspond to authorization for the device 600 to establish a wired connection in addition to a wireless connection, as a wired connection can optionally be understood as a lesser and included permission. Wired relationship affordance 624 corresponds to authorization by the user for the device 600 to establish a wired connection with the peripheral display unit 610, without authorizing wireless connection. Finally, charge-only affordance 626 corresponds to the denial of authorization by a user for the device 600 to establish any connection with the peripheral display unit 610; rather, the device 600 will use the wired physical connection simply to charge its battery, and will not establish any connection via either a wired or wireless connection.

As will be described in greater detail below, selection of any of the three affordances in wired setup user interface 620 can optionally affect the behavior of device 600 in both the immediate future and at various instances thereafter. That is, in some embodiments, device 600 establishes the authorized connection in accordance with the selected affordance immediately, and also stores information in a local memory such that device 600 can optionally recall the user's selection at a future time and establish only the authorized type of connection (wired or wireless) in the future. Furthermore, device 600 can optionally determine whether, upon future connection of the wired data connection, to prompt the user to establish a relationship. In some embodiments, once the user has made a selection at wired setup user interface 620, interface 620 will not be automatically displayed again. In other embodiments, wired setup user interface 620 can optionally be redisplayed upon some or all future instances of the wired physical connection being established.

FIG. 6B further depicts a user selection of wireless relationship affordance 622. In the example shown, user input 628 is a tap or touch input at a location corresponding to affordance 622. However, other input methods (e.g., using a selection knob or joystick control) are, in some embodiments, used to make the selection instead.

Figure 6C:
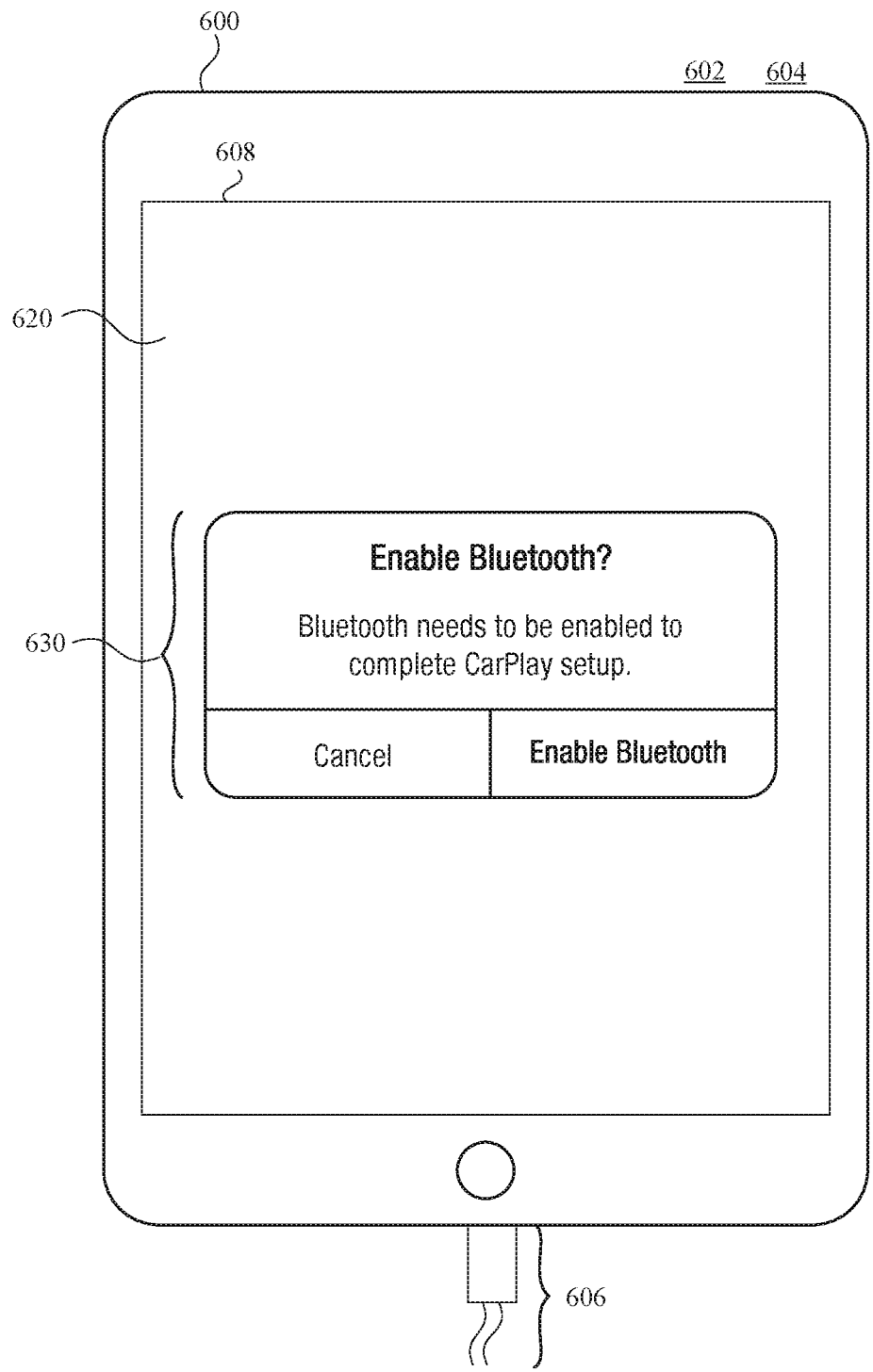

FIG. 6C further depicts wired setup user interface 620. In particular, FIG. 6C depicts Bluetooth enablement prompt 630. Bluetooth enablement prompt 630 is a prompt provided to the user, such as by displaying on display 608, indicating that the Bluetooth communication interface, which can optionally be second wireless communication interface 604, needs to be enabled. This prompt may be necessary during wired setup of a wireless relationship, because various wireless data connections, such as Bluetooth and Wi-Fi, may be necessary to establish the relationship and connect the connection. Thus, if a user begins the setup process by physically connecting device 600 and peripheral display unit 610 via a wired data connection, the device 600 may need to activate any disabled wireless communication functionalities in order to complete setup of a wireless relationship. In other embodiments not depicted in the figures, the wired setup user interface 620 includes a Wi-Fi enablement prompt that indicates that Wi-Fi communication, which can optionally correspond to first wireless communication interface 602, needs to be enabled.

Figure 6D:
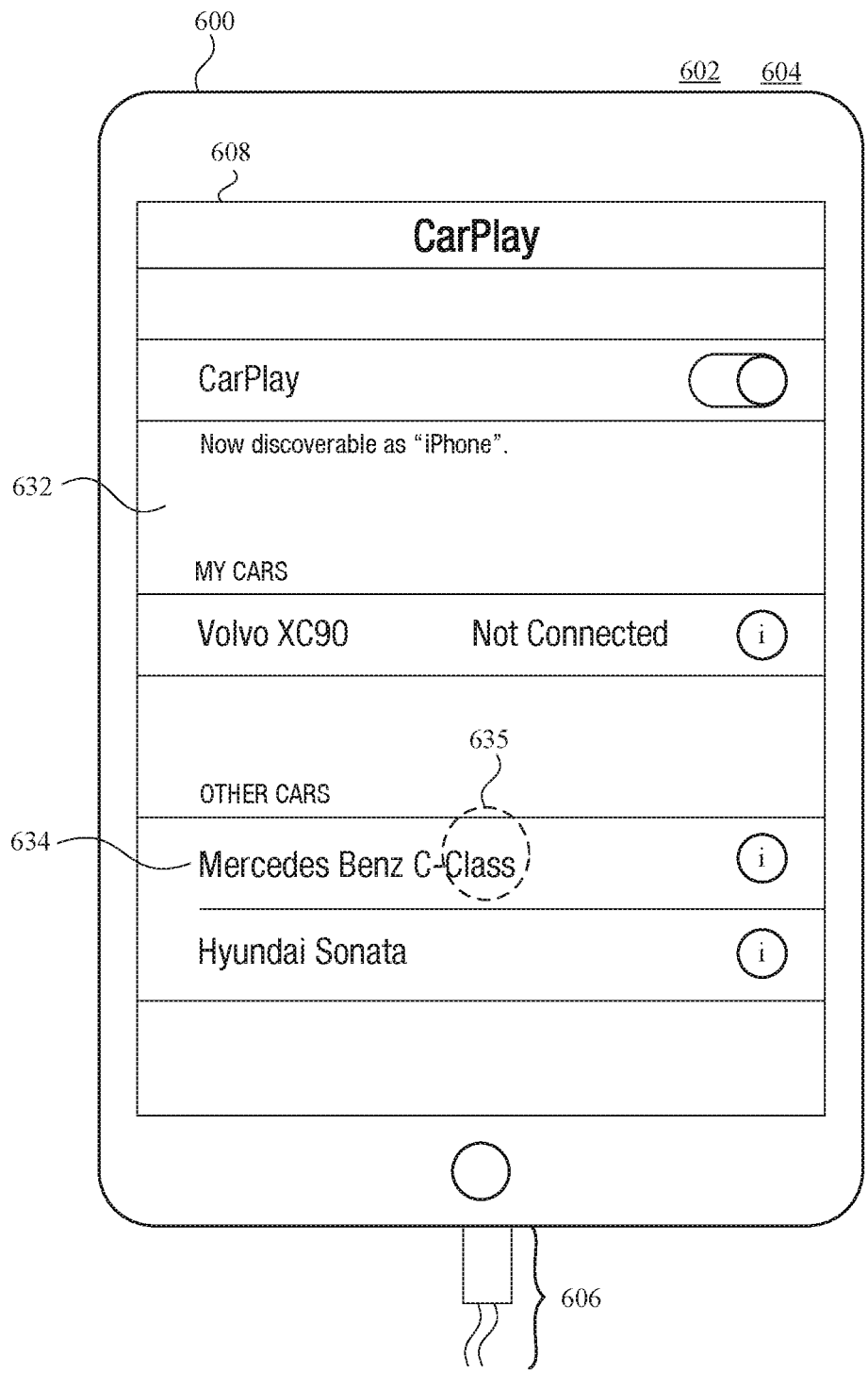

Attention is now directed to user interfaces for an exemplary technique for wirelessly establishing (e.g., via a wireless setup) a relationship between device 600 and peripheral display unit 610. FIG. 6D depicts a user interface for establishing a relationship between device 600 and peripheral display unit 610 over one or more wireless data connections, namely CarPlay settings menu 632. CarPlay settings menu 632 includes various setting and options pertaining to relationships that have been or may be established with various vehicles. As shown in the interface under the words "My Cars," a stored relationship has already been established between the device and a Volvo vehicle. As shown in the interface under the words "Other Cars," the device 600 is detecting two vehicles with which a stored relationship has not been established, a Mercedes Benz vehicle and a Hyundai vehicle. In the example depicted, the names of the "other cars" each constitute affordances, such that the area corresponding to the words "Mercedes Benz C-Class" constitutes available car affordance 634. Available car affordance 634 corresponds to an instruction by the user to wirelessly establish a stored relationship between device 600 and peripheral display unit 610 represented by the available car affordance 634. Techniques for establishing this relationship will be explained in greater detail below. FIG. 6D further depicts user input 635, which corresponds to selection of available car affordance 634. In the example shown, the user selection is a tap or touch input at a location corresponding to affordance 634. However, other input methods (e.g., using a selection knob or joystick control) are, in some embodiments, used to make the selection instead.

Figure 6E:
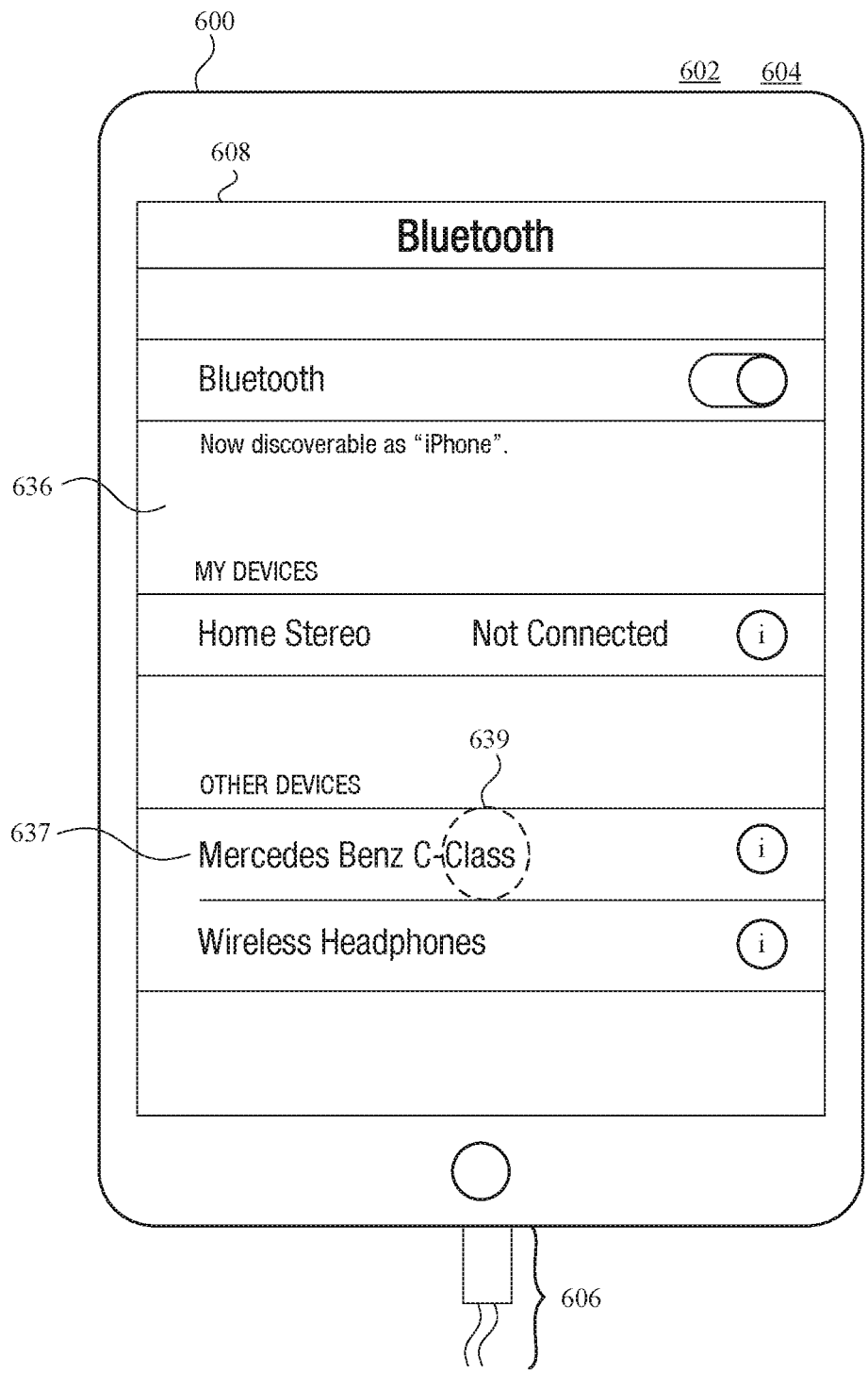

FIG. 6E depicts another user interface for wirelessly establishing a relationship between device 600 and peripheral display unit 610, namely Bluetooth settings menu 636. Bluetooth settings menu 636 includes various setting and options pertaining to relationships that have been or may be established with various Bluetooth devices. As shown in the interface under the words "My Devices," a stored relationship has already been established between the device 600 and a home stereo Bluetooth device. As shown in the interface under the words "Other Devices," the device 600 is detecting two Bluetooth devices with which a stored relationship has not been established: a Mercedes Benz vehicle and a pair of wireless headphones. In the example depicted, the names of the "other devices" each constitute affordances, such that the area corresponding to the words "Mercedes Benz C-Class" constitutes available Bluetooth device affordance 637. Available Bluetooth device affordance 637 corresponds to an instruction by the user to wirelessly establish a stored relationship between the device 600 and the peripheral display unit 610 represented by the available Bluetooth device affordance 637. Techniques for establishing this relationship will be explained in greater detail below. FIG. 6E further depicts user input 639, which corresponds to selection of available Bluetooth device affordance 637. In the example shown, the user selection is a tap or touch input at a location corresponding to affordance 637.

Figure 6F:
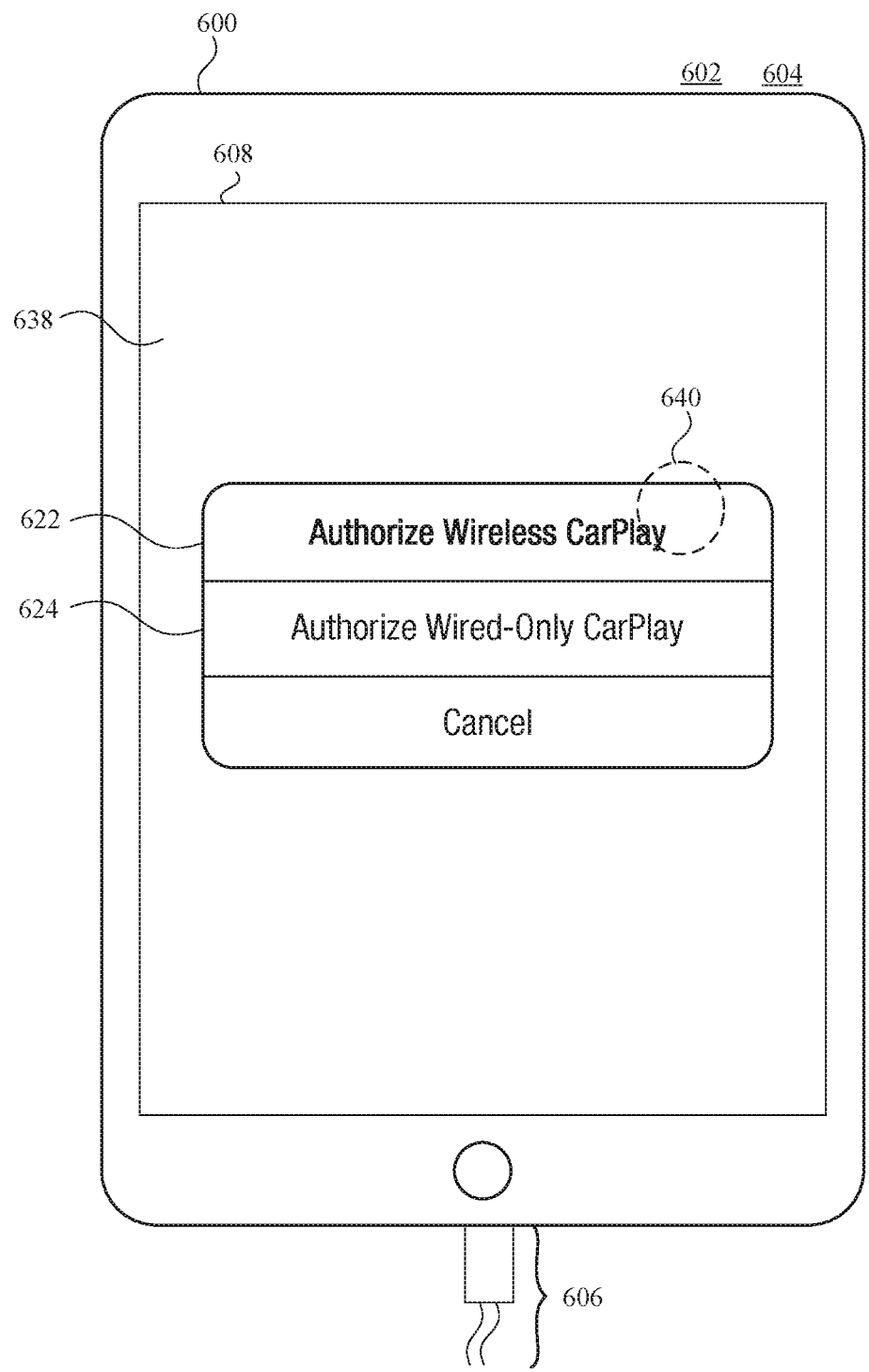

FIG. 6F depicts another user interface for wirelessly establishing a relationship between device 600 and peripheral display unit 610, namely a wireless setup authorization interface 638. Wireless setup authorization interface 638 can optionally be displayed in response to the selection of either affordance 634 or 637 as described with respect to FIGS. 6D and 6E. Wireless setup authorization interface 638 is similar in many respects to the interface depicted in FIG. 6B, which was part of the interface for wired setup. In particular, wireless setup authorization interface 638 includes wireless relationship affordance 622 and wired relationship affordance 624, as the interface in FIG. 6B does. As in FIG. 6B, wireless relationship affordance 622 corresponds to authorization by the user for device 600 to establish a wireless connection with peripheral display unit 610 (and can optionally also correspond to authorization for device 600 to establish a wired connection in addition to a wireless connection), while wired relationship affordance 624 corresponds to authorization by the user for device 600 to establish a wired connection with peripheral display unit 610. Unlike the interface in FIG. 6B, wireless setup authorization interface 638 does not include an option to establish a charge-only relationship, because the user has specifically sought out the Bluetooth or CarPlay menus described above with respect to FIGS. 6D and 6E in order to reach authorization interface 638. That is, device 600 assumes that the user does indeed want to establish a stored relationship, and seeks only to determine whether a wireless or wired-only relationship should be established.

In some embodiments not depicted in the figures, wireless setup authorization interface 638 presents different options in accordance with the manner in which the user accessed the authorization interface. For example, the interface can optionally provide the options for wireless and wired-only connections when a user accessed the authorization interface 638 through CarPlay menu 632, but can optionally provide only the option for a wireless connection when the user accessed the authorization interface 638 through Bluetooth menu 636 (as Bluetooth menu 636 is inherently associated with wireless connections).

FIG. 6F further depicts user input 640 of wireless relationship affordance 622. In the example shown, the user selection is a tap or touch input at a location corresponding to affordance 622; however, other input methods (e.g., using a selection knob or joystick control) are, in some embodiments, used to make the selection instead.

Figure 6G:
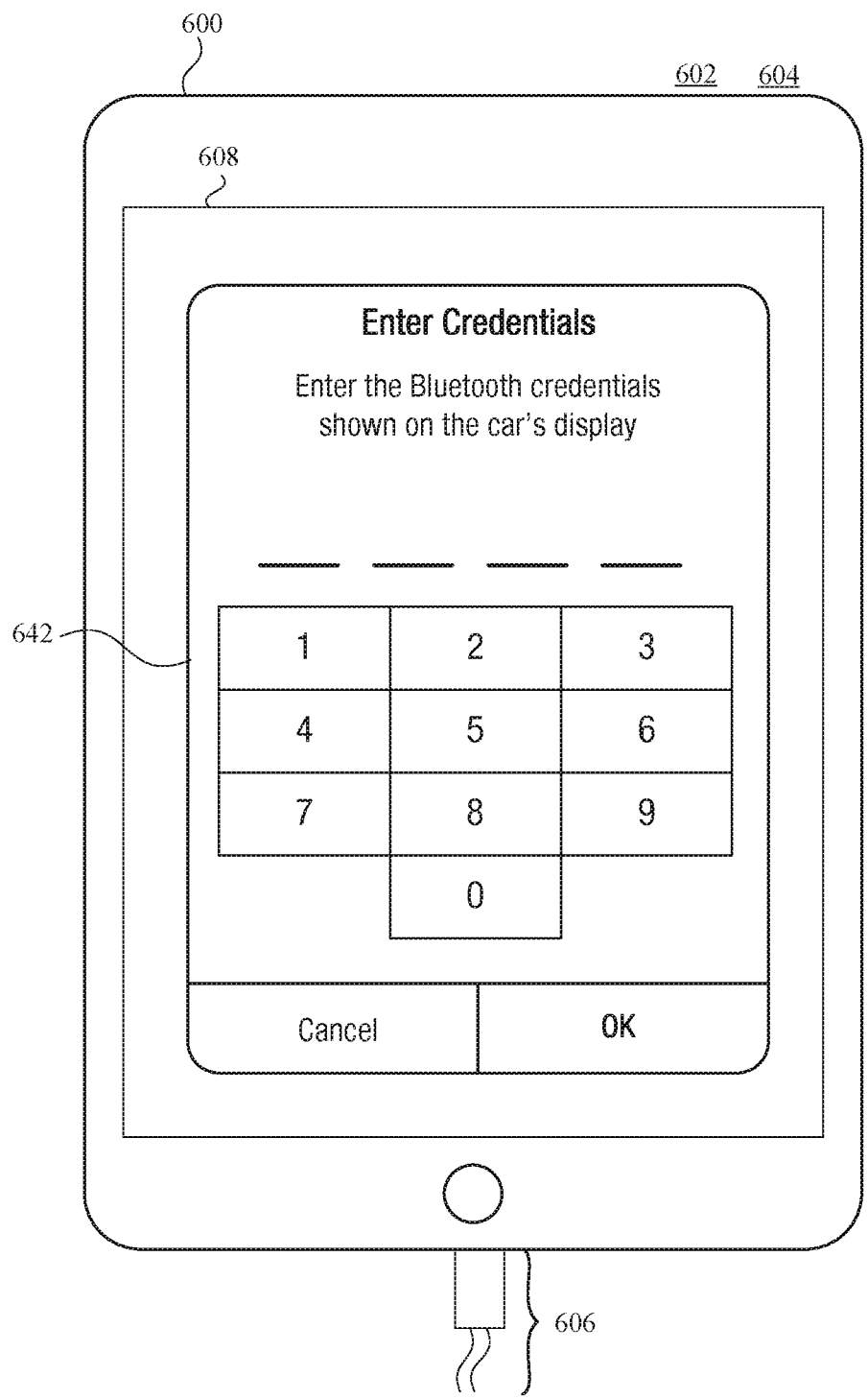

FIG. 6G depicts another user interface for wirelessly establishing a relationship between device 600 and peripheral display unit 610, namely Bluetooth credentials prompt 642. Bluetooth credentials prompt 642 is an interface that prompts the user to enter Bluetooth credentials, such as a numerical code. These credentials can optionally be provided, for example, on the display of the peripheral display unit 610. The credentials are displayed on the peripheral display unit 610 and entered on the device 600 with which a relationship is being established. This process is designed to enhance security by ensuring that the user has control over both the device 600 and the peripheral display unit 610. In some embodiments, Bluetooth credentials prompt 642 is displayed only as a part of the wireless setup process, and not as a part of the wired setup process, because the presence of a wired physical connection between the device 600 and the peripheral display unit 610 during wired setup adequately ensures that the user is legitimately in control of both device 600 and peripheral display unit 610.

Figure 6H:
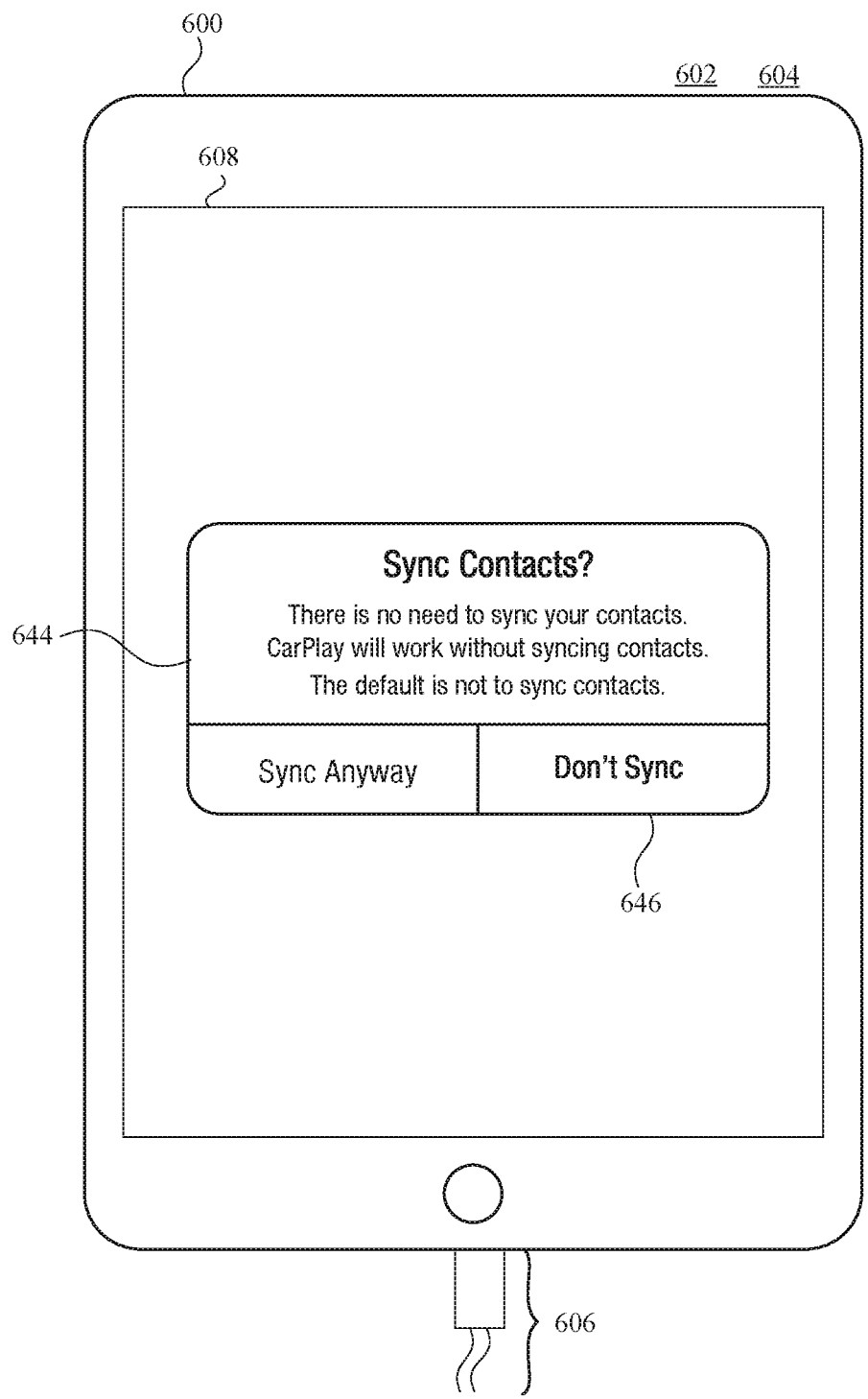

FIG. 6H depicts a user interface for establishing, via a wired or wireless connection, a relationship between device 600 and peripheral display unit 610. Namely, FIG. 6H depicts a contact-syncing prompt 644 that provides information to the user about whether to sync contacts from device 600, such as a contacts list from a smartphone, with peripheral display unit 610. In some embodiments, contact-syncing prompt 644 informs a user that the relationship being established does not require syncing of contacts, and that the relationship will function properly without syncing contacts. That is, while users may be used to known methods of connecting their devices to peripheral display units including vehicles, such as by Bluetooth connections using the Phone Book Access Profile (PBAP) specification, the current disclosure provides embodiments in which syncing contacts is not necessary. Rather, the contacts from device 600 can remain stored on device 600 and simply be communicated to peripheral display unit 610 as needed, rather than being synced with or stored on peripheral display unit 610. Thus, not syncing contacts avoids an unnecessary security risk without reducing the functionality of the user interface presented on the peripheral display unit 610 in conjunction with the device 600. Accordingly, contact-syncing prompt 644 includes an option to not sync contacts, which is presented in the form of "don't sync" affordance 646. As shown by the fact that "don't sync" affordance 646 is bolded and located on the right-hand side of the prompt (proximate to a right-handed user's thumb), "don't sync" affordance 646 is, in some embodiments, the default option.

Figure 6I:
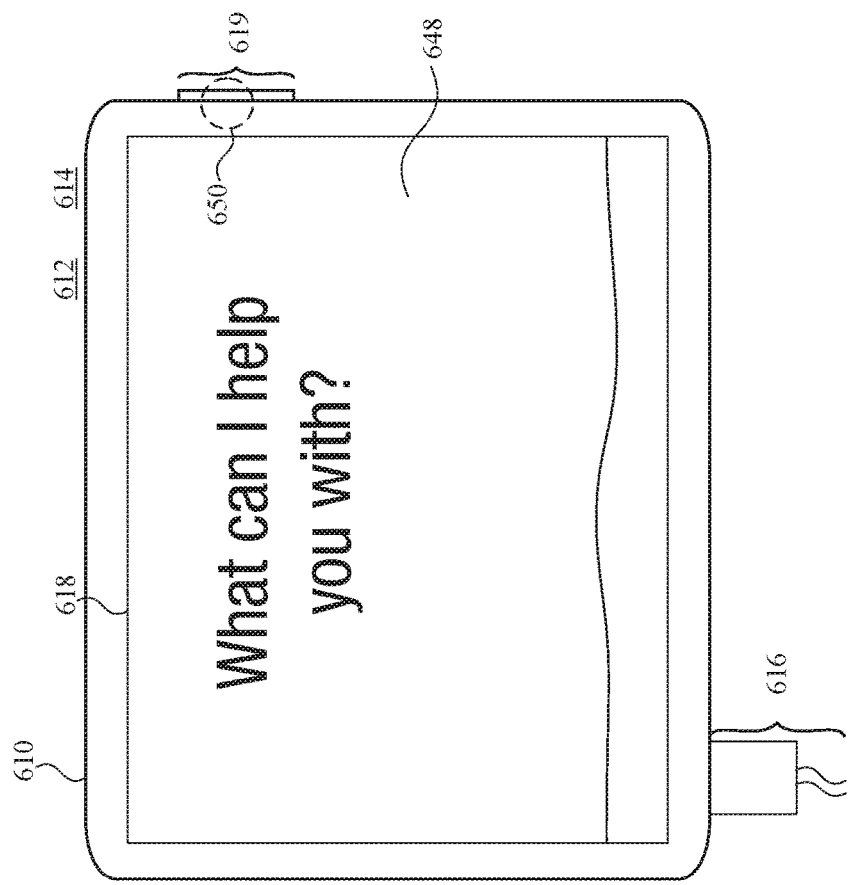
Figure 6I:
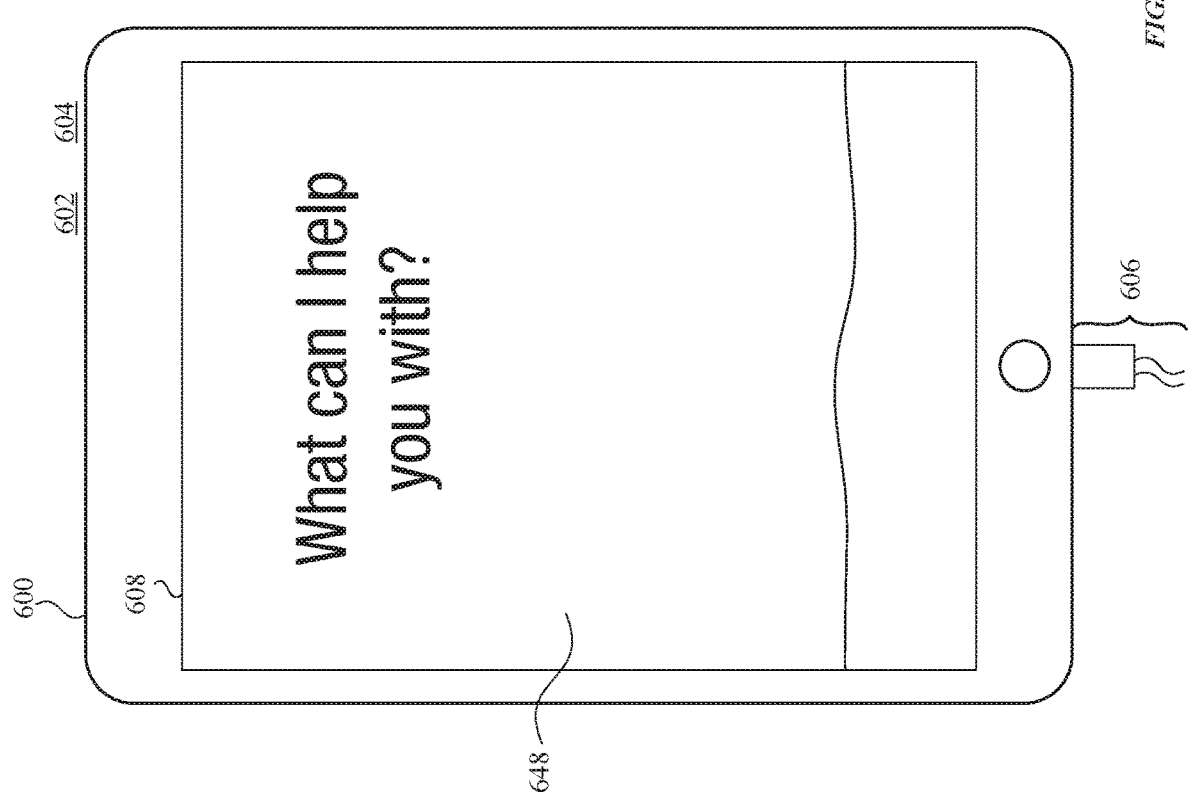

Attention is now directed to an exemplary user interface for accessing a native function of device 100 after a connection has been established with peripheral display unit 610. FIG. 6I depicts device 100 and peripheral display unit 610 in a state in which a connection is active, such as when a wireless connection or a wired connection is active. FIG. 6I further depicts detection of a user input, which, in the depicted example is a depression 650 of hardware button 619. As will be described in greater detail below, hardware button 619 can optionally be configured to perform various functions depending on the state of peripheral display unit 610, whether a connection is active, and the manner in which button 619 is depressed. In the depicted example, depression 650 of the button 619 has activated personal digital assistant interface 648 which is displayed on both display 608 and display 618. In some other embodiments not depicted, personal digital assistant interface 648 can optionally be provided only on display 618.

Attention is now directed to user interfaces for techniques for providing battery-usage alerts in accordance with battery-usage patterns. These techniques enable devices to provide battery-usage alerts that are not determined in accordance merely with the charge amount of a device battery, but rather in accordance with battery-usage patterns that can optionally provide useful historical and contextual information to the user, in order to allow for battery life to be optimally conserved. In particular, these techniques may be useful in devices that are wirelessly connected (such as by in wireless connection) with a peripheral display unit, because such operation can be battery-intensive. Finally, these techniques may be further particularly useful in operating environments in which a device is wirelessly connected (such as by in wireless connection) to a peripheral display unit in a vehicle, such as operating environment 500. In such environments, these techniques enable battery-usage alerts provided in accordance with information about a predefined or predicted destination of the vehicle, and the predicted amount of time that will be required to arrive there. Thus, for example, these battery-usage notifications can optionally warn a user if his battery is not going to last the duration of a trip while wirelessly connected to the vehicle.

Figure 6J:
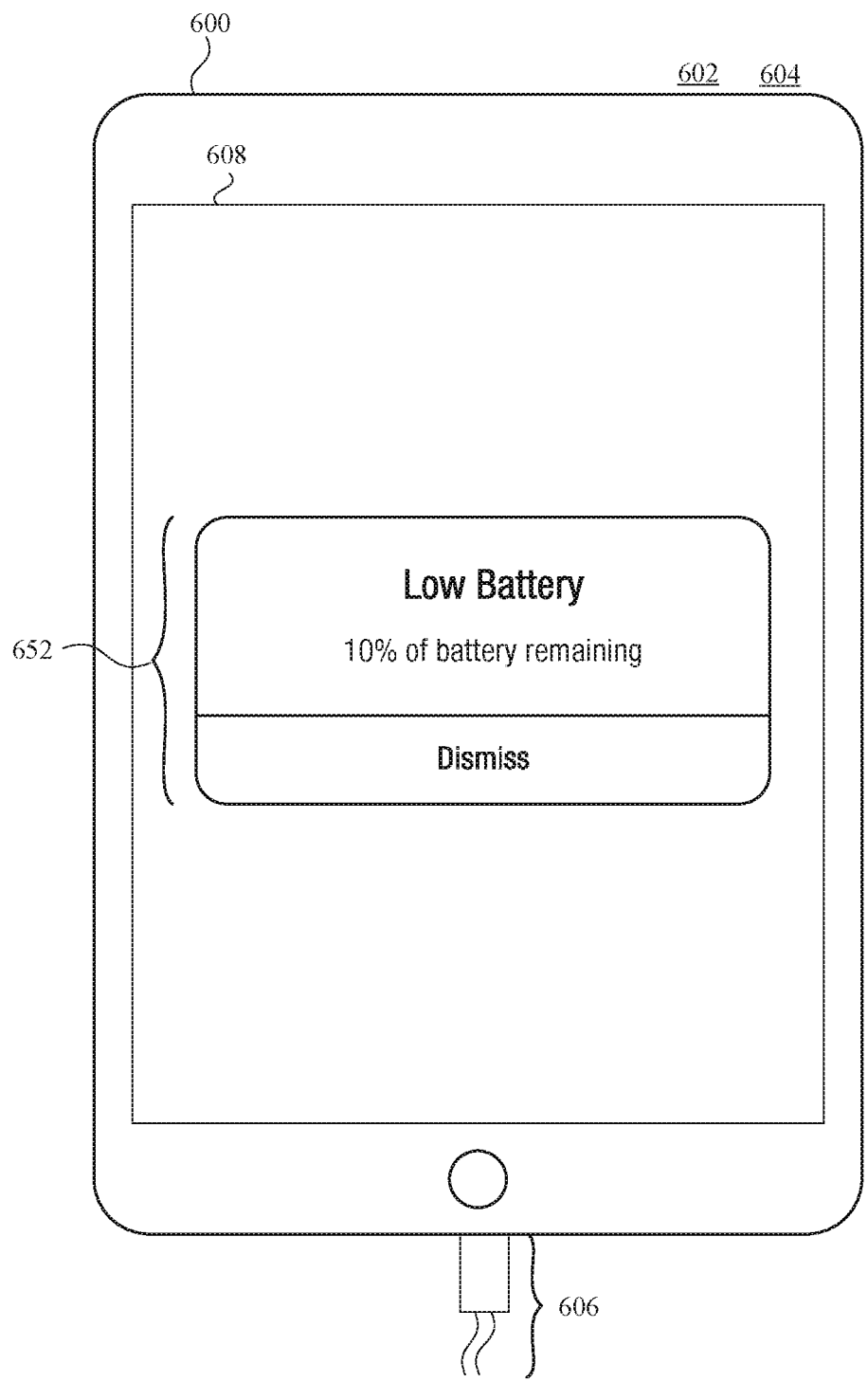
FIGS. 6J-6M illustrate user interfaces monitoring battery-usage patterns and providing battery-usage alerts in accordance with some embodiments.

FIG. 6J depicts an exemplary charge-level alert. In some embodiments, a charge-level alert is provided by one or both of device 600 and peripheral display unit 610 to which device 600 is connected by a connection. In the example shown, charge-level alert 652 is displayed on display 608. Charge-level alert 652 is displayed in accordance with a determination by device 600 that the current battery charge level is 10% of the total battery charge capacity, and alert 652 conveys some or all of that information to the user.

Figure 6K:
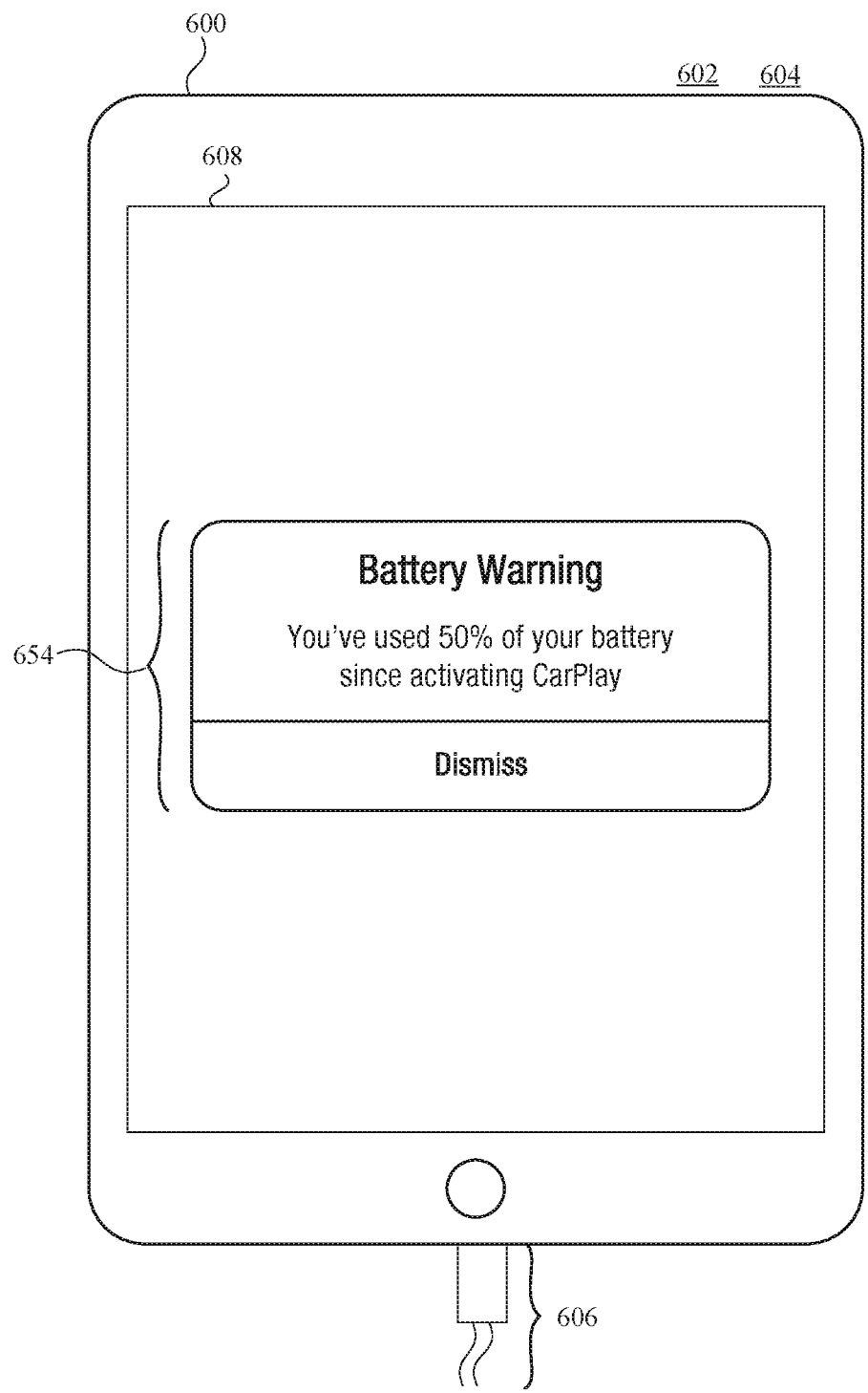

FIG. 6K depicts an exemplary battery-usage alert. In some embodiments, a battery-usage alert is provided by one or both of device 600 and peripheral display unit 610 to which device 600 is connected by a connection. Battery usage alerts, in some embodiments, are provided in accordance with a determination by the device regarding a battery-usage pattern, which will be explained in greater detail below. In the example shown in FIG. 6K, battery-usage alert 654 is displayed on display 608. Battery-usage alert 654 is displayed in accordance with a determination by device 600 that the battery has used 50% of its total charge capacity since CarPlay (a wireless connection with a vehicle) was activated, and alert 654 conveys some or all of that information to the user.

Figure 6L:
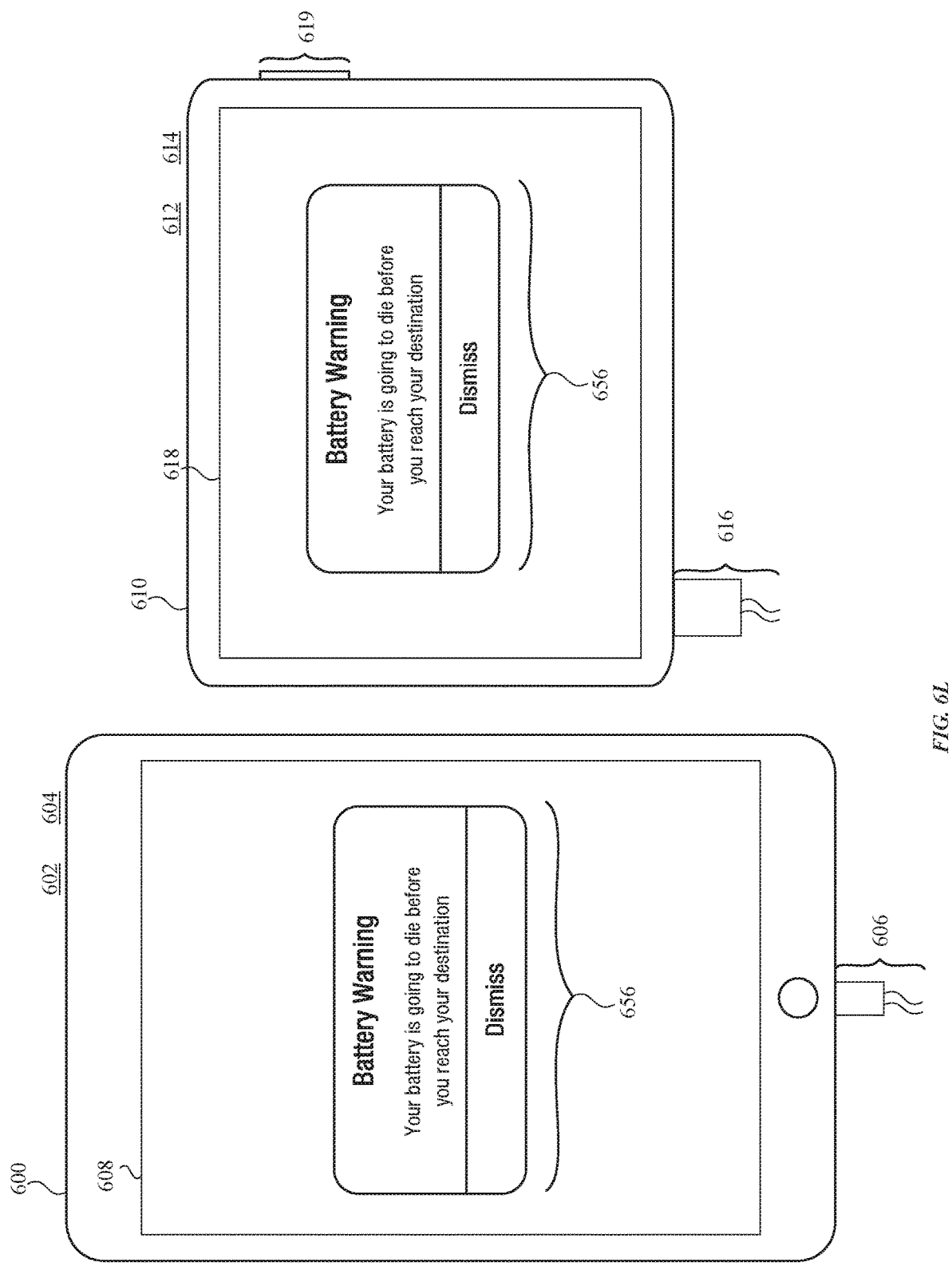

FIG. 6L depicts another exemplary battery-usage alert. In the example shown, battery-usage alert 656 is displayed on both display 608 and display 618. Battery-usage alert 656 is displayed in accordance with a determination by device 600 that the battery is going to die before device 600 reaches a destination. The manner in which such a determination/prediction can optionally be made is discussed in greater detail below. Battery-usage alert 656 conveys some or all of that determined information to the user.

Figure 6M:
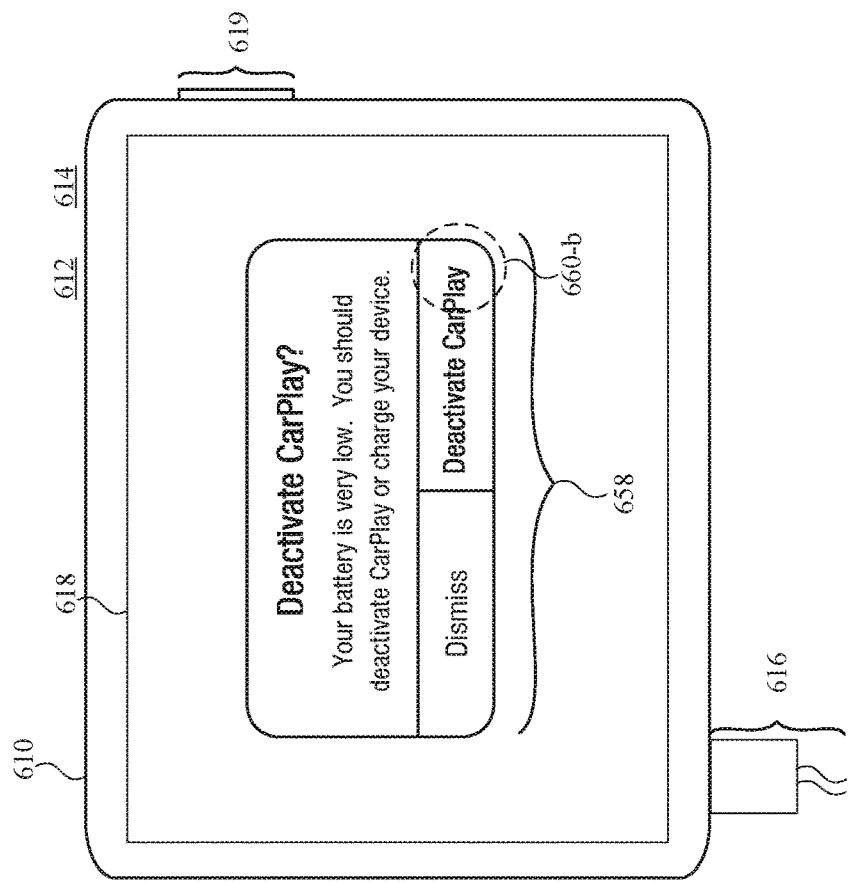
Figure 6M:
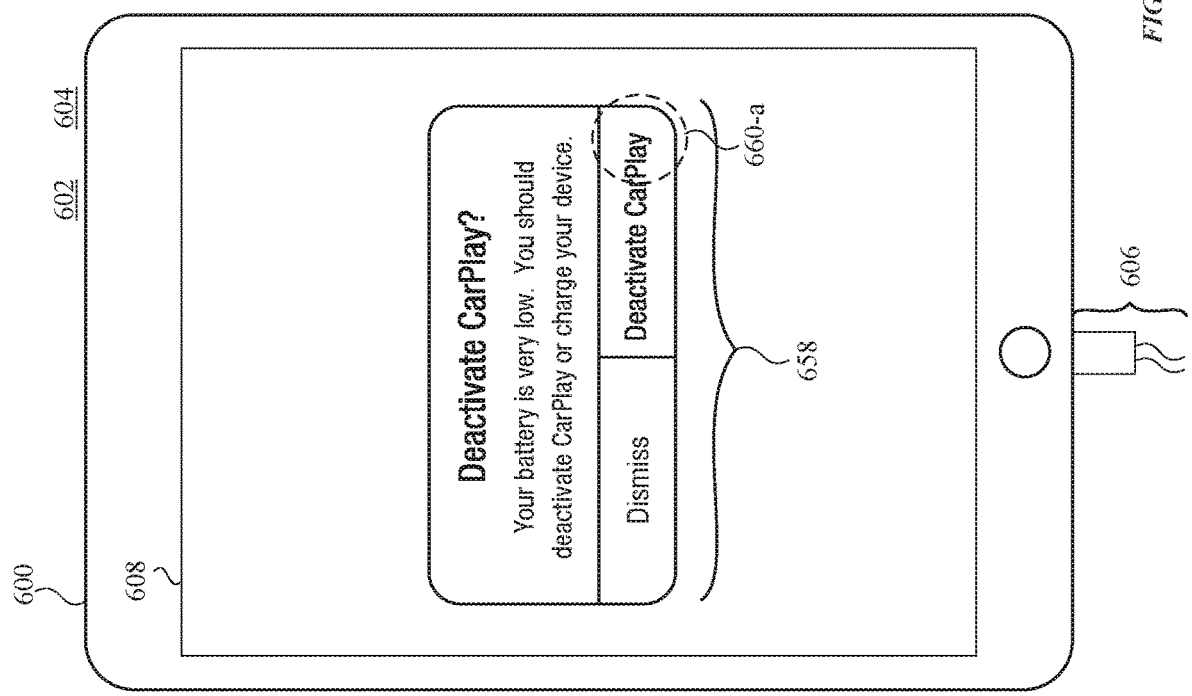

FIG. 6M depicts an exemplary connection deactivation prompt. In some embodiments, a connection deactivation prompt is provided by one or both of device 600 and peripheral display unit 610 to which device 600 is connected by a connection. Connection deactivation prompts, in some embodiments, are provided in accordance with a determination by device 600 regarding a charge level and/or a batter-usage pattern, as will be explained in greater detail below. In the depicted example, connection deactivation prompt 658 is displayed on both display 608 and display 618. In the example shown, connection deactivation prompt 658 prompts a user to deactivate CarPlay, as the battery level of device 600 is very low. As CarPlay wireless connection can optionally be considered a high-power operation mode, connection deactivation prompt 658 encourages the user to deactivate CarPlay to conserve the small remaining battery charge. FIG. 6M further depicts selection of an option to deactivate CarPlay in accordance with the connection deactivation prompt 658. In the depicted example, the selection is user input 660-*a* or 660-*b*, which is a tap or touch user input detected on display 608 or display 618 at a location corresponding to displayed affordances for deactivating CarPlay. However, other input methods (e.g., using a selection knob or joystick control) are, in some embodiments, used to make the selection instead.

Attention is now directed to exemplary user interfaces, wherein the user interface at the device allows configuration of a user interface of a peripheral display unit. That is, in FIGS. 6N-6V, both device 600 and peripheral display unit 610 are depicted. In each of the figures, peripheral display unit 610 is displaying on display 618 user interface 662, which in some embodiments is the primary user interface for peripheral display unit 610. User interface 662 comprises user interface objects such as user interface object 663, which can optionally be an affordance or icon for activating a corresponding function.

Figure 6N:
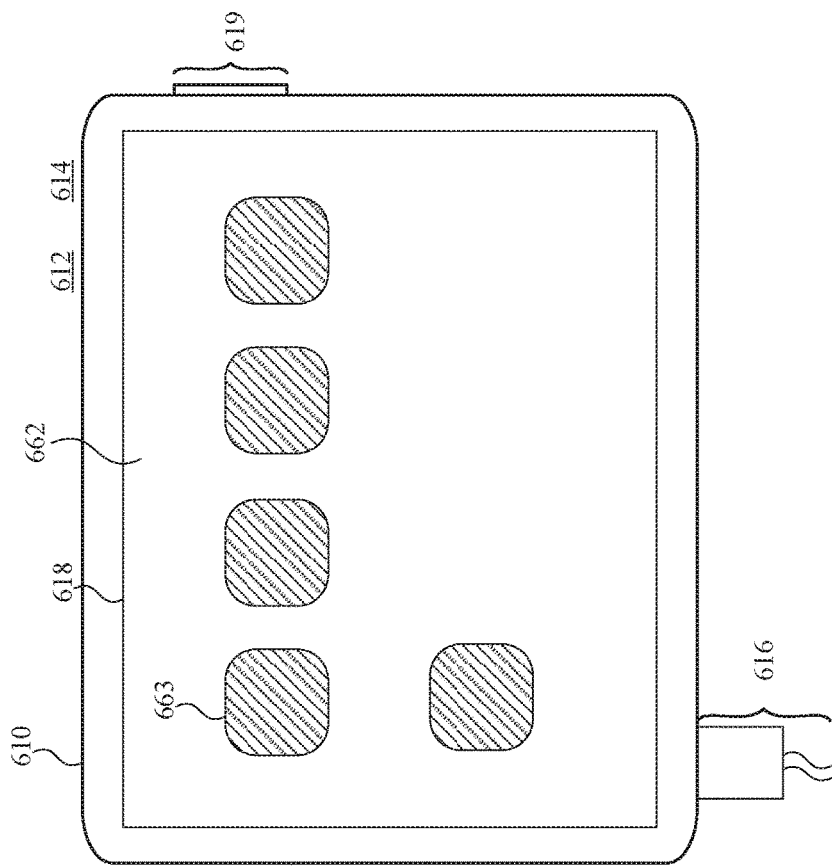
FIGS. 6N-6W illustrate user interfaces for configuring a user interface of a peripheral display unit in accordance with some embodiments.
Figure 6N:
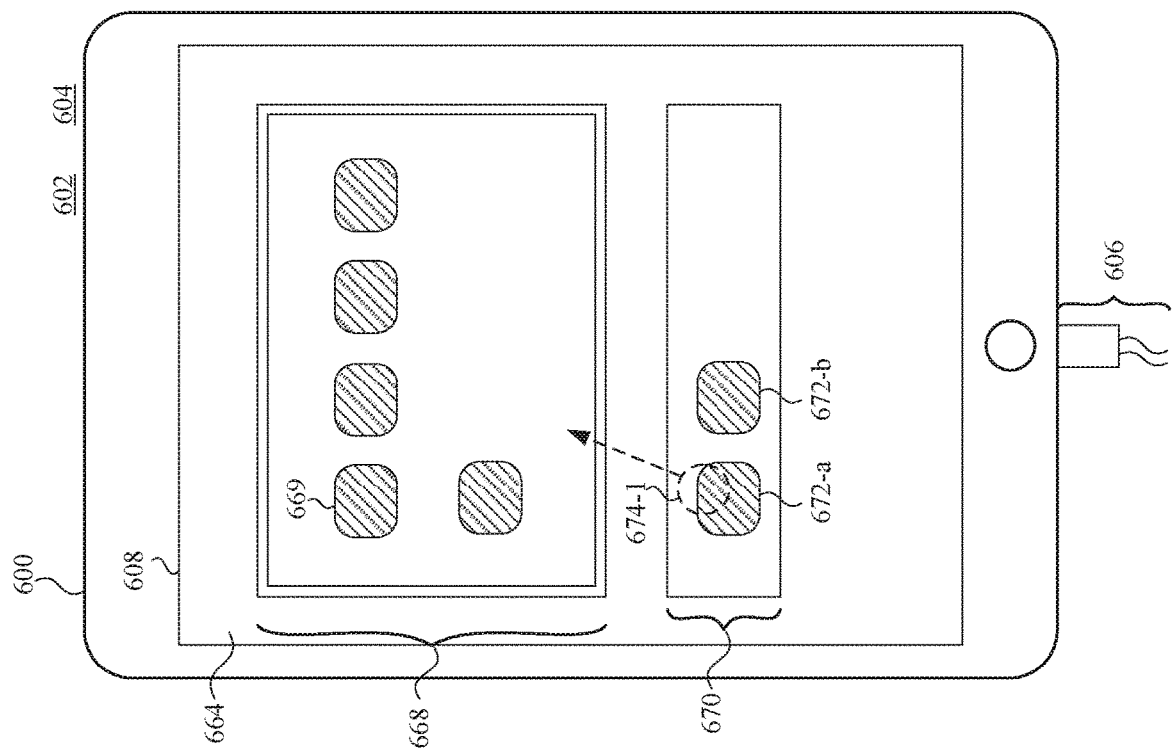

In each of FIGS. 6N-6V, device 600 is displaying on display 608 configuration interface 664. Configuration interface 664 comprises window 668, which in some embodiments is a representation of user interface 662. As shown in FIG. 6N, window 668 is a visual representation of user interface 662, containing user interface object representations, such as user interface object representation 669. In the depicted example in FIG. 6N, each of the user interface object representations in window 668 corresponds to a user interface object in user interface 662. Configuration interface 664 additionally comprises available object tray 670, which itself comprises available user interface object representations 672-a and 672-b.

As will be explained in greater detail below, configuration interface 664 allows for the configuration, via interface 664, of interface 662. It is important to note that, in some embodiments, configuration of user interface 662 can optionally be completed while a connection is active between device 600 and peripheral display unit 610. In some examples, configuration interface 664 can optionally be used when no connection is active. In some of those embodiments, peripheral display unit 610 does not display anything until the next time the relationship is established (as user interface 662 can optionally always be hosted on device 600 and served to peripheral display unit 610 live). In those examples, peripheral display unit 610 would of course not display user interface 662 at all when the relationship is not active. In the figures below, user interface 662 is illustrated as persistently displayed during all stages of configuration, for illustrative purposes.

Figure 6O:
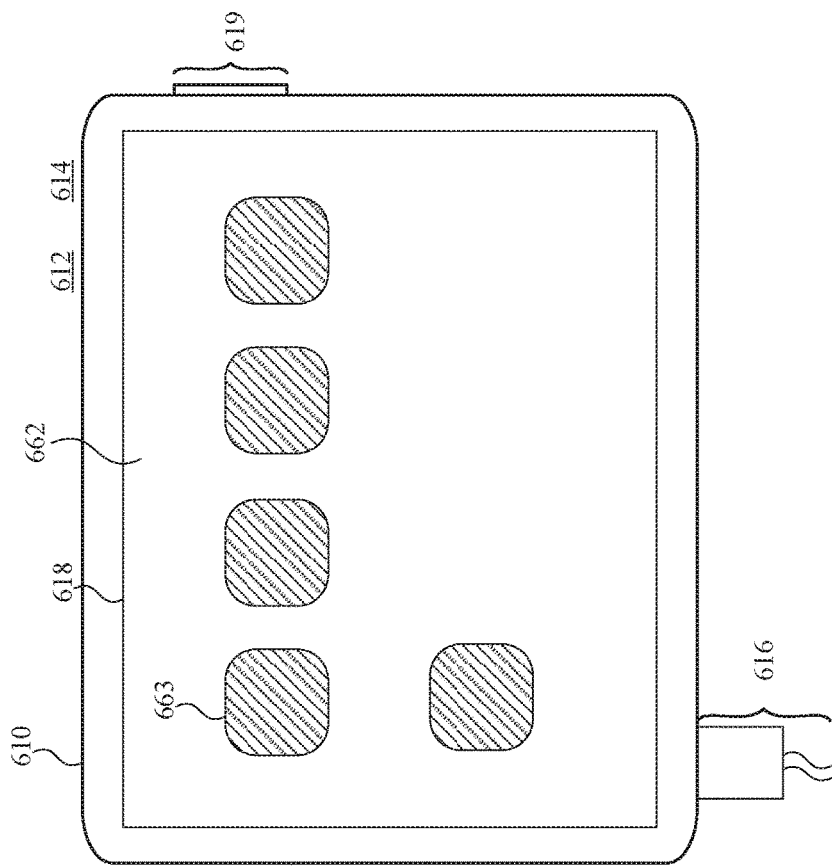
Figure 6O:
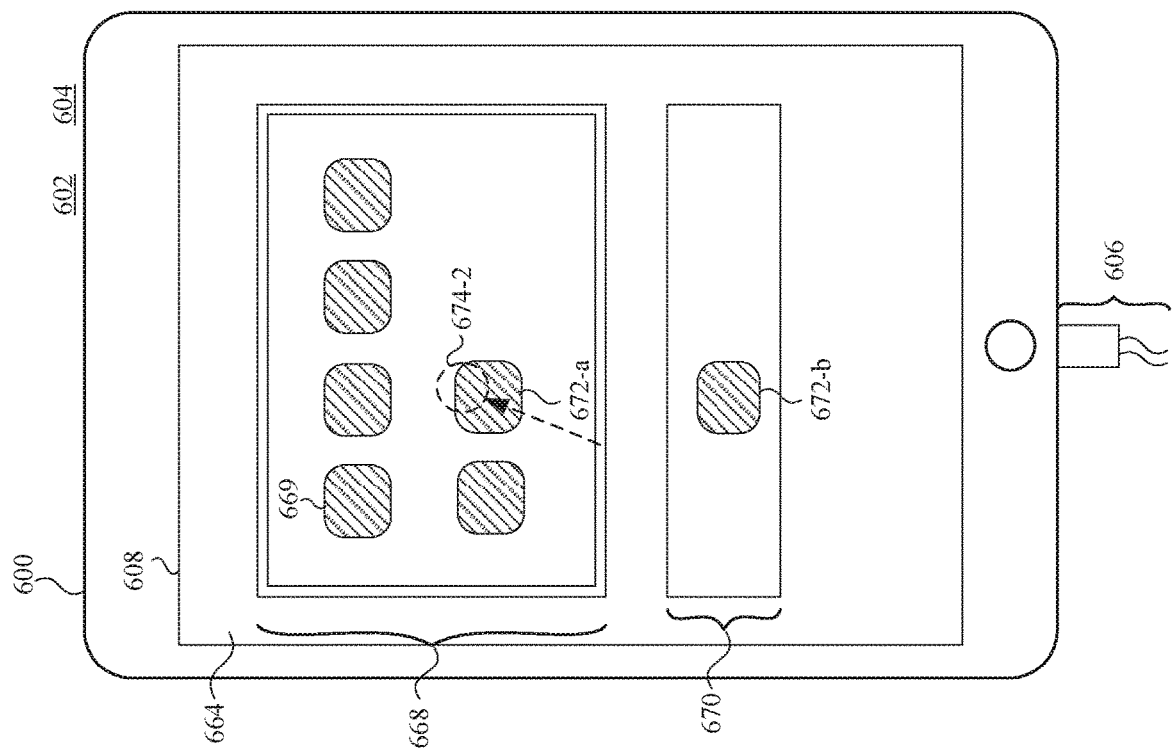
Figure 6P:
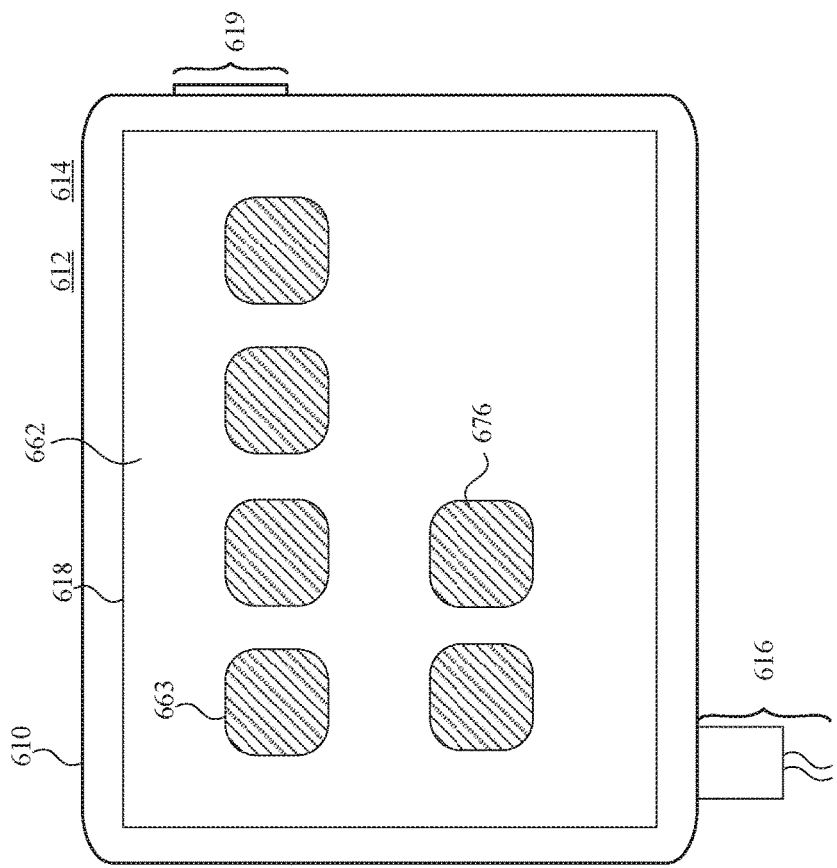
Figure 6P:
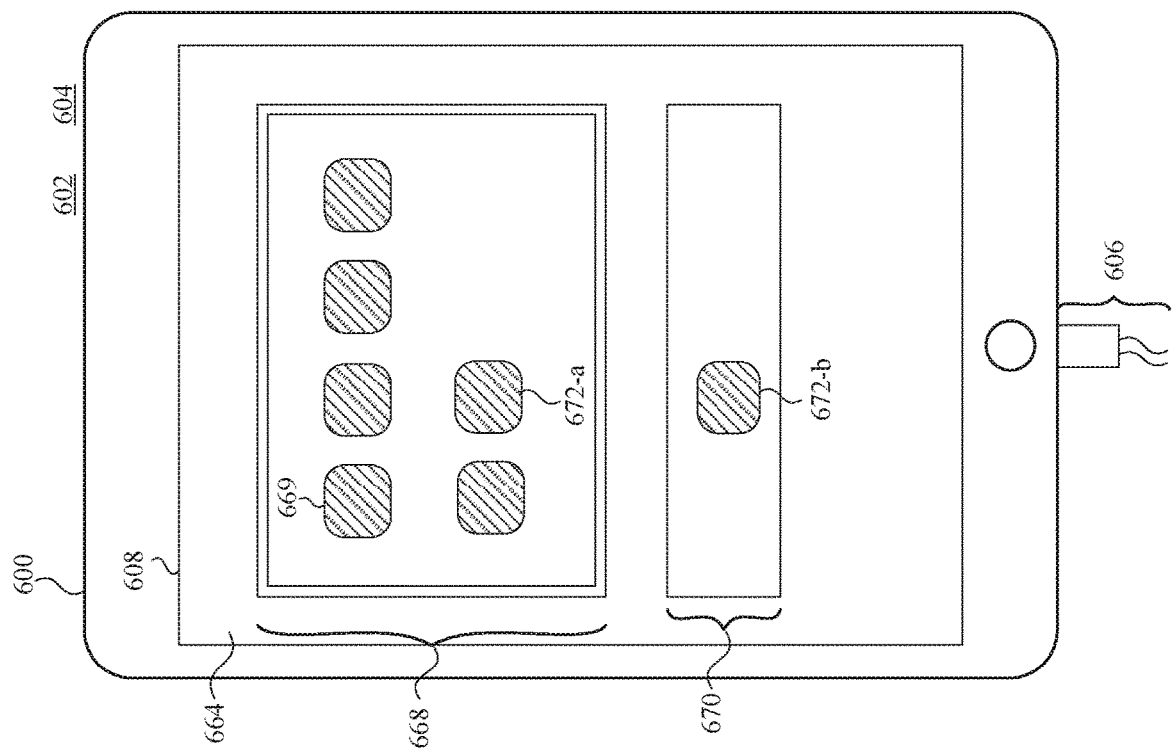

FIGS. 6N-6P depict the addition of a user interface object to user interface 662. In FIG. 6N, user input 674-1 is detected in the form of a touch contact detected at a location corresponding to available user interface object representation 672-a. Device 600 detects movement of input 674-1 from its original position at representation 672-a in tray 670 toward window 668.

In FIG. 6O, device 600 continues to detect the movement of user input 674 until it reaches its final position at 674-2. The device detects lift-off of the touch contact at the position corresponding to 674-2. In response to detecting user input 674, configuration interface 664 displays available user interface object representation 672-a moving from its original position in tray 670 to its final position in window 668. Configuration interface 664 can optionally display an animation of said movement. The movement of representation icons, in some embodiments, tracks the movement of a moving/dragging user input such as user input 674. In embodiments where a connection between device 600 and peripheral display unit 610 is not active, configuration interface 664 can optionally be updated as described above before the instruction to update user interface 662 is transmitted to peripheral display unit 610.

In FIG. 6P, a configuration instruction based on the user input depicted in FIGS. 6N and 6O has been passed from device 600 to peripheral display unit 610. This instruction can optionally be passed immediately upon receiving the above-described user input in embodiments where a connection is active, or later upon the reestablishment of a connection between device 600 and peripheral display unit 610. In accordance with the configuration instruction, user interface 662 is updated to display new user interface object 676, which corresponds to representation 672-a in window 668. In some embodiments, the user interface for the peripheral display unit 610 is generated on device 600 and pushed to peripheral display unit 610, and the new use interface object is displayed on the peripheral display unit 610 when an updated user interface generated by device 600 is pushed to peripheral display unit 610.

Figure 6Q:
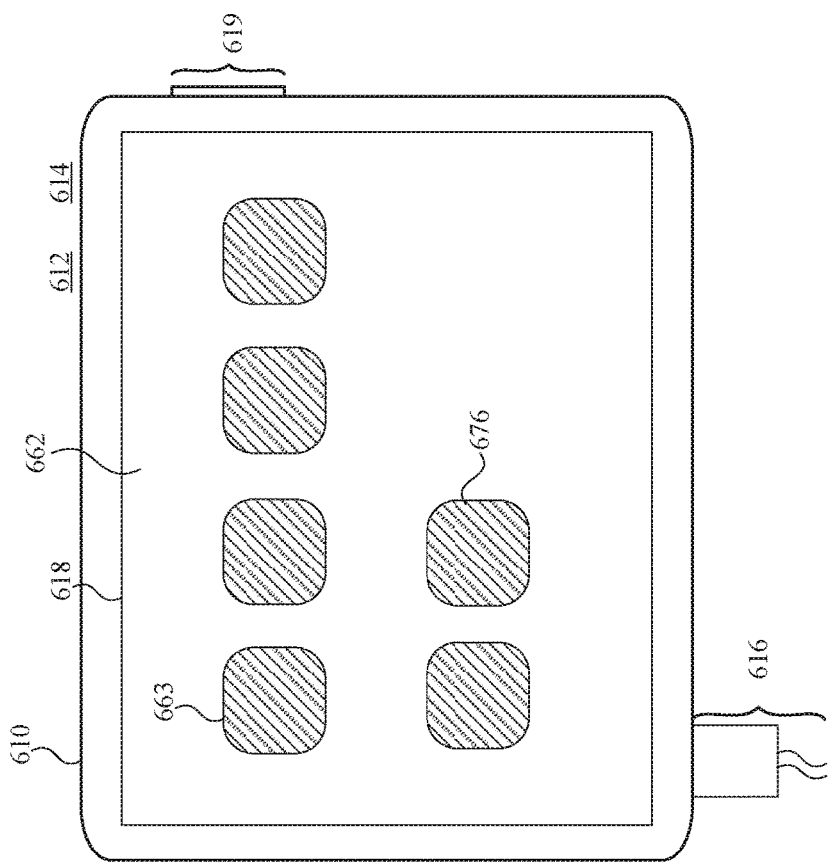
Figure 6Q:
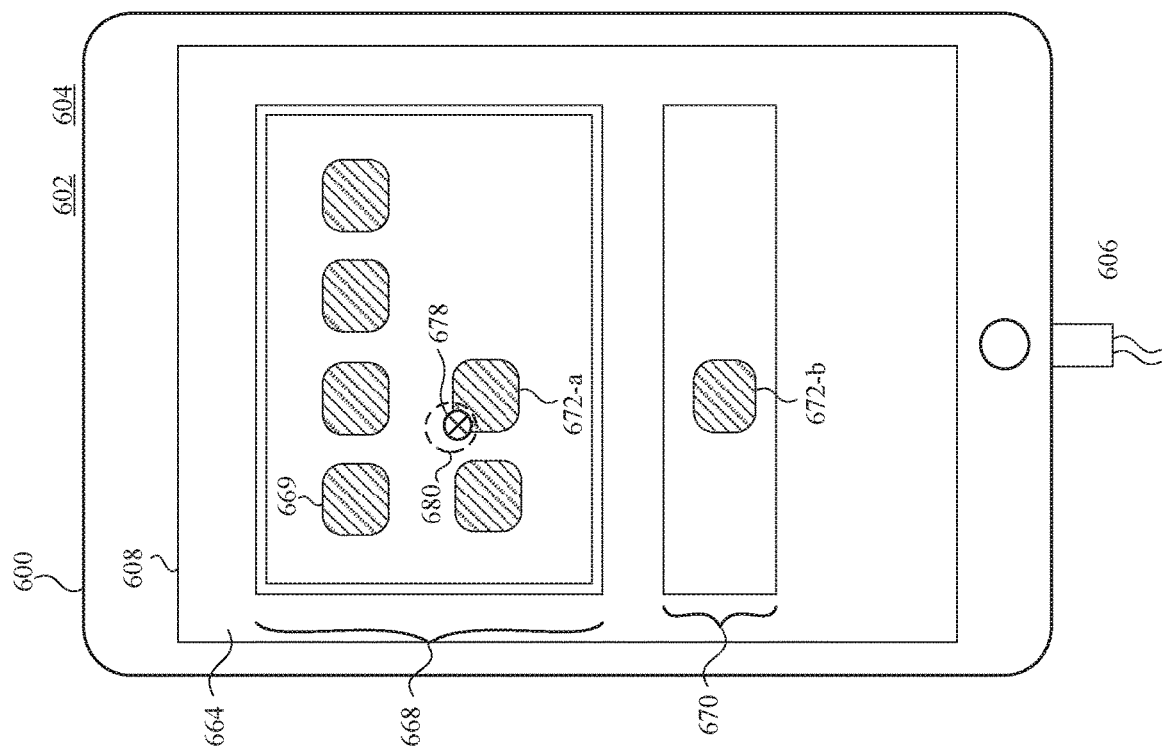
Figure 6R:
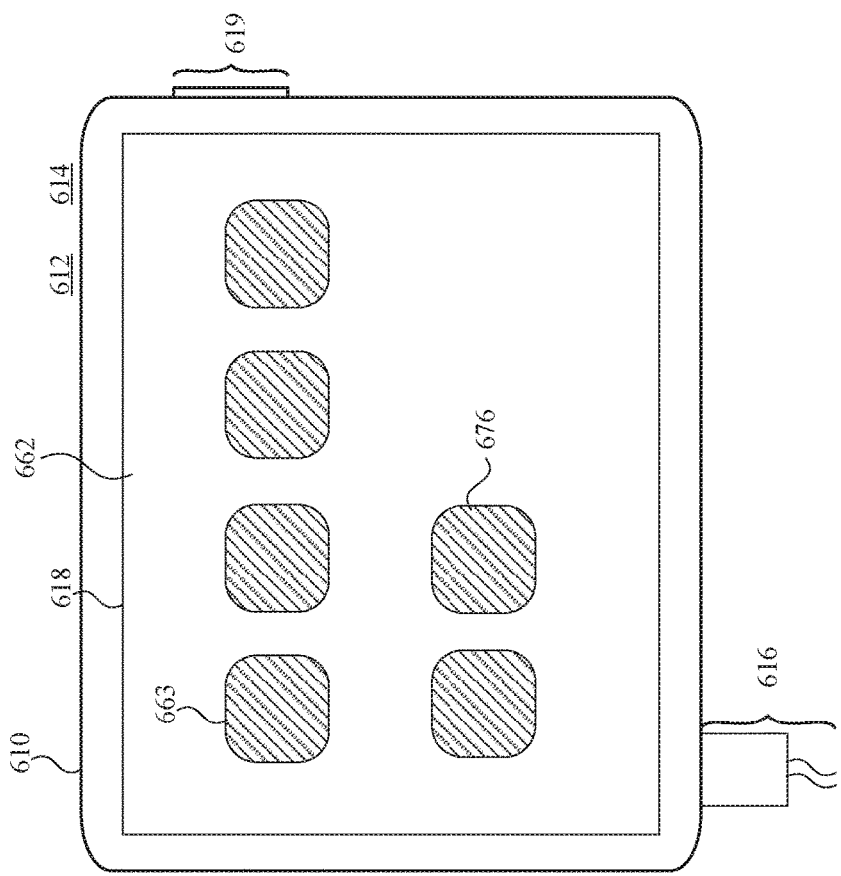
Figure 6R:
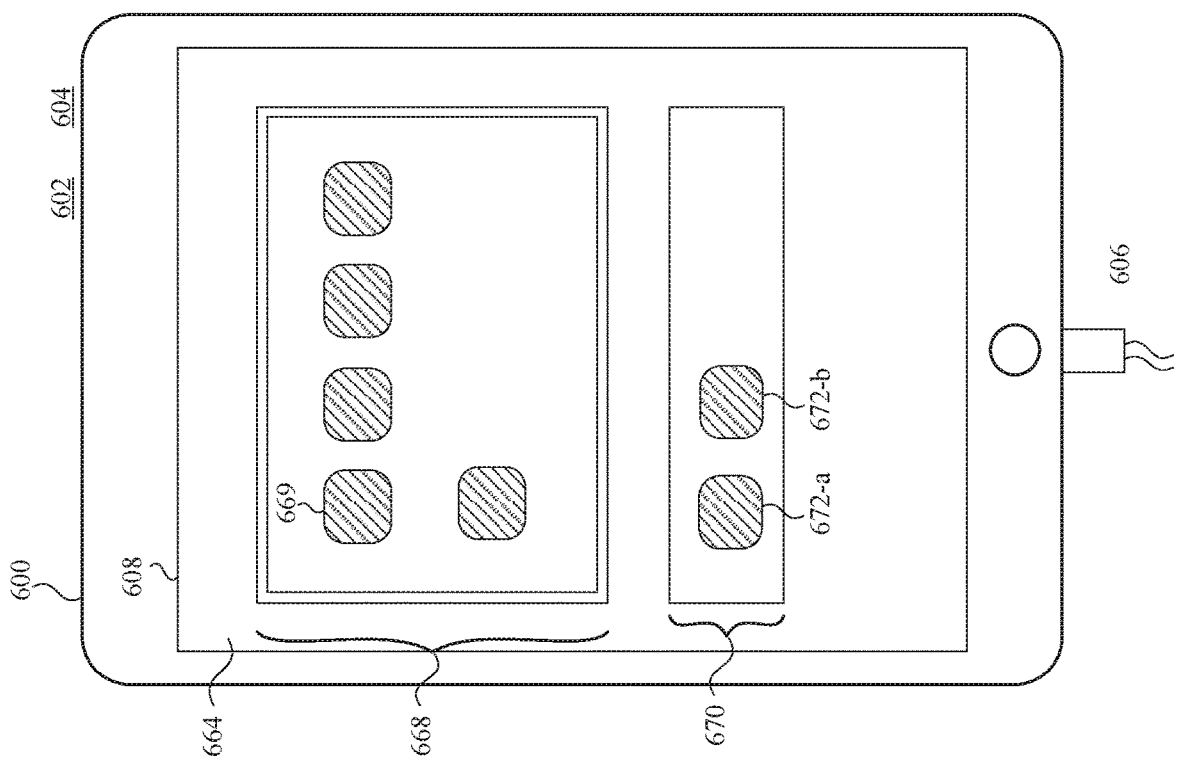
Figure 6S:
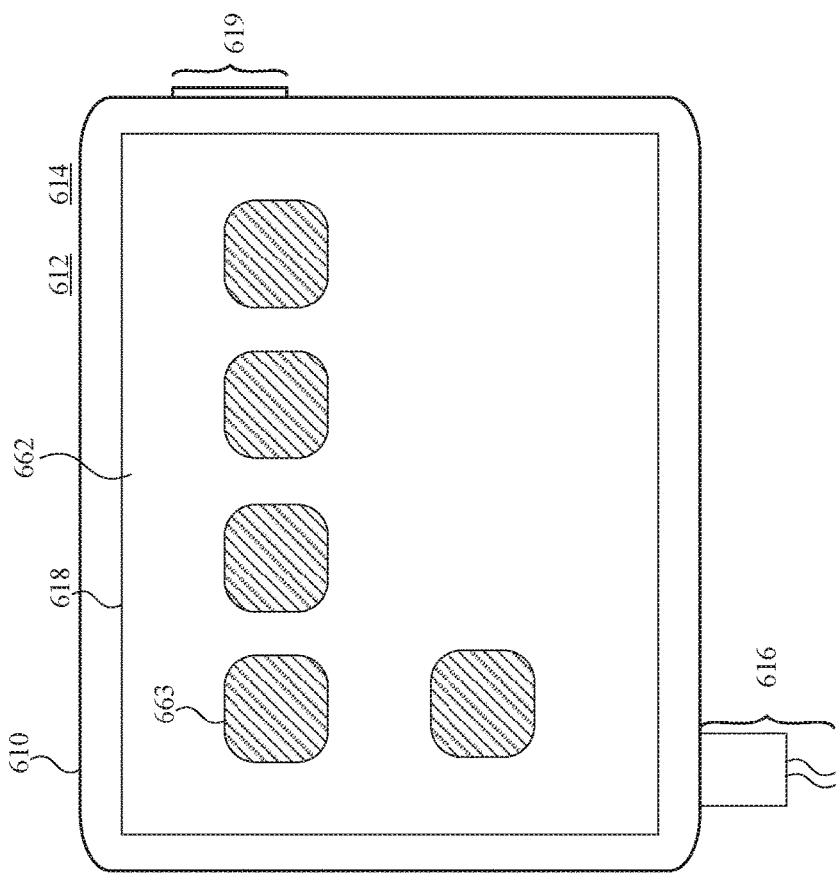
Figure 6S:
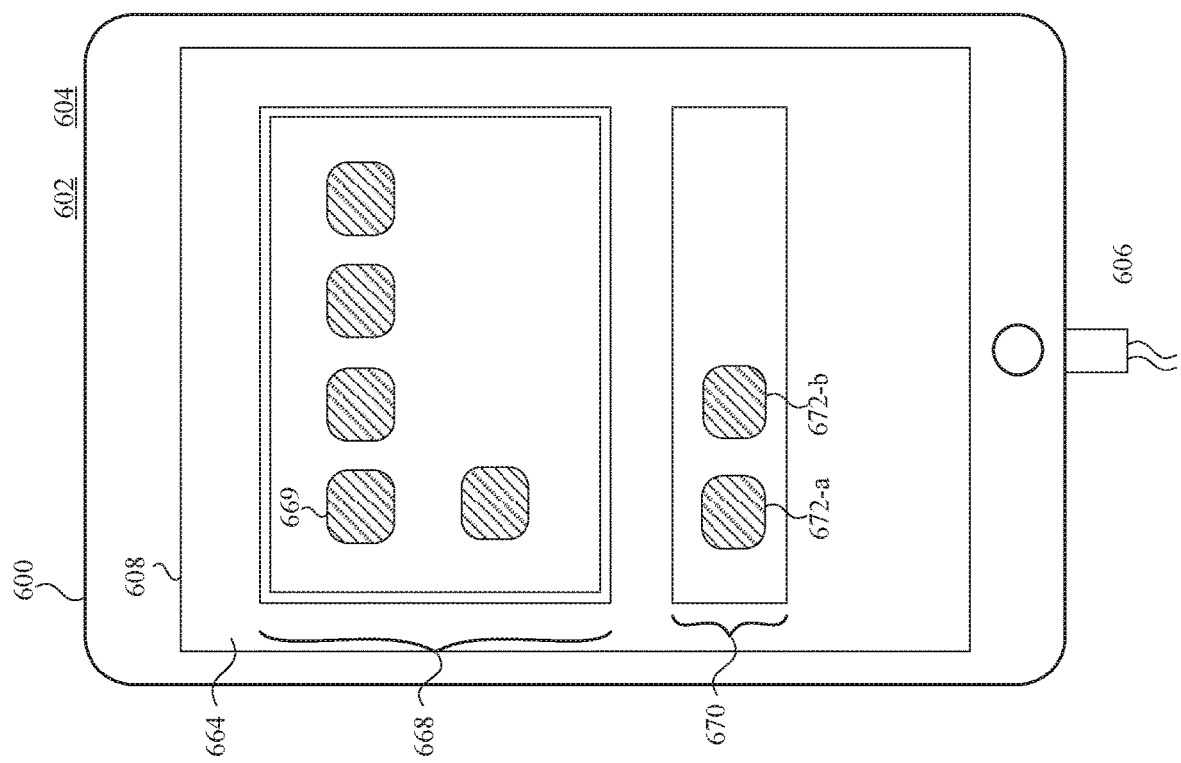

FIGS. 6Q-6S depict the removal of a user interface object from user interface 662. In FIG. 6Q, deletion affordance 678 is displayed, in some embodiments, to indicate a user interface object (or its representations in window 668) that can optionally be deleted. In the depicted example, user input 678 is detected in the form of a touch or tap contact detected at a location corresponding to deletion affordance 678.

In FIG. 6R, in response to detecting user input 674, configuration interface 664 displays the deletion/removal of user interface object representation 672-a from window 668, and displays that representation 672-a has returned to tray 670. Configuration interface 664 can optionally display an animation of said deletion (such as an animation of representation 672-a moving back to tray 670). In embodiments where a connection between device 600 and peripheral display unit 610 is not active, configuration interface 664 can optionally be updated as described above before the instruction to update user interface 662 is transmitted to peripheral display unit 610.

In FIG. 6S, a configuration instruction based on the user input depicted in FIG. 6Q has been passed from device 600 to peripheral display unit 610. This instruction can optionally be passed immediately upon receiving the above-described user input in embodiments where a connection is active, or later upon the reestablishment of a connection between device 600 and peripheral display unit 610. In accordance with the configuration instruction, user interface 662 is updated to no longer display user interface object 676.

Figure 6T:
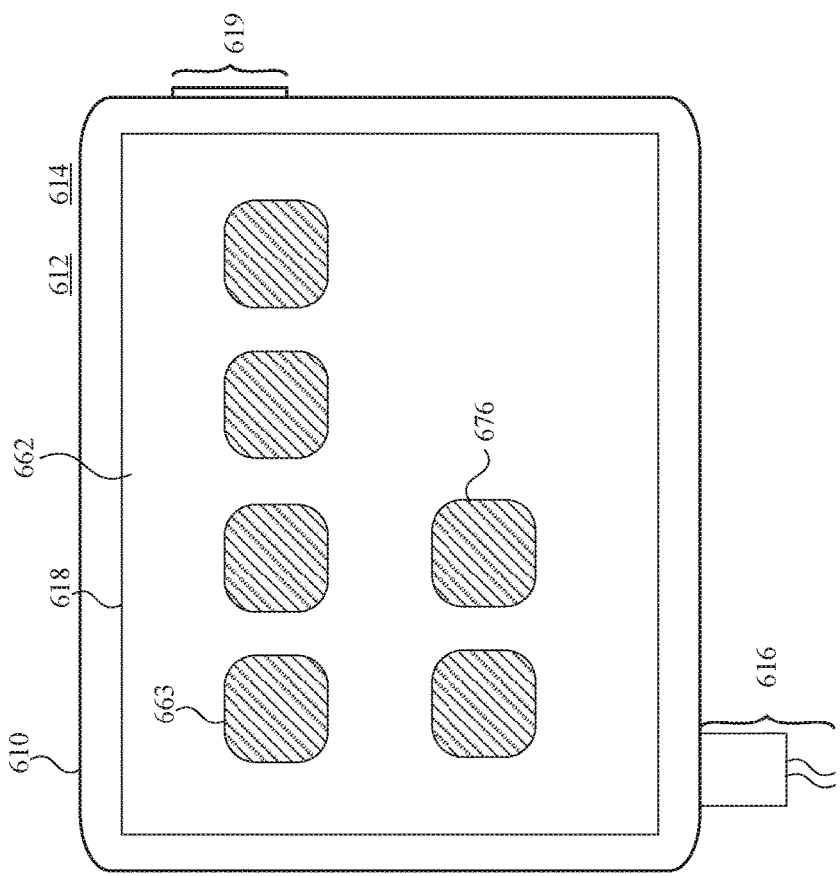
Figure 6T:
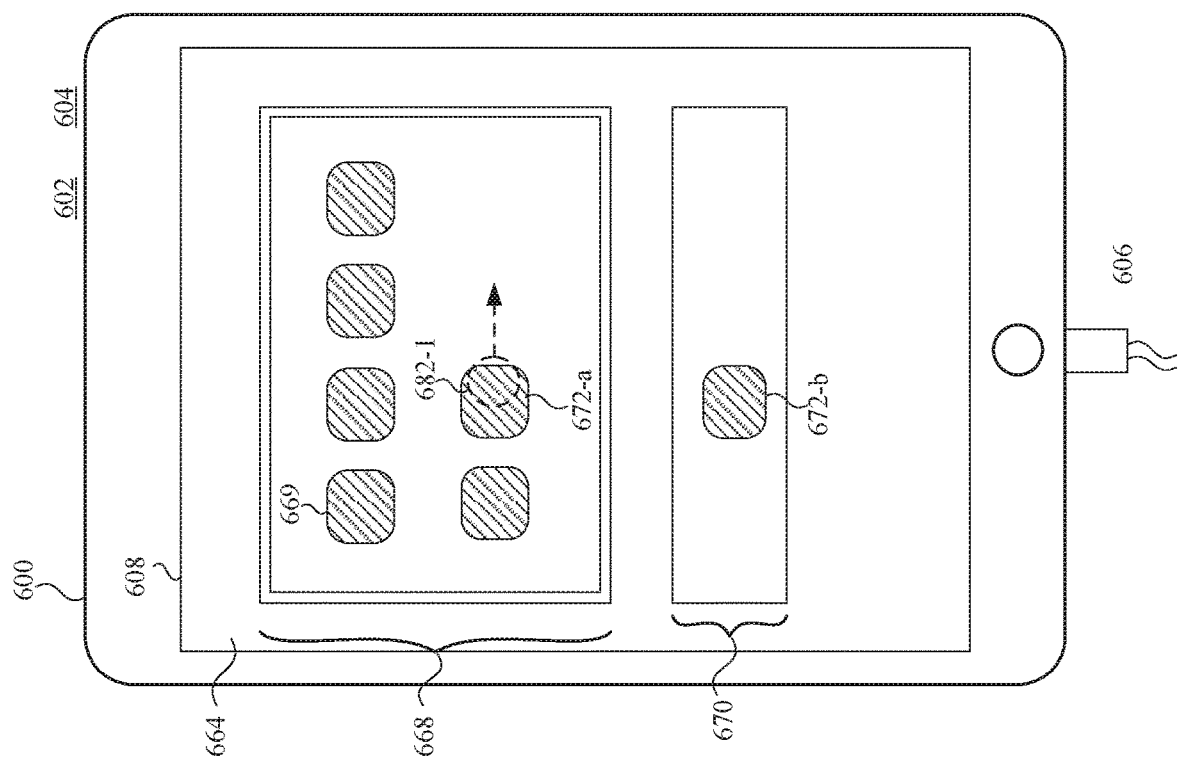
Figure 6U:
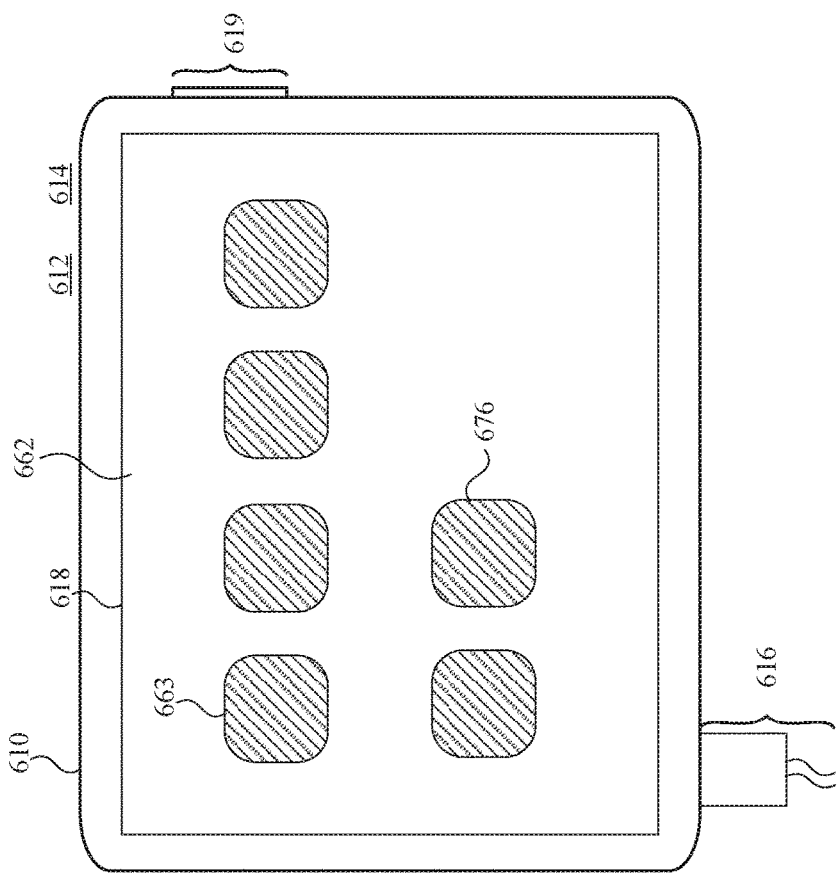
Figure 6U:
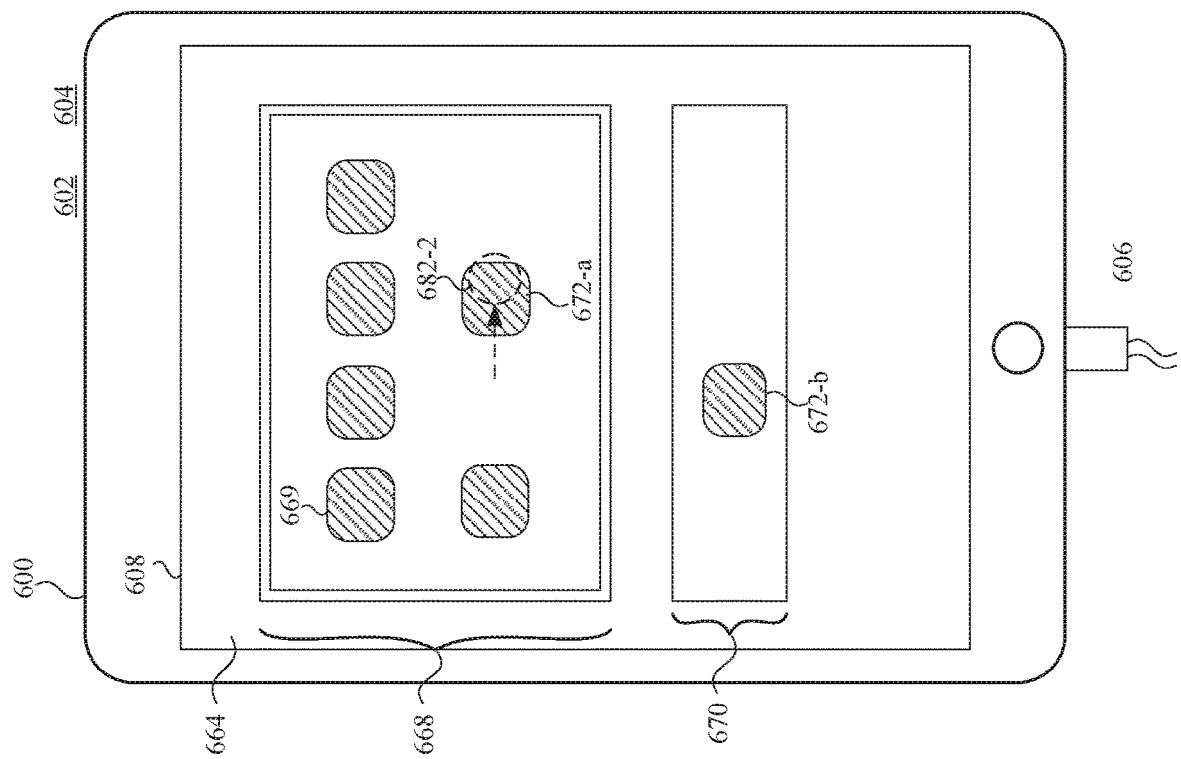
Figure 6V:
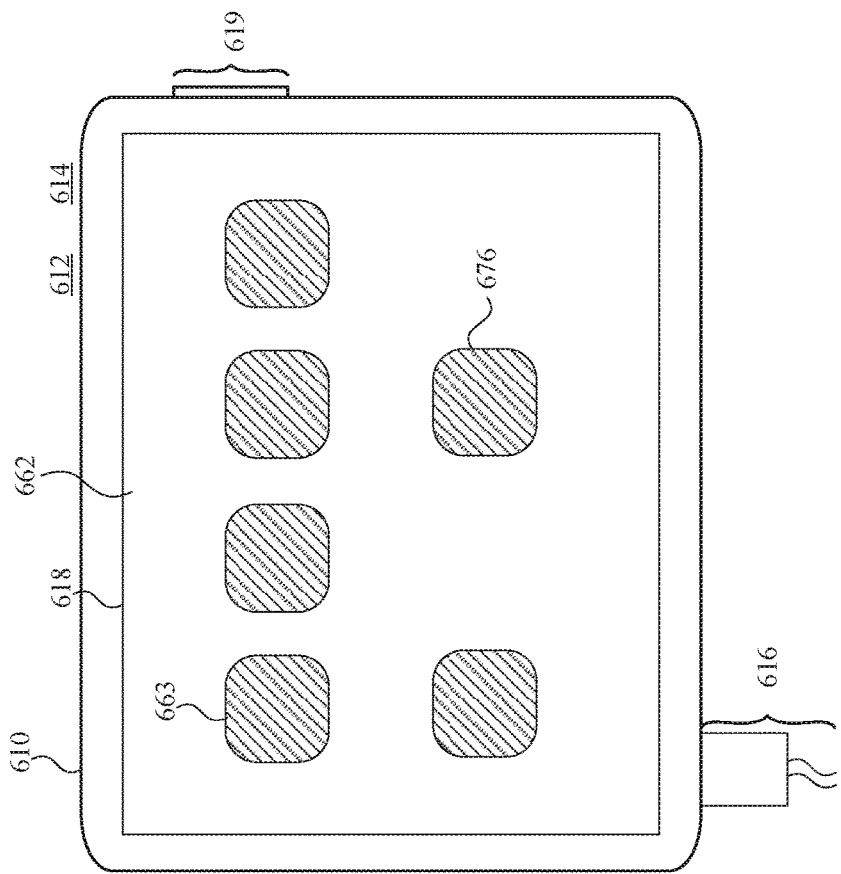
Figure 6V:
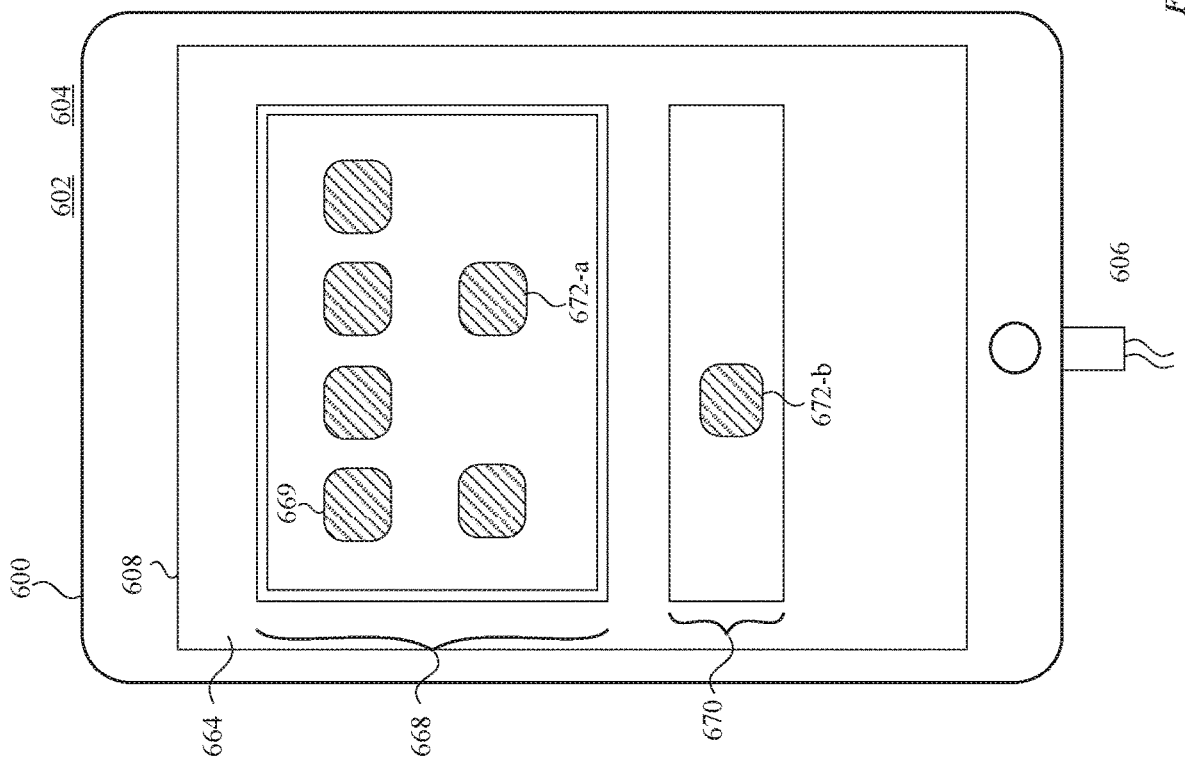
Figure 6W:
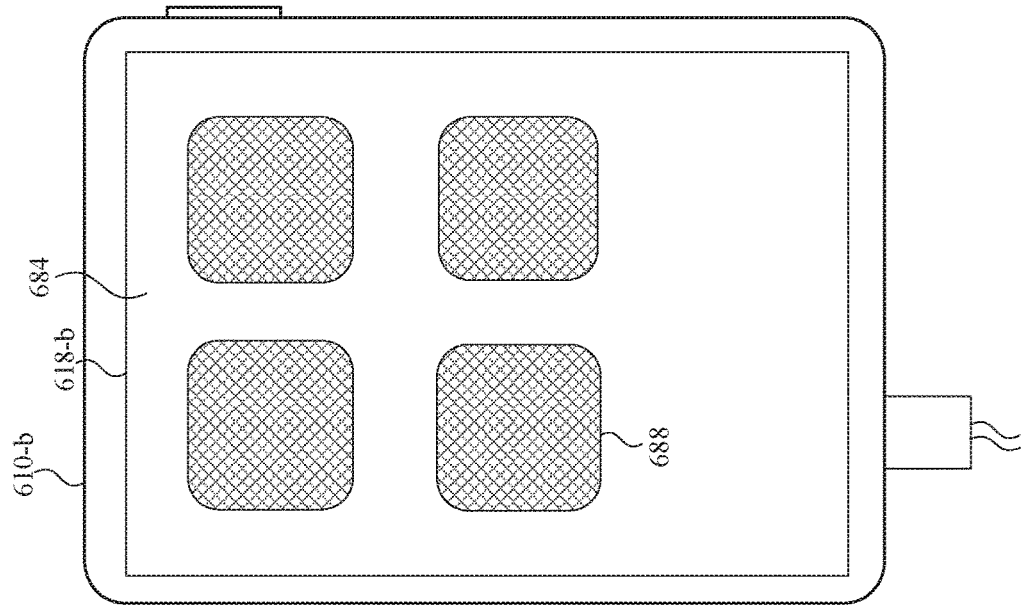
Figure 6W:
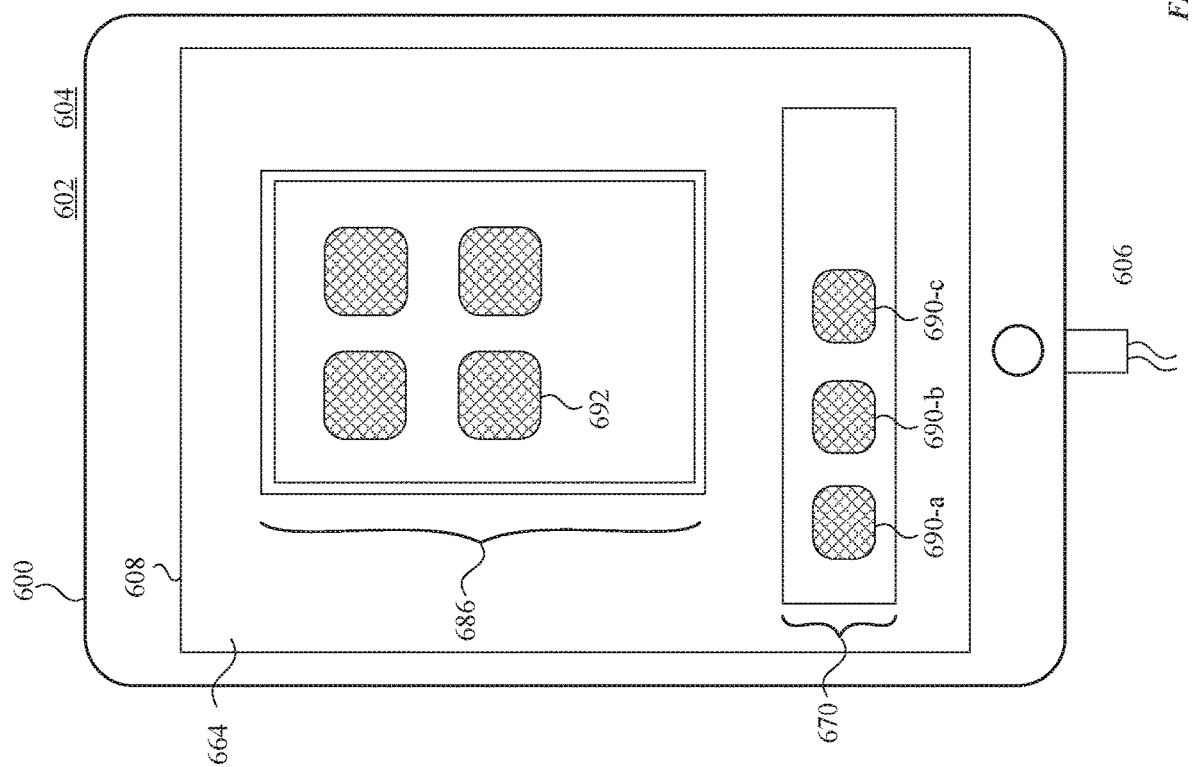

FIGS. 6T-6V depict the rearrangement of a user interface object in user interface 662. In FIG. 6T, user input 682-1 is detected in the form of a touch contact detected at a location corresponding to user interface object representation 672-a. Device 600 detects movement of input 682-1 from its original position at representation 672-a in window 670 toward a new position to the right.

In FIG. 6U, device 600 continues to detect the movement of user input 682 until it reaches its final position at 682-2. The device detects liftoff of the touch contact at the position corresponding to 682-2. In response to detecting user input 682, configuration interface 664 displays user interface object representation 672-a moving from its original position in window 668 to its final position further to the tight in window 668. Configuration interface 664 can optionally display an animation of said movement. The movement of the representation icons, in some embodiments, tracks the movement of a moving/dragging user input such as user input 682. In embodiments where a connection between device 600 and peripheral display unit 610 is not active, configuration interface 664 can optionally be updated as described above before the instruction to update user interface 662 is transmitted to peripheral display unit 610.

In FIG. 6V, a configuration instruction based on the user input depicted in FIGS. 6T and 6U has been passed from device 600 to peripheral display unit 610. This instruction can optionally be passed immediately upon receiving the above-described user input in embodiments where a connection is active, or later upon the reestablishment of a connection between device 600 and peripheral display unit 610. In accordance with the configuration instruction, user interface 662 is updated to display the repositioning of user interface object 676, which corresponds to the repositioning of representation 672-a in window 668.

Attention is now directed to FIG. 6W, which displays exemplary user interfaces and configuration user interfaces for peripheral display unit 610-b, which is different from the peripheral display unit 610 depicted in FIGS. 6N-6V. As shown in FIG. 6W, peripheral display unit 610-b has display 618-b that is of a different size and different shape than display 618. In some embodiments, display 618-b is also of a different resolution than display 618. Peripheral display unit 610-b has user interface 684 that is different from user interface 662. User interface 684 contains user interface objects such as user interface object 688. The user interface objects on user interface 684 can optionally be different in identity, function, size, composition, arrangement, and appearance from the user interface objects on user interface 662.

FIG. 6W depicts that configuration interface 664, in some examples, further comprises second window 686, which is a representation of user interface 684. In accordance with the differences of user interface 684, window 686 is also different from previously described window 668, containing user interface object representations, such as representation 692, that correspond to the user interface objects of user interface 684. In FIG. 6W, tray 670 contains available user interface icon representations 690-a, 690-b, and 690-c, which are different from the available user interface icon representations in FIGS. 6N-6V. According to a configuration interface 670 can optionally include different available user interface object representations in tray 670 in accordance with which user interface is being configured.

FIGS. 7A-7H are flow diagrams illustrating exemplary process 700 for establishing a relationship between a device and a peripheral display unit in accordance with some embodiments, such as those described above with reference to FIGS. 6A-6I. Process 700 is carried out by device 500 (FIG. 5), which can optionally be electronic device 100 or 300 (FIGS. 1A and 3A), in some embodiments.

Figure 7A:
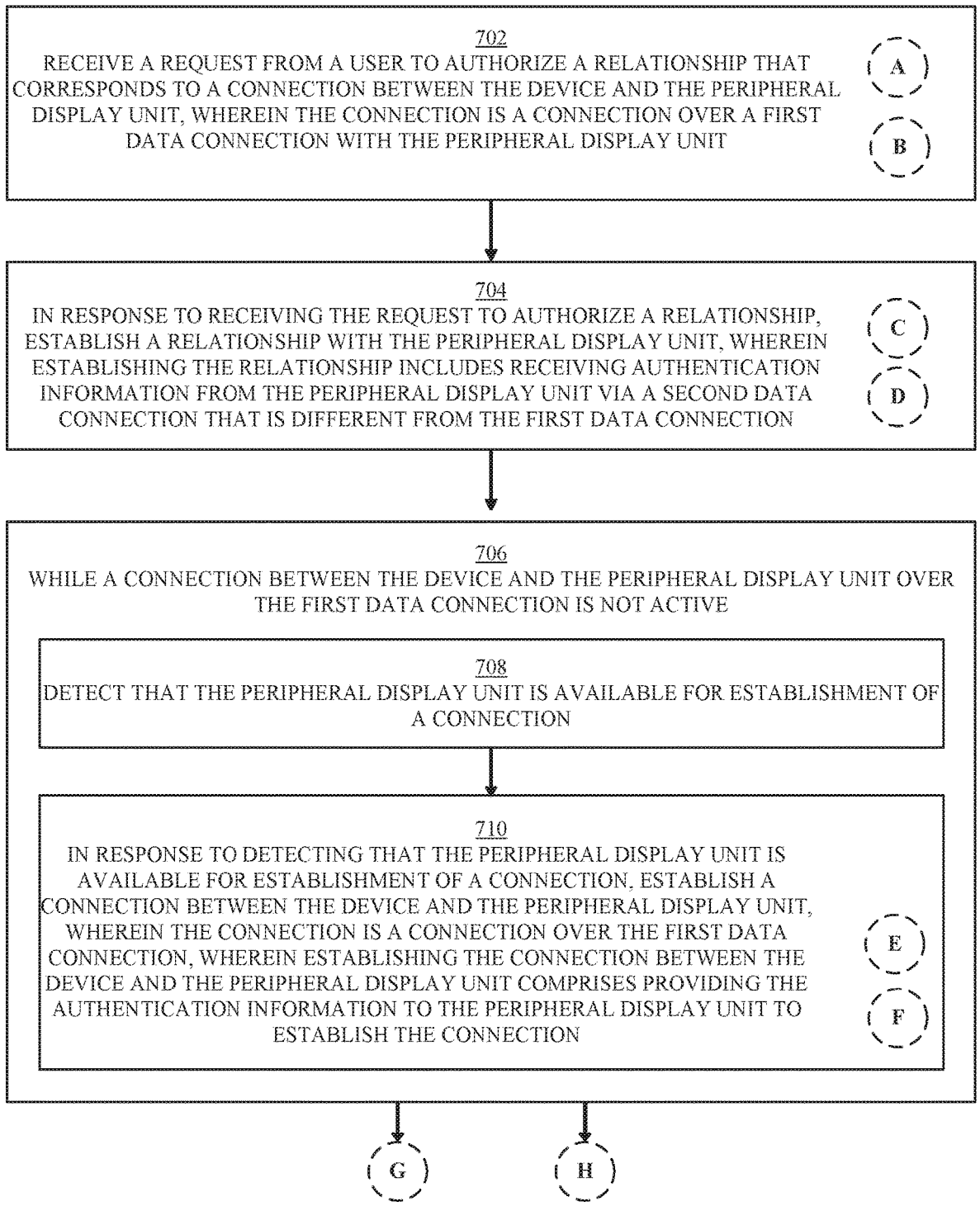

Attention is now directed to FIG. 7A, which is a flow diagram illustrating an exemplary process for establishing a relationship between a device and a peripheral display unit.

At block 702, the device receives a request from a user to authorize a relationship that corresponds to a connection between the device and the peripheral display unit, wherein the connection is a connection over a first data connection with the peripheral display unit. An exemplary peripheral display unit is peripheral display unit 610 of FIG. 6A. In some embodiments, the first data connection is a wireless data connection, such as a Wi-Fi data connection. An exemplary Wi-Fi data connection is a connection formed between first wireless data interface 602 and first wireless data interface 612 in FIG. 6A.

In some embodiments, the relationship is a stored relationship between the device and the peripheral display unit, such that the device and/or peripheral display unit store data, on a local memory, indicating that a connection with the other is authorized. The device and the peripheral display unit may be said to "remember" one another. The relationship, as explained below, can optionally permit automatic reconnection of the authorized data connection at future points in time, such as whenever the device and peripheral display unit are within range of the authorized data connection (e.g., when a wireless connection is able to connect, or when a wired physical connection is plugged in). The relationship can optionally authorize the exchange of phone-call data, user interface data, web-browsing data, media data, video stream data, navigation data, etc., with or without user input. In some embodiments, the relationship is a between a mobile phone and a motor vehicle, such as a CarPlay-enabled vehicle.

An exemplary request to authorize a relationship that corresponds to a connection over the first data connection is user input 628 in FIG. 6B, which can optionally be a touch or tap input detected by a touch screen. In some embodiments, the user selects "Authorize Wireless CarPlay" to authorize a CarPlay relationship corresponding to a Wi-Fi connection between the device and the peripheral display unit, which is integrated into a vehicle.

At block 704, in response to receiving the request to authorize a relationship, the device establishes a relationship with the peripheral display unit, wherein establishing the relationship includes receiving authentication information from the peripheral display unit via a second data connection that is different from the first data connection. In some embodiments, the second data connection is a wired data connection, such as a USB data connection. An exemplary wired data connection is the wired data connection between wired data interface 606 and wired data interface 616 in FIG. 6A. In some embodiments, the second data connection is a wireless data connection, such as a Bluetooth data connection. An exemplary Bluetooth data connection is the Bluetooth data connection between second wireless data interface 604 and second wireless data interface 614 in FIG. 6A. In some embodiments, establishing the relationship between the device and the peripheral display unit includes receiving authentication information over the second data connection, such as a USB data connection or a Bluetooth data connection, from the peripheral display unit. In some embodiments, the authentication information includes credentials, such as Wi-Fi credentials, for establishing the first data connection and for connecting the first data connection immediately and/or in the future.

Blocks 706-710 occur while a connection between the device and the peripheral display unit over the first data connection is not active. That is, the relationship corresponding to the connection over the first data connection can optionally be established, but the actual data connection itself is not active. For example, for a device having established a stored relationship with a peripheral display unit in a vehicle, the device may be out of range of the vehicle such that the Wi-Fi connection between the device and the peripheral display unit is not currently connected.

At block 708, the device detects that the peripheral display unit is available for establishment of a connection. Establishment of a connection may refer to the establishment of the first data connection referred to above. For example, in some embodiments, this detection occurs when the device is brought within range of the peripheral display unit such that one or more of the wireless data interfaces in the device, such as wireless data interface 602 and 604, detects the presence of the peripheral display unit. In some other embodiments, this detection occurs when the device is connected to the peripheral display unit via a wired data connection, such as one supported by wired data interface 606.

At block 710, in response to detecting that the peripheral display unit is available for establishment of a connection, the device establishes a connection between the device and the peripheral display unit, wherein the connection is a connection over the first data connection, wherein establishing the connection between the device and the peripheral display unit comprises providing the authentication information to the peripheral display unit to establish the connection. Thus, in some embodiments, to establish an active connection, the device provides the earlier-shared authentication information back to the peripheral display unit. This allows the peripheral display unit to authenticate, via checking the credentials, that the device is approved to form a connection with the peripheral display unit. For example, in some embodiments, while the Wi-Fi connection referred to above is not actively connected (e.g., by a connection), in response to the device coming within range of the peripheral display unit and detecting (via one or more wireless data connections such as Bluetooth and Wi-Fi) that the peripheral display unit is available for the establishment of a connection, the device establishes a Wi-Fi connection with the peripheral display unit. The process of establishing said Wi-Fi connection includes, in some embodiments, sending the Wi-Fi credentials back to the peripheral display unit, thereby proving that a trusted relationship was previously formed.

Figure 7C:
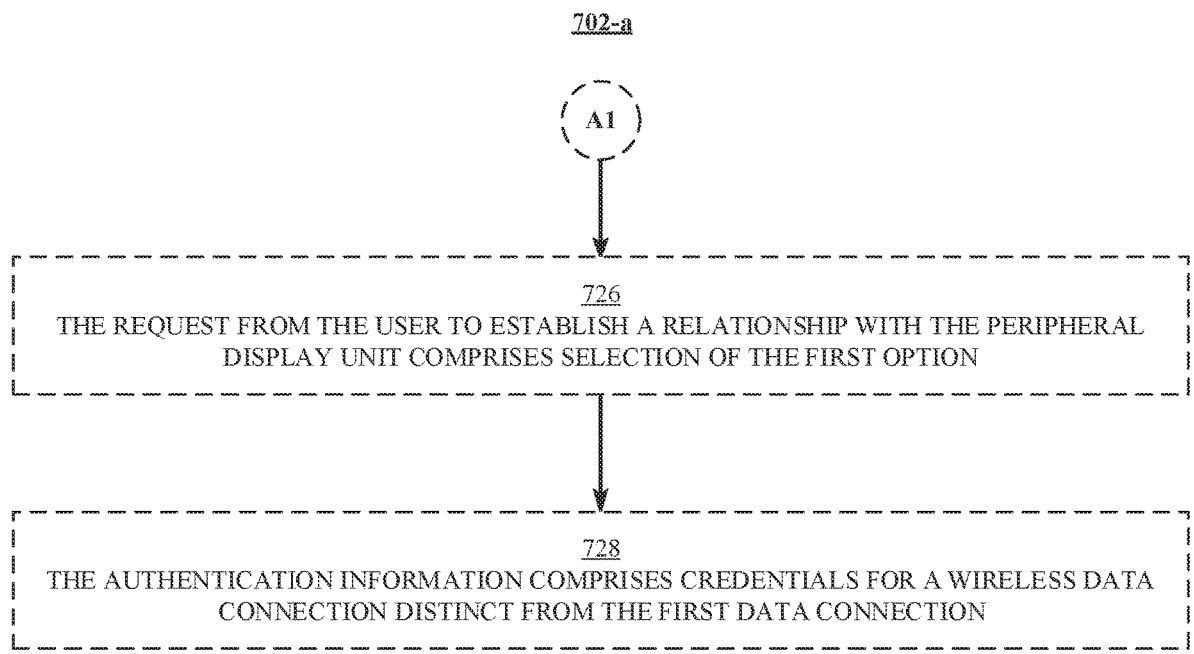

Attention is now directed to FIGS. 7B-7C, which depict flow diagrams illustrating an exemplary process for establishing a relationship between a device and a peripheral display unit via a wired connection. As explained above with reference to FIG. 6, care should be taken to distinguish between the connection itself (e.g., the connection) being wired or wireless, versus the method for establishing the relationship being wired or wireless. FIGS. 7B and 7C represent an exemplary method in which the method for establishing the relationship is wired. For example, the relationship can optionally be established over a wired physical connection such as a USB wire, which can optionally carry data creating a wired data connection. FIGS. 7B and 7C depict method 702-a, which is an optional process performed as a part of block 702. That is, the steps in method 702-a primarily expand on the process of receiving a request to establish a relationship, as explained above with reference to block 702.

At block 712, optionally, the second data connection (of block 704) is a wired data connection. An exemplary wired data connection is the wired data connection between wired data interface 606 and wired data interface 612 in FIG. 6A. In some embodiments, the wired data connection is a data connection between a USB connector, such as one integrated into a peripheral display unit in a vehicle, and a micro-USB connector or a Lightning connector, such as one integrated into a mobile device.

Blocks 714-724 occur while a relationship has not been established with the peripheral display unit. That is, in some embodiments, these steps occur before the device and the peripheral display unit have exchanged credentials with one another or stored data reflecting a relationship with one another. In some embodiments, these steps occur upon the first time the device and the peripheral display unit come into connection or communication with one another, such as after a user purchases a new device (e.g., a new phone) or a new peripheral display unit (e.g., a new data-connection-enabled system).

At block 714, optionally, the device receives a communication from the peripheral display unit over the wired data connection between the device and the peripheral display unit. The communication received by the device can optionally be a message indicating that the peripheral display unit is capable of establishing a relationship with the device, such as a message indicating that the peripheral display unit is CarPlay-enabled. The message can optionally further indicate that no relationship has yet been established between the device and the peripheral display unit. In some embodiments, the user connects the device to the peripheral display unit via a wired connection (such as a USB connection), possibly for charging, and, upon connecting, the device and the peripheral display unit can optionally automatically exchange messages, including the communication from the peripheral display unit to the device explained above.

At block 718, optionally, in response to receiving the communication, the device displays a first user interface prompting the user to authorize a relationship with the peripheral display unit. An exemplary user interface prompting the user to authorize a stored relationship with the peripheral display unit is user interface 620 in FIG. 6B.

At block 720, optionally, the user interface includes a first option corresponding to authorizing a wireless relationship between the device and the peripheral display unit. Selection of this option can optionally cause the relationship established to be one that allows for a wireless connection, including a wireless connection established immediately and wireless connections automatically established at future times. Thus, despite the setup process being carried out over a wired connection, the device can optionally establish a wireless relationship that allows the exchange of content over a wireless data connection, such as the Wi-Fi relationship described above. An exemplary first option is wireless relationship affordance 622 in FIG. 6B.

In some embodiments, selection of this option can optionally allow for the establishment of a wired relationship (as described below) in addition to a wireless relationship. This is because a wired relationship can optionally be considered a lesser-and-included authorization, as it may be a more secure connection, a more reliable connection, and/or a less battery-intensive connection. In some embodiments, the device would be authorized to connect to the peripheral display unit via either a wireless connection (e.g., Wi-Fi) or a wired connection (e.g., USB). For example, if, at a future time, the wireless data interface of the device were disabled, a connection via a wired connection could still be established if the device was connected to the peripheral display unit.

At block 722, optionally, the user interface includes a second option corresponding to authorizing a wired relationship between the device and the peripheral display unit. Selection of this option can optionally cause the relationship established to be one that allows for a wired connection, including a wired connection established immediately and wired connections automatically established at future times. In some embodiments, the device would thus not be authorized to automatically connect wirelessly to the peripheral display unit, but it would be authorized to automatically connect via a wired connection to the peripheral display unit. Therefore, in some embodiments, when the user plugs in the device to the peripheral display unit (e.g., by charging over a USB connection), the device can optionally automatically establish a data connection (e.g., a connection) to the peripheral display unit for sharing content. An exemplary second option is wired relationship affordance 624 in FIG. 6B.

In some embodiments, selection of this second option can optionally prevent the device from prompting the user to authorize a wireless relationship upon future instances of the device being connected to the peripheral display unit via a wired connection.

At block 724, optionally, the user interface includes a third option corresponding to authorizing a charging-only connection between the device and the peripheral display unit. In some embodiments, by selecting this third option, the user denies permission to the device to authorize either a wireless or a wired relationship. Thus, in some embodiments, the device does not connect to the peripheral display unit either immediately or in the future (without subsequent user intervention) for the exchange of content. Rather, in some embodiments, the wireless connection is used only to charge the device's battery, not to exchange content. In some embodiments, selection of this third option can optionally prevent the device from prompting the user to authorize a relationship upon future instances of the device being connected to the peripheral display unit via a wired connection. An exemplary third option is charge-only affordance 626 in FIG. 6B.

At block 726, optionally, the request from a user to establish a relationship with the peripheral display unit comprises selection of the first option. In some embodiments, selection of the first option comprises selection of an affordance representing the first option. In some embodiments, selection of the first option comprises detection of a touch input at a location corresponding to the first option. An exemplary selection of the first option is user input 628 in FIG. 6B, which in some embodiments can optionally be a touch or tap input on a touch screen. In some embodiments, a user selecting the first option in the displayed user interface to authorize a wireless data connection constitutes, at least in part, the request to establish a relationship with the peripheral display unit.

At block 728, optionally, the authentication information (of block 704) comprises credentials for a wireless data connection distinct from the first data connection. An exemplary wireless data connection distinct from the first data connection is a data connection between second wireless data interface 604 and second wireless data interface 614 in FIG. 6A, such as short-range, low-power, and/or low-bandwidth wireless data connection (e.g., a Bluetooth data connection). In some embodiments, the first data connection is high-power, high-bandwidth, and/or long-range wireless data connection (e.g., a Wi-Fi data connection) and the wireless data connection distinct from the first data connection is a Bluetooth data connection. In some embodiments, Bluetooth credentials are shared between the peripheral display unit and the device over the wired connection during the setup process, such that the wireless data connection distinct from the first data connection can be automatically authenticated and connected immediately and/or at future instances, without user intervention. As will be explained below, the wireless data connection distinct from the first data connection can be used to facilitate quick and efficient automatic reconnection of the first data connection, particularly when the first data connection is a wireless data connection.

It should be noted that such exchange of wireless data credentials such as Bluetooth credentials is, in some embodiments, not done automatically, and can require user input and authorization, such as the user typing in a Bluetooth credentials code. However, in some embodiments, the credentials are automatically shared via the wired connection because the presence of a wired physical connection serves as adequate indication that the user is in physical control, and therefore legitimate possession and control, of both the device and the peripheral display unit.

In some embodiments, in response to receiving a request to authorize a wireless relationship, the device prompts the user to activate a deactivated wireless data interface. For example, in some embodiments, when a user elects to set up a wireless relationship, the device can optionally prompt a user to activate an inactive WiFi or Bluetooth data interface. This functionality is particularly relevant in the context of the wired setup process, as the user can optionally begin the wired setup process with some or all wireless data interfaces disabled. An exemplary prompt to activate a wireless data interface is Bluetooth enablement prompt 630 in FIG. 6C.

Attention is now directed to FIGS. 7D and 7E, which depict flow diagrams illustrating an exemplary process for establishing a relationship between a device and a peripheral display unit via a wireless connection. As explained above with reference to FIG. 6, care should be taken to distinguish between the connection itself (e.g., the relationship) being wired or wireless, versus the method for establishing the relationship being wired or wireless. FIGS. 7D and 7E represent an exemplary method in which the method for establishing the relationship is wireless. For example, the relationship can optionally be established over a wireless connection such as a Bluetooth data connection. FIGS. 7D and 7E depict method 702-*b*, which is an optional process performed as a part of block 702. That is, the steps in method 702-*b* primarily expand on the process of receiving a request to establish a relationship, as explained above with reference to block 702.

At block 730, optionally, the second data connection (of block 704) is a wireless data connection. An exemplary wireless data connection is the wireless data connection between second wireless data interface 604 and second wireless data interface 614 in FIG. 6A. In some embodiments, the wireless data connection is a Bluetooth data connection, such as between a Bluetooth communication interface integrated into a peripheral display unit in a vehicle, and a Bluetooth data connection integrated into a mobile device.

Blocks 732-734 occur while a relationship has not been established with the peripheral display unit. That is, in some embodiments, these steps occur before the device and the peripheral display unit have exchanged credentials with one another or stored data reflecting a relationship with one another. In some embodiments, these steps can optionally occur upon the first time the device and the peripheral display unit come into connection or communication with one another, such as after a user purchases a new device a new phone) or a new peripheral display unit (e.g., a new CarPlay-enabled system).

At block 734, optionally, the device detects, via one or more of the first and second data connections, that the peripheral display unit is available for the establishment of a relationship. In some embodiments, the device uses one or more wireless data connections to search for peripheral devices in proximity that are available for connection. In some embodiments, the device exchanges data with detected peripherals to determine what kind of peripheral it is, whether it is capable of connecting with the device, the name of the peripheral, and information about the security of a connection formed with the device (such as whether connecting to the device would require a password or other authentication or credentials).

At block 736, optionally, in response to detecting that the peripheral display unit is available for the establishment of a relationship, the device displays a fourth option for authorizing a relationship with the peripheral display unit. In some embodiments, the fourth option displayed is an affordance indicating the name or identity of the available peripheral; because the device need not be physically connected to a peripheral via a wired connection, the user may need an indication of what peripherals are available for wireless connection, so indication via the display of a name of an available peripheral is useful.

At block 738, optionally, the fourth option for authorizing a relationship is an item in a list of Bluetooth-capable devices. An exemplary fourth option that is an item in a list of Bluetooth-capable devices is available Bluetooth device affordance 637 in Bluetooth settings interface 636 in FIG. 6E.

At block 740, optionally, the fourth option for authorizing a relationship is an item in a list of vehicles with peripheral display units. An exemplary fourth option that is an item in a list of vehicles with peripheral display units is available car affordance 634 in CarPlay settings interface 632 in FIG. 6D.

In some embodiments, such as those depicted in FIGS. 6D and 6E, when the device detects that a peripheral display unit is available for the establishment of a relationship, an affordance appears, such as affordance 634 or 637, indicating the name of the peripheral display unit and that the unit is available for establishing a relationship. Affordance 634 and affordance 637 indicate that a peripheral display unit related to a Mercedes Benz is available for the establishment of a relationship, as indicated by the name of the vehicle appearing in an "other cars" or "other devices" list.

At blocks 742 and 744, optionally, the request from a user to establish a relationship comprises selection of the fourth option, and the device detects selection of the fourth option. In some embodiments, selection of the fourth option comprises selection of an affordance representing the fourth option. In some embodiments, selection of the fourth option comprises detection of a touch input at a location corresponding to the fourth option. An exemplary selection of the fourth option is user input 635 in FIG. 6D, or user input 639 in FIG. 6E. Both inputs 635 and 639, in some embodiments, are a touch or tap input on a touch screen. In some embodiments, a user selecting the fourth option in the displayed user interface to authorize a wireless data connection constitutes, at least in part, the request to establish a relationship with the peripheral display unit.

At block 746, optionally, in response to detecting selection of the fourth option, the device displays a second user interface prompting the user to authorize a relationship with the peripheral display unit. In some embodiments, after detecting selection of an option or affordance indicating a device with which to wirelessly establish a relationship, the device provides a prompt inquiring as to which kind of relationship—wired or wireless—the user would like to wirelessly establish. An exemplary user interface prompting the user to authorize a relationship with the peripheral display unit is user interface 638 from FIG. 6F.

At block 748, optionally, the second user interface comprises a fifth option corresponding to authorizing a wireless relationship between the device and the peripheral display unit. In some embodiments, this fifth option functions in the same way as the first option described above with reference to block 720. An exemplary fifth option is wireless relationship affordance 622 in FIG. 6F.

At block 750, optionally, the second user interface comprises a sixth option corresponding to authorizing a wired relationship between the device and the peripheral display unit. In some embodiments, this sixth option functions in the same way as the second option described above with reference to block 722. An exemplary sixth option is wired relationship affordance 624 in FIG. 6F.

Notably, in some embodiments, the second user interface for prompting the user to authorize a relationship with the peripheral display unit, such as user interface 638, does not contain an option for a charge-only connection, as interface 620 for wired-setup did. This is because, in some embodiments, user interface 638 is accessed through the deliberate selection of options to initiate a relationship-establishment process, such as the selection of affordance 634 or 637 by the user. Accordingly, it would seem unreasonable that, after selecting those options, the user would desire to instruct the device to authorize a charge-only relationship. Therefore, in some embodiments, the device determines, based on which user interfaces have recently been displayed or which options have recently been selected by the user, which options are most likely to be selected by the user. Making such a determination, and choosing to display only those options which are more likely to be selected by the user while suppressing display of options that are less likely to be selected, can increase the efficiency of the method and reduce the cognitive burden on the user in considering multiple options. Moreover, interface 638 is designed for use whether or not the device is physically connected by a wired physical connection to the peripheral display unit, so an option regarding a charging connection—which in almost all cases requires a wired physical connection—could be unhelpful to the user. For example, without a wired physical connection, the device would be unable to establish a wired data connection if the user were to select such an option, so inconvenience, inefficiency, cognitive strain, and confusion are avoided by suppressing display of an option to establish a wired connection in some embodiments.

At block 752, optionally, the request from the user to establish a relationship with the peripheral display unit comprises selection of the fifth option. In some embodiments, selection of the fifth option comprises selection of an affordance representing the fifth option In some embodiments, selection of the fifth option comprises detection of a touch input at a location corresponding to the fifth option. An exemplary selection of the fifth option is user input 640 in FIG. 6F. Input 640, in some embodiments, is a touch or tap input on a touch screen. In some embodiments, a user selecting the fifth option in the displayed second user interface to authorize a wireless data connection constitutes, at least in part, the request to establish a relationship with the peripheral display unit.

At block 754, optionally, establishing a relationship with the peripheral display unit (of block 704) includes displaying on the display of the device a third user interface prompting the user to enter credentials for the wireless data connection. In some embodiments, the device can optionally prompt the user to enter credentials corresponding to the wireless data connection by which the user is trying to establish a relationship with the peripheral display unit. For example, in some embodiments, the device can optionally prompt the user to enter a Bluetooth confirmation code, such as a Bluetooth confirmation code displayed on the display of the peripheral display unit. This process can optionally be in an attempt to establish that the user has legitimate control over both the peripheral display unit and the device, and to prevent unauthorized users from wirelessly establishing a relationship with the peripheral display unit, such as from nearby the peripheral display unit. An exemplary interface prompting the user to enter credentials for the wireless data connection is user interface 642 in FIG. 6G.

Figure 7F:
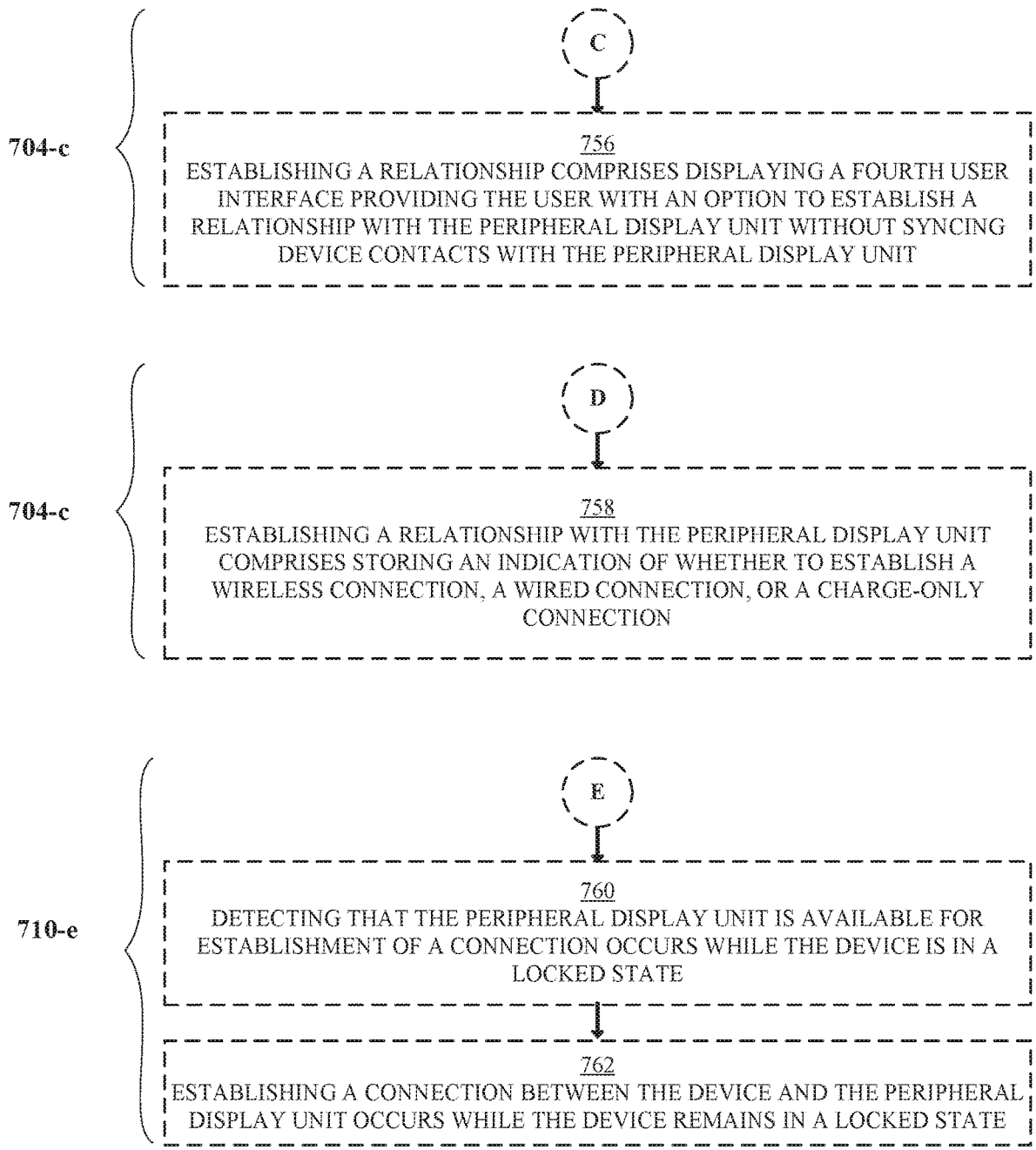

Attention is now directed to method 704-c in FIG. 7F. Method 704-c is an optional process performed as part of block 704. That is, the steps in method 704-c primarily expand on the process of establishing a relationship with the peripheral display unit, as explained above with reference to block 704.

At block 756, optionally, establishing a relationship comprises displaying a fourth user interface providing the user with an option to establish a relationship with the peripheral display unit without syncing device contacts with the peripheral display unit. In some embodiments, such a user interface is displayed after a request to authorize a relationship, such as after a user selects wireless relationship affordance 622 in FIG. 6B or wireless relationship affordance 622 in FIG. 6F.

An exemplary user interface providing the user with an option to establish a relationship with the peripheral display unit without syncing device contacts is user interface 644 in FIG. 6H. In interface 644, the user is explicitly prompted and encouraged not to sync contacts, rather than being encouraged and prompted to sync contacts. While syncing contacts (e.g., transferring contact information from a mobile phone for storage in a memory of a peripheral accessory, such as a motor vehicle) has been the norm in the prior art, there is no need to sync contacts in accordance with the methods disclosed herein. Saving contacts in a memory of a peripheral display unit creates an unnecessary security risk by exposing contact data to other users of the peripheral display device. For example, when a user of a system syncs his contacts to a Bluetooth-enabled vehicle, the contacts are, in many circumstances, thereafter accessible by other users of the car. However, by using a wired or wireless relationship such as those disclosed herein, such as CarPlay, there is no need to store contacts on the peripheral display unit. Rather, the peripheral display unit can simply use the connection to access the contacts as needed while the connection is active, without storing contact data on a memory at the peripheral display unit.

In accordance with these considerations, in some embodiments, not syncing contacts is the default option. In some embodiments, such as interface 644, the user is explicitly informed that the connection will work without syncing contacts, and/or that the default option is to not sync contacts. For example, in user interface 644, the option to not sync contacts is highlighted by being displayed in bold font (and can optionally be displayed in a different color). The option to not sync contacts is also displayed as a default in that it is located on the right side of the interface, proximate to the dominant thumb of most users of the device. Furthermore, the option to sync contacts is disparaged by being presented as "Sync Anyway"; thus, even if a user only reads the text on the buttons, the user will recognize that the syncing option is disfavored.

Attention is now directed to method 704-d in FIG. 7F. Method 704-d is an optional process performed as part of block 704. That is, the steps in method 704-d primarily expand on the process of establishing a relationship with the peripheral display unit, as explained above with reference to block 704.

At block 758, optionally, establishing a relationship with the peripheral display unit comprises storing an indication of whether to establish a wireless connection, a wired connection, or a charge-only connection. In some embodiments, data is stored locally on a memory of the device that indicates the preference that has been selected by the user. For example, if the user elects a wireless relationship, then the device will save an indication of this preference so that it can automatically wirelessly reconnect to the peripheral at future times. For example, if the user elects wired relationship, then the device will save an indication of this preference so that it can reconnect to the peripheral at future times only when a wired data interface is connected. For example, if the user elects a charge-only connection, then the device will save an indication of this preference so that, in future instances of the device being able to connect with the peripheral display unit, it will not connect or share content, but instead will establish a charge-only connection. The stored indication, in some embodiments, also allows the device to not prompt the user to authorize a connection after the user has done so once, or, in some other embodiments, to prompt the user periodically at future times after the user has declined such authorization once. In some embodiments, an indication of whether to establish a connection (and of what kind) is alternately or additionally stored on a local memory of the peripheral display unit.

Attention is now directed to method 710-e in FIG. 7F. Method 710-e is an optional process performed as part of block 710. That is, the steps in method 710-e primarily expand on the process of establishing a connection between the device and the peripheral display unit, as explained above with reference to block 710.

At block 760, optionally, detecting that the peripheral display unit is available for establishment of a connection occurs while the device is in a locked state.

At block 762, optionally, establishing a connection between the device and the peripheral display unit occurs while the device remains in a locked state.

In some embodiments of blocks 760 and 762, a user carrying a device approaches a peripheral display unit. For example, a user carrying a mobile device in his pocket gets into a CarPlay-enabled car. The device detects that the peripheral is available for the establishment of a connection, in some embodiments, while the device is in a locked state. Moreover, the device establishes a connection with the peripheral, in some embodiments, while the device remains in a locked state. Accordingly, in some embodiments, the user's device detects the authorized peripheral display unit from the user's pocket and automatically wirelessly reestablishes a connection, and the user is not required to take the device out of his pocket or physically access the device in order for the connection to be completely established. Thus, in some embodiments, the user can simply enter his car and begin interacting with the peripheral display unit, without having to unlock, plug in, or otherwise interact with the device. In some embodiments, this functionality improves driver convenience and driver safety.

In some embodiments, being in a locked state means that the device is not displaying any output on its display. In some embodiments, being in a locked state means that the device is not responsive to touch inputs detected on its touch-sensitive surface. In some embodiments, being in a locked state means that access to some functions is restricted. In some embodiments, being in a locked state means that the device is in a low-power mode. In some embodiments, being in a locked state means that the device requires authentication by a user, such as a user entering a passcode or submitting biometric (e.g., fingerprint) authentication, before the user can access some functions of the device.

Figure 7G:
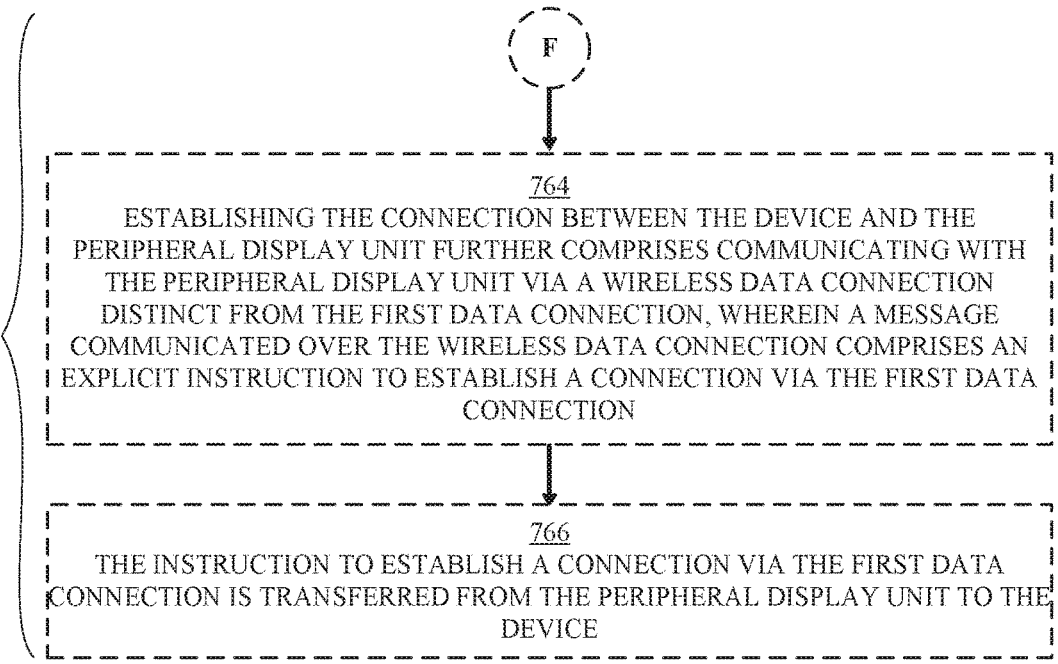
Figure 7G:
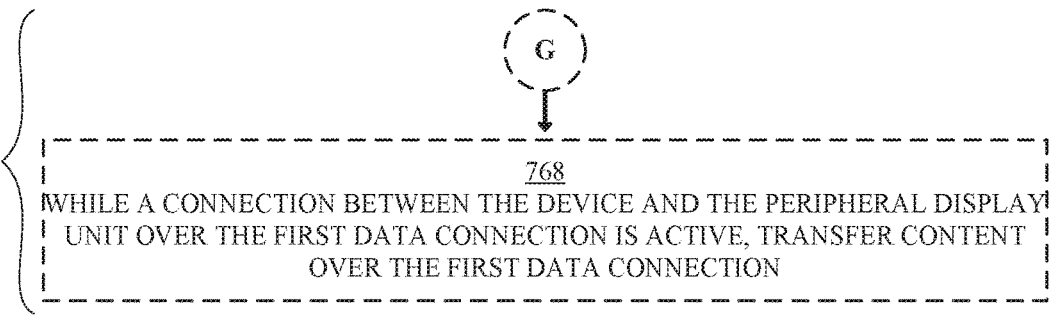

Attention is now directed to method 710-f in FIG. 7G. Method 710-f is an optional process performed as part of block 710. That is, the steps in method 710-f primarily expand on the process of establishing a connection between the device and the peripheral display unit, as explained above with reference to block 710.

At block 764, optionally, establishing the connection between the device and the peripheral display unit further comprises communicating with the peripheral display unit via a wireless data connection distinct from the first data connection, wherein a message communicated over the wireless data connection comprises an explicit instruction to establish a connection via the first data connection. In some embodiments, particularly embodiments in which the first data connection (on which the connection will exist) is a wireless data connection, it can be beneficial to use another wireless data connection to assist in reestablishing the first data connection. In some embodiments, the message passed over the wireless data connection, comprising an explicit instruction to reconnect via the first data connection, identifies the first data connection such that it can be located and authenticated more quickly. For example, when the first data connection is a Wi-Fi data connection, it can be beneficial to use a Bluetooth data connection to help reestablish the Wi-Fi data connection more quickly. In some embodiments, as a Bluetooth data connection reconnects more quickly than a Wi-Fi data connection, the reestablished Bluetooth data connection is used to hasten the reconnection of the Wi-Fi data connection by providing an instruction to reconnect via the Wi-Fi data connection (including, in some embodiments, an identification of the identity of the available Wi-Fi connection). This process is optionally called "bootstrapping" the first data connection with the (other) wireless data connection (e.g., the Bluetooth connection).

At block 766, optionally, the instruction to establish a connection via the first data connection is transferred from the peripheral display unit to the device. In some embodiments, for example, the instruction to establish a Wi-Fi connection is transferred over a Bluetooth connection from a peripheral display unit to a device. For example, a CarPlay-enabled car can optionally transfer from the peripheral display unit to a user's mobile phone, via Bluetooth, an explicit instruction to reconnect to the CarPlay Wi-Fi connection.

Attention is now directed to block 768 in FIG. 7G. Block 768 is part of process 700 for establishing a relationship between a device and a peripheral display unit in accordance with some embodiments. Block 768 optionally occurs following blocks 706-710 in FIG. 7B.

At block 768, optionally, while a connection between the device and the peripheral display unit over the first data connection is active, the device transfers content over the first data connection. In some embodiments, once the relationship is formed in steps 706-710, content can optionally then be transferred over the first data connection. As explained previously, the first data connection can optionally be a wired data connection (such as a USB data connection), such as a connection between wired data interface 606 and wired data interface 616 in FIG. 6A, or it can optionally be a wireless data connection (such as a Wi-Fi data connection), such as a connection between first wireless data interface 602 and first wireless data interface 612 in FIG. 6A. In some embodiments, content includes audio data, video data, phone call data, navigation data, web-browsing data, media data, user interface data, user input data, and more. In some embodiments, as explained above with reference to the option to not sync contacts, content transferred over the connection includes data relating to stored contact information.

Attention is now directed to blocks 770-784 in FIG. 7H. Blocks 770-784 are part of process 700 for establishing a relationship between a device and a peripheral display unit in accordance with some embodiments. Blocks 770-784 optionally occur following blocks 706-710 in FIG. 7B.

At block 770, optionally, the peripheral display unit has a discoverable state and a non-discoverable state, and the peripheral display unit comprises a hardware button configured to cause the peripheral display unit to enter the discoverable state. In some embodiments, a discoverable state is a state in which the peripheral display unit is configured to allow communication with and access by a device, for the formation of a stored relationship and the establishment of a connection, while a non-discoverable state is a state where the device is configured to not allow such communication and access. Thus, a user of a device, in some embodiments, is only able to establish a stored relationship and establish a connection when the peripheral display unit is in a discoverable state.

In some embodiments, a hardware button is provided on the peripheral display unit. An exemplary hardware button is hardware button 619 in FIG. 6I. In some embodiments, the hardware button is a physical, actuable button or switch located in a housing of the peripheral display unit. In some embodiments, the button is a button located on the steering wheel of a vehicle in which the peripheral display unit is provided. In some embodiments, the hardware button is a touch-sensitive, pressure-sensitive, presence-sensitive, and/or capacitive-sensing mechanism, such as a touch pad, touch surface, or touch screen.

In some embodiments, the hardware button is configured to cause the peripheral display unit to enter the discoverable state, such that interaction with the hardware button (e.g., depression/actuation/contacting of the button) is configured to cause the peripheral display device to leave the non-discoverable state and enter the discoverable state (e.g., instead of requiring a user to navigate through a complex series of settings menus to place the peripheral display device into the discoverable state).

At block 772, optionally, the hardware button is further configured to activate a native function of the peripheral display unit unrelated to making the unit discoverable. In some embodiments, the native function of the peripheral display unit is a voice-recognition function or a voice-activated interface inherent to an entertainment/media head unit of an accessory or peripheral display unit (such as a voice-activation function on a motor vehicle).

At block 774, optionally, the hardware button is further configured to activate a function of the device distinct from the native function of the peripheral display unit and unrelated to making the peripheral display unit discoverable. In some embodiments, the function of the device is a voice recognition function, such as a personal digital assistant function that responds to the user's voice queries and voice commands to perform various functions.

In some embodiments in which the hardware button is configured to perform various unrelated functions, the button performs different functions depending on the state of the peripheral display unit and the device. For example, the hardware button can optionally perform different functions depending on whether the peripheral display unit is in a discoverable or non-discoverable state, and it can optionally perform different functions depending on whether the device is actively connected by a connection with the peripheral display unit. Furthermore, in some embodiments, the button performs different functions depending on a characteristic of the selection of the button. For example, the button can optionally perform different functions depending on whether it is selected with a short press (lasting less than a predefined amount of time) or a long press (lasting more than a predefined amount of time).

At block 776, optionally, a short press of the hardware button activates a native voice recognition function of the peripheral display unit, and a long press of the hardware button causes the peripheral display unit to enter the discoverable state. An exemplary press of the hardware button is shown by depression 650 of button 619 in FIG. 6I, which can optionally be a short or long press in some embodiments. In some embodiments, the peripheral display unit and the device are not currently actively connected by a connection with one another, and a short press of the hardware button causes the peripheral to activate a native voice recognition function, while a long press of the hardware button causes the device to enter a discoverable state. In some embodiments, if the device is already in a discoverable state, a long press has no effect; in other such embodiments, a long press causes the device to leave the discoverable state. In some embodiments, such as embodiments in which the peripheral display unit is already actively connected by a connection to a device, the hardware button performs additional functions.

Blocks 778-784 occur while a connection between the device and the peripheral display unit over the first data connection is active. For example, in some embodiments, these steps occur after the wired or wireless setup processes and the connection processes explained above have occurred. In some embodiments, these steps occur while a relationship is active and the device is sharing content with the peripheral display unit, such as in a CarPlay connection.

At block 780, optionally, the device detects a long press of the hardware button. An exemplary long press of the hardware button is depression 650 of button 619 in FIG. 6I.

At block 782, optionally, in response to detecting the long press of the hardware button, the device activates the function of the device. In some embodiments, the peripheral detects a long press of the hardware button. Upon determining that a connection is active at the time, the peripheral passes data regarding the long press to the device. In response to receiving indication of the long press, the device activates a function of the device, in some embodiments.

At block 784, optionally, the function of the device is a voice recognition function. In some embodiments, the function of the device is a personal digital assistant function that responds to the user's voice queries and voice commands to perform various functions. An exemplary personal digital assistant function is depicted by personal digital assistant interface 648 in FIG. 6I. In some embodiments, activation of a personal digital assistant comprises display and/or audio output by one or both of the device and the peripheral display unit. In some embodiments, a microphone of the device and/or a microphone of the peripheral display unit are activated, in accordance with the activation of the personal digital assistant, to listen for voice commands or queries.

In some embodiments, the device displays an option to activate or deactivate connection authorization. In some embodiments, this option allows a user to elect to "turn off" the connection authorization, such that the device will not reestablish or reconnect to a peripheral display unit, even if a trust relationship has already been established with that peripheral display unit. In some embodiments, if the connection is active, turning off the connection authorization will cause the connection to deactivate. In some embodiments, the option to activate or deactivate the connection authorization is displayed as a switch or affordance. In some embodiments, the device presents a list of trusted peripheral display units, and when the user selects a unit from the list, the device presents the option to activate or deactivate the connection authorization. In some embodiments in which the device has established a relationship with multiple peripheral display units, connection authorizations can optionally be activated and deactivated for any of the peripheral display units independently of the others.

In some embodiments, the device displays an option to terminate a relationship with a peripheral display unit. In some embodiments, this option allows a user to elect to "forget" a trusted peripheral display unit, such that the peripheral display unit will no longer be considered trusted, and no connection will automatically reestablish with the peripheral display unit. In some embodiments, if the connection is active, terminating the relationship will cause the connection to deactivate. In some embodiments, the option to terminate the relationship is displayed as an affordance. In some embodiments, the device presents a list of trusted peripheral display units, and when the user selects a unit from the list, the device presents the option to terminate the relationship with the peripheral display unit. In some embodiments in which the device has established a relationship with multiple peripheral display units, relationships can optionally be terminated for any of the peripheral display units independently of the others.

In some embodiments, when a connection is active, the device and peripheral display unit both rely on a cellular connection of the device, such that data is passed to and from the internet through the device's cellular connection, before or after being shared over the connection between the device and the peripheral. In some embodiments, the opposite is true, in that the device and peripheral both rely on a cellular connection of the peripheral display unit. In some embodiments, the user can optionally manually select (via an interface presented at the peripheral display unit and/or the device) which cellular connection to use. In some embodiments, an indicator/warning is displayed by the device and/or the peripheral display unit when the user is using one cellular connection or the other. Such a warning can be useful to users who may not be accustomed to choosing between two different cellular connections, possibly provided by different carriers, at different connection speeds, for different rates/costs, and/or with different data restrictions and limits. In some embodiments, for example, the peripheral display unit displays an "LTE" indicator when the cellular connection of the device is being used, and does not display an "LTE" indicator when the cellular connection of the peripheral display unit is being used.

It should be understood that the particular order in which the operations in FIGS. 7A-7H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 800, 900) are also applicable in an analogous manner to 700 described above with respect to FIGS. 7A-7H. For example, the devices, peripheral display units, relationships, connections, and user interfaces described above with reference to 700 optionally have one or more of the characteristics of the devices, peripheral display units, relationships, connections, and user interfaces described herein with reference to other methods described herein (e.g., methods 800, 900).

FIGS. 8A-8D are flow diagrams illustrating exemplary process 800 for monitoring battery-usage patterns and providing alerts in accordance therewith, in accordance with some embodiments such as those described above with reference to FIGS. 6J-6M. Process 800 is carried out by device 500 (FIG. 5), which can optionally be electronic device 100 or 300 (FIGS. 1A and 3A), in some embodiments.

Attention is now directed to FIG. 8A, which is a flow diagram illustrating an exemplary process for providing charge-level alerts and providing battery-usage alerts.

At block 802, a device monitors battery usage of the device, wherein monitoring battery usage of the device includes monitoring a charge level of one or more batteries of the device and monitoring battery usage patterns of the one or more batteries of the device. An exemplary device is device 600 of FIG. 6J, which can optionally have one or more batteries. A processor on the device, in some embodiments, is configured to monitor a charge level of the device, such as a total amount of battery charge remaining. In some embodiments, charge-level is compared to the maximum charge capacity of the battery. A processor on the device, in some embodiments, is further configured to monitor battery-usage patterns of the device. Battery-usage patterns can optionally include historical and contextual information about battery usage and charge level, as will be explained in greater detail below.

At block 804, optionally, the battery usage patterns being monitored include one or more of: battery amount used since activating a first mode of operation, rate of battery usage since activating a first mode of operation, battery amount used since a past contextual event, rate of battery usage since the past contextual event, predicted time of the battery exhaustion reaching a predetermined threshold level, and predicted battery level by the time of a future contextual event. Accordingly, battery usage patterns include, in some embodiments, historical and contextual information about battery charge level, battery use rate, time of battery exhaustion, and how all of these factors relate to usage patterns and usage modes of the device.

In some embodiments, monitored battery-usage patterns include battery amount used since activating a first mode of operation. In some embodiments, the device monitors a total amount of battery charge that has been used since entering a mode of operation, for example by recording an indication of the battery level at the time that the mode of operation is initiated, and comparing that initial amount of battery charge with the amount of battery charge remaining at later times to determine a charge level used since initiating the mode of operation.

In some embodiments, the first mode of operation is a high-power mode of operation. In some embodiments, the first mode of operation is an application. In some embodiments, the first mode of operation is a mode in which a data interface, such as a Bluetooth, Wi-Fi (e.g., receiving Wi-Fi data and/or acting as a Wi-Fi hotspot), or cellular data interface is enabled. In some embodiments, the first mode of operation is a mode in which a data connection with a particular peripheral device (e.g., a peripheral display unit such as peripheral display unit 612 in FIG. 6A or 6L) is active/connected. In some embodiments, the first mode of operation is a gaming mode, a media playback mode, a media recording mode, a media streaming mode, or a navigation mode.

For example, in some embodiments, a device monitors an amount of battery used since the activation of a mode of operation in which a CarPlay wireless connection is connected. Monitoring the total amount of battery amount used since activating the mode of operation allows the device to provide helpful contextual information to a user, such as "You have used 50% of your battery since activating CarPlay," or "You have used 75% of your remaining battery since activating CarPlay." This information can help a user intuitively understand the battery-life implications of his usage patterns and make informed decisions about how to best conserve battery life going forward.

In some embodiments, monitored battery-usage patterns include rate of battery usage since activating a first mode of operation. In some embodiments, the device monitors a rate of battery usage since activating a mode of operation, for example by recording a charge level at a time of initiation of a first mode of operation and recording the time of initiation of the first mode of operation, and comparing the recorded charge level and recorded time to a current time and current charge level to determine a rate of battery usage since activation of the first mode of operation. In some other embodiments, the device can optionally periodically record the charge level and the time at various points during use of a particular mode of operation, so that it can monitor changes in the rate of usage during a first mode of operation over time.

For example, in some embodiments, a device monitors a rate of battery used since the activation of a mode of operation in which a CarPlay wireless connection is connected. Monitoring the rate of battery usage since activating the mode of operation allows the device to provide helpful contextual information to a user, such as "You're using 50% of your battery per hour since activating CarPlay." This information can help a user intuitively understand the battery-life implications of his usage patterns and make informed decisions about how to best conserve battery life going forward.

In some embodiments, monitored battery-usage patterns include battery amount used since a past contextual event. In some embodiments, battery amount used since the time of a past contextual event is monitored in a similar manner as described above with respect to battery amount used since the time of activation of a first mode of operation. In some embodiments, past contextual events include a time at which a user got in a car, a time at which a user left home or work, or a time at which a user arrived at a certain location (as determined by GPS data or other contextual information). In some embodiments, past contextual events include a time at which an event began (as determined by calendar data, internet data, or other contextual data).

For example, in some embodiments, a device monitors an amount of battery used since getting in the car. Monitoring the total amount of battery amount used since a past contextual event allows the device to provide helpful contextual information to a user, such as "You have used 50% of your battery since getting in the car," or "You have used 75% of your remaining battery since getting in the car." This information can help a user intuitively understand the battery-life implications of his usage patterns and make informed decisions about how to best conserve battery life going forward.

In some embodiments, monitored battery-usage patterns include rate of battery usage since a past contextual event. In some embodiments, rate of battery usage since a past contextual event can optionally be monitored in a similar manner as described above with respect to rate of battery usage since activating a first mode of operation.

For example, in some embodiments, a device monitors a rate of battery used since a getting in the car. Monitoring the rate of battery usage used since a past contextual event allows the device to provide helpful contextual information to a user, such as "You're using 50% of your battery per hour since getting in the car." This information can help a user intuitively understand the battery-life implications of his usage patterns, and make informed decisions about how to best conserve battery life going forward.

In some embodiments, battery-usage patterns comprise consideration of historical and contextual data and predictions or projections calculated in accordance therewith. That is, in some embodiments, the device uses the current charge level and/or the current rate of battery usage in order to make predictions about how quickly the battery will be exhausted. In some embodiments, the device can optionally further consider the current mode of operation or recent contextual events in the context of past instances of using the current mode of operation or past instances of similar contextual events. For example, the device can optionally calculate a running average of battery-usage rate during a first mode of operation or during a first contextual scenario (e.g., while driving) or at a certain location (e.g., while at home, work, etc.). The device can optionally consider this average rate of battery use in addition to the current charge level and/or the current battery-usage rate in order to make a prediction about the usage of the battery. Predictions include, in some embodiments, a time of the battery reaching a predetermined minimum threshold, and/or a predicted battery level at a predetermined future time.

In some embodiments, monitored battery-usage patterns include a predicted time of the battery reaching a predetermined threshold level. In some embodiments, the predetermined threshold level is a level at which the device will automatically power down (e.g., an "exhaustion" level). In some embodiments, the predetermined threshold level is a level at which the device will enter a power-saving mode. In some embodiments, the predetermined threshold level is a percentage of the total charge capacity, such as 20% or 10%.

In some embodiments, monitored battery-usage patterns include a predicted battery level by the time of a future contextual event. In some embodiments, future contextual events include the predicted end time of a mode of operation, which can optionally be based on past patterns of usage of the mode (e.g., a historical average). In some embodiments, predicted end time of a mode of operation is determined based on or on cues from the mode (e.g., an application) itself, such as the length of a document, the length of a media being played back, or the number of levels in a game. In some embodiments, predicted end time of a mode of operation is determined based on calendar data indicating the beginning or end of an event, internet data indicating the beginning or end of an event, or GPS data indicating a predicted arrival at a destination. In some embodiments, future contextual events include the predicted arrival by a user at a destination. Time of arrival by a user at a destination can optionally be predicted, in some embodiments, by considering GPS data provided by the device, GPS data provided by a peripheral to which the device is connected, map data, internet data such as traffic data, and/or historical patterns of user conduct. In some embodiments, future contextual events include the beginning or end of a calendar event.

For example, in some embodiments, a device predicts a time by which a battery will be exhausted if it continues to be used in media playback mode, based on the current charge level of the battery, rate of battery use since beginning media playback mode, and a historical average of battery-usage rate in media playback mode. Then, the device compares the predicted time of exhaustion to upcoming contextual events, and determines that the battery will likely be exhausted by media playback mode before a user completes his drive home from work. The device can optionally then provide a notification to the user indicating as much. This information can help a user intuitively understand the battery-life implications of his usage patterns and make informed decisions about how to best conserve battery life going forward.

Blocks 806-810 occur while monitoring battery usage of the device, as explained with reference to block 802.

At block 808, in accordance with a determination that a charge level of the device meets charge-level notification criteria, the device provides a charge-level alert that indicates a current charge level of the one or more batteries. Charge-level notification criteria, in some embodiments, are predefined rules for triggering the provision of a charge-level alert. In some embodiments, charge-level notification criteria include that the charge level of the battery is below a predefined charge level, such as a predefined percentage of the total charge capacity of the battery.

In some embodiments, the charge-level alert is provided by displaying an alert on a display of the device, such as display 608 in FIG. 6J. In some embodiments, the alert is provided by auditory or haptic output, or by sending a signal to another device or a connected peripheral instructing the other device/peripheral to provide the alert. In some embodiments, the charge-level alert indicates a current charge level as a percentage of the total charge capacity of the battery. An exemplary charge-level alert is alert 652 in FIG. 6J.

At block 810, in accordance with a determination that battery usage of the device meets battery-usage notification criteria different from the charge-level notification criteria, the device provides a battery-usage alert that indicates a current battery usage pattern. Battery-usage notification criteria, in some embodiments, are predefined rules for triggering the provision of a battery-usage alert. As will be explained in greater detail below, battery-usage notification criteria, in some embodiments, include a criterion that is met when a battery is predicted to be below a certain charge level by a certain future time.

In some embodiments, the battery-usage alert is provided by displaying an alert on a display of the device, such as display 608 in FIG. 6K. In some embodiments, the alert is provided by auditory or haptic output, or by sending a signal to another device or a connected peripheral instructing the other device/peripheral to provide the alert. In some embodiments, the battery-usage alert indicates a monitored battery-usage pattern. An exemplary battery-usage alert is alert 654 in FIG. 6K.

Figure 8B:
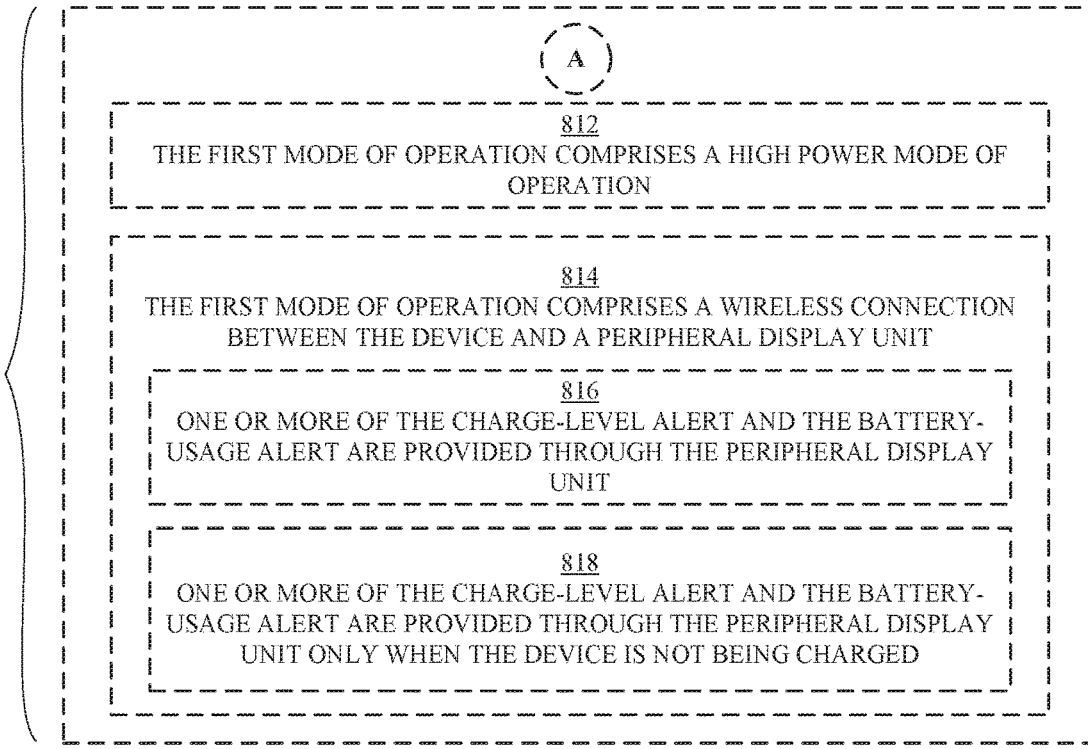
Figure 8B:
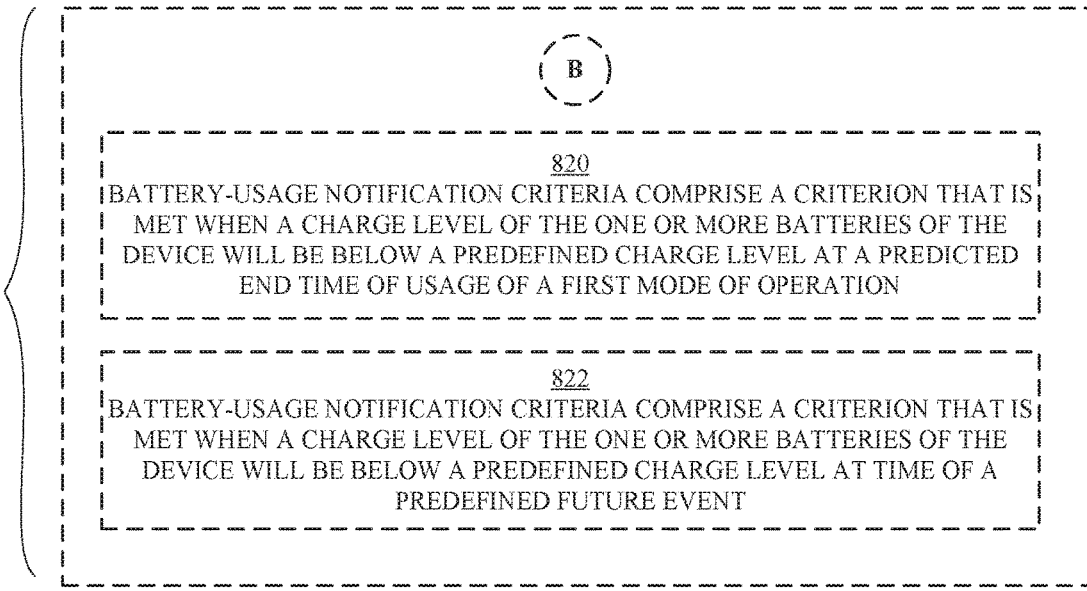

Attention is now directed to method 804-a in FIG. 8B. Method 804-a is an optional process performed as part of block 804. That is, the steps in method 804-a primarily expand on the features regarding the battery-usage patterns being monitored, as explained above with reference to block 804.

At block 812, optionally, the first mode of operation comprises a high-power mode of operation. In some embodiments, a high-power mode of operation is any application, hardware configuration, physical device location, or other mode of operation that is predetermined or actively determined by the device to be a mode of operation in which battery charge is likely to be used at an elevated rate. For example, high-power modes of operation can optionally comprise application use, enablement of a data interface (such as a Bluetooth, Wi-Fi, or cellular data interface), or connection with a peripheral device (e.g., a peripheral display unit such as peripheral display unit 612, in FIG. 6A or 6L).

At block 814, optionally, the first mode of operation comprises a wireless connection between the device and a peripheral display unit. An exemplary peripheral display unit is the peripheral display unit of FIG. 6A or 6L, and an exemplary wireless connection is any of the wireless connections described above with reference to FIGS. 7A-7H. Battery-usage alerts are particularly useful in this context because wireless connections between devices and peripheral display units, such as motor vehicles, are both energy-intensive and novel to users. Particularly, users may not be familiar with the battery implications of a Wi-Fi connection, and battery usage alerts can therefore help users conserve battery.

At block 816, optionally, one or more of the charge-level alert (of block 808) and the battery-usage alert (of block 810) are provided through the peripheral display unit. In some embodiments, the device sends data over the wireless connection to the peripheral display unit instructing the peripheral display unit to provide the alert, such as by displaying it, providing an audio alert, or providing a haptic alert. An exemplary provision of a battery-usage alert by both a device and a connected peripheral display unit is shown by device 600 and peripheral display unit 610 in FIG. 6L. Providing an alert on a peripheral display unit, such as in a vehicle, can be particularly useful when users are primarily interacting with the peripheral display unit rather than the device itself, as a user might not see or notice an alert provided only on the device, an alert provided through the peripheral display unit may be more noticeable and useful.

At block 818, optionally, one or more of the charge-level alert (of block 808) and the battery-usage alert (of block 810) are provided through the peripheral display unit only when the device is not being charged. In some embodiments, even if the device would otherwise provide an alert, the alert is not provided through the peripheral display unit if the device is being charged. For example, if the device is plugged into a car, wall outlet, computer, or other charging source, then the alert can optionally be provided only by the device itself or not at all.

Attention is now directed to method 810-b in FIG. 8B. Method 810-b is an optional process performed as part of block 810. That is, the steps in method 810-b primarily expand on the features regarding the battery-usage patterns being monitored, as explained above with reference to block 810.

At block 820, optionally, battery-usage notification criteria comprise a criterion that is met when a charge level of the one or more batteries of the device will be below a predefined charge level at a predicted end time of usage of a first mode of operation. In some embodiments, as explained above, the device relies on a combination of the current charge level, the rate of battery usage in the current mode of operation, historical rates of usage in the current mode of operation, and/or a prediction (e.g., based on historical usage patterns or present contextual indicators like media length or calendar-event length) of when use of the first mode of operation will end; relying on some or all of these factors, in some embodiments, the device determines that the battery is likely to fall below a predefined threshold before a predicted end time of usage of the first mode of operation. In accordance with such a determination, the device provides a battery usage alert indicating its prediction. For example, an alert informs a user, "Your battery is going to be below 20% by the time this movie finishes playing."

At block 822, optionally, battery-usage notification criteria comprise a criterion that is met when a charge level of the one or more batteries of the device will be below a predefined charge level at time of a predefined future event. In some embodiments, the predefined future event is based on calendar data (such as data entered in a user's personal calendar). For example, an alert informs a user, "Your battery is going to be below 20% by the time the concert starts."

Figure 8C:
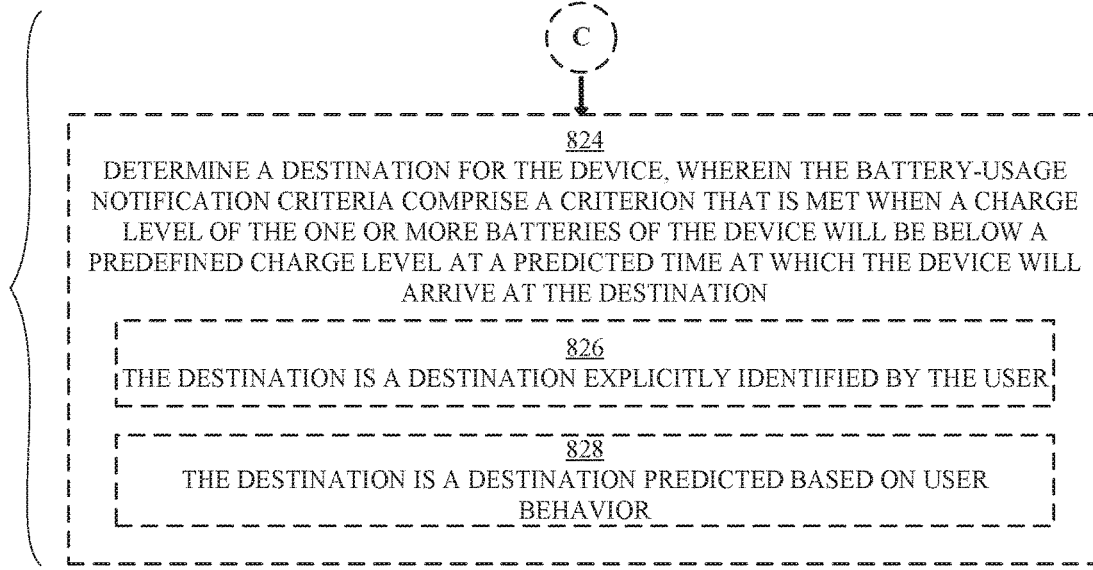

Attention is now directed to blocks 824-828 in FIG. 8C. Blocks 824-828 are part of process 800 for monitoring battery-usage patterns and providing alerts in accordance with some embodiments. Blocks 824-828 optionally occur following blocks 806-810 in FIG. 8A.

At block 824, optionally, the device determines a destination for the device, wherein the battery-usage notification criteria comprise a criterion that is met when a charge level of the one or more batteries of the device will be below a predefined charge level at a predicted time at which the device will arrive at the destination. In accordance with some embodiments, the device considers the current position of the device (as determined by GPS data), a determined destination of the device, map data, traffic data (e.g., live traffic data from the internet), and any or all of the charge-level data and battery-usage patterns discussed above; in accordance with considering some or all of this data, the device predicts a time at which the user is expected to reach his destination and a charge level at which the battery is predicted to be at that future time. In some embodiments, a battery-usage notification criterion considers whether that predicted charge level is below a predetermined threshold; if the battery will be below such a threshold at the time a user is predicted to arrive at the destination, then, in some embodiments, the device provides a battery-usage alert indicating its prediction for the user. An exemplary battery usage alert provided in accordance with such a battery-usage notification criterion is alert 656 in FIG. 6L.

At block 826, optionally, the destination is a destination explicitly identified by the user. In some embodiments, the destination is a destination explicitly provided in a GPS application, a navigation application, a search application, a calendar application, or by some other explicit entry means.

At block 828, optionally, the destination is a destination predicted based on user behavior. In some embodiments, the device predicts a user destination based on the user's past behavior, such as repeatedly driving to and from the same home and place of work on every weekday, or repeatedly driving to the same restaurant on every Monday evening.

Figure 8D:
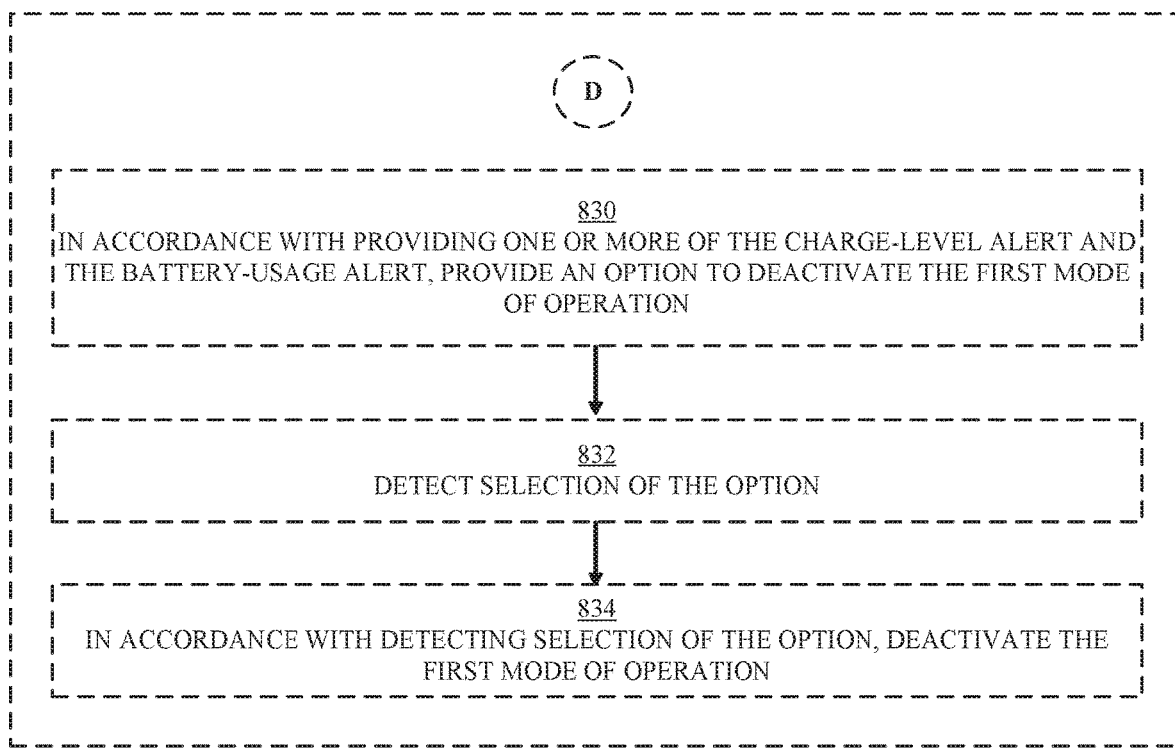
Figure 8D:
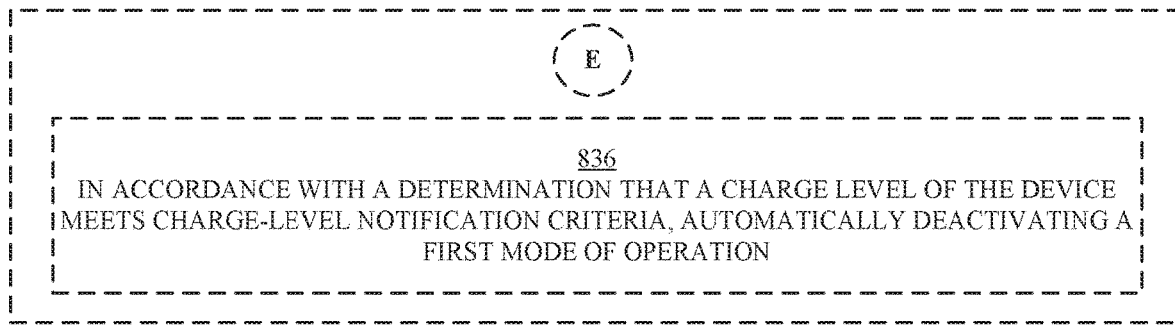

Attention is now directed to blocks 830-834 in FIG. 8D. Blocks 830-834 are part of process 800 for monitoring battery-usage patterns and providing alerts in accordance with some embodiments. Blocks 830-834 optionally occur following blocks 806-810 in FIG. 8A.

At block 830, optionally, in accordance with providing one or more of the charge-level alert and the battery-usage alert, the device provides an option to deactivate the first mode of operation. In some embodiments, in accordance with the same criteria that trigger display of a charge-level alert or a battery-usage alert, the device provides the user with an option to deactivate a first mode of operation. In some embodiments, the device can optionally indicate that the mode is a high-power mode of operation, or that the mode should be disabled to conserve battery power. In some embodiments, the device presents the option to deactivate the mode as a default option, such as by displaying an affordance to deactivate the mode of operation in bolded font, or in a different color. An exemplary option to deactivate a first mode of operation is CarPlay deactivation prompt 658 in FIG. 6M, which prompts the user to deactivate a CarPlay wireless connection mode.

At block 832, optionally, the device detects selection of the option. An exemplary selection of the option is user input 660-a or user input 660-b in FIG. 6M, which is a touch or tap input detected on an affordance displayed as part of CarPlay deactivation prompt 658 on either or both of display 608 or display 618.

At block 834, optionally, in accordance with detecting selection of the option, the device deactivates the first mode of operation. In some embodiments, in response to detecting user input 660-a or 660-b, the device disconnects a wireless CarPlay connection, including disconnecting the Wi-Fi data connection associated therewith.

Attention is now directed to block 836 in FIG. 8D. Block 836 is part of process 800 for monitoring battery-usage patterns and providing alerts in accordance with some embodiments. Block 836 optionally occurs following blocks 806-810 in FIG. 8A.

At block 836, optionally, in accordance with a determination that a charge level of the device meets charge-level notification criteria, the device automatically deactivates a first mode of operation. In some embodiments, the device automatically discontinues a high-power mode of operation in accordance with determining that the charge-level of the device is below a predetermined threshold. In some embodiments, the device automatically disconnects a wireless connection, such as any of those described above with reference to FIGS. 7A-7H. The disconnection can optionally occur without any user intervention or approval.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900) are also applicable in an analogous manner to 800 described above with respect to FIGS. 8A-8D. For example, the devices, peripheral display units, relationships, connections, and user interfaces described above with reference to 800 optionally have one or more of the characteristics of the devices, peripheral display units, relationships, connections, and user interfaces described herein with reference to other methods described herein (e.g., methods 700, 900).

FIGS. 9A-9E are flow diagrams illustrating exemplary process 900 for configuring a user interface of a peripheral display unit in accordance with some embodiments, such as those described above with reference to FIGS. 6N-6W. Process 900 is carried out by device 500 (FIG. 5), which can optionally be electronic device 100 or 300 (FIGS. 1A and 3A), in some embodiments.

Figure 9A:
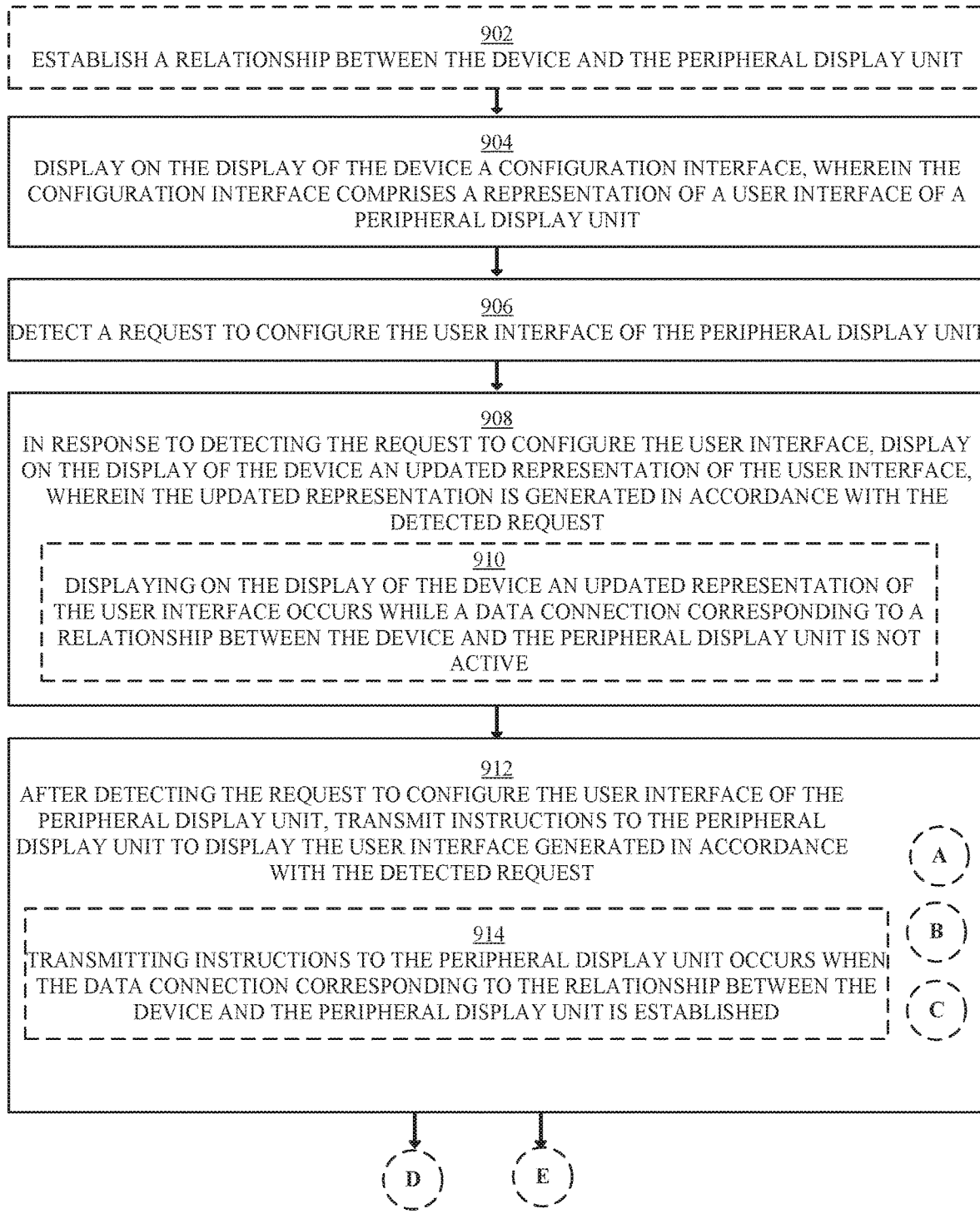

Attention is now directed to FIG. 9A, which is a flow diagram illustrating an exemplary process for configuring a user interface of a peripheral display unit. In accordance with the embodiments described herein, users can conveniently and efficiently configure the user interface of peripheral display units associated with a device. This configuration can be done remotely (away from the peripheral display unit) while the device is not actively connected to the peripheral display unit. Remote configuration is convenient to the user because it provides flexibility as to the time and place at which configuration can be done. Additionally, configuration via an associated device may be more convenient if the device has a superior input interface, such as when a mobile phone has a modern capacitive touch screen and a peripheral display unit has a cumbersome input interface. Furthermore, in embodiments in which the peripheral display unit is provided in a vehicle, allowing configuration of the interface improves driver safety by making the user interface more intuitive, customizable, and quickly accessible. Furthermore, allowing remote configuration lessens the need for a user to attempt configuration operations while in the car, improving driver safety.

At block 902, optionally, the device establishes a relationship between the device and the peripheral display unit. In some embodiments, establishing such a relationship can optionally include establishing a relationship according to any of the methods described above with reference to FIGS. 7A-7H.

At block 904, the device displays on the display of the device a configuration interface, wherein the configuration interface comprises a representation of a user interface of a peripheral display unit. In some embodiments, the representation of the peripheral interface is a window in an interface on the device, the window depicting a likeness of the peripheral interface. An exemplary configuration interface is interface 664 in FIG. 6N. Interface 664 includes window 668, which is an exemplary representation of a user interface of a peripheral display unit. Window 668 represents peripheral interface 662, which is an exemplary user interface of a peripheral display unit.

At block 906, the device detects a request to configure the user interface of the peripheral display unit. In some embodiments, the request is a touch input detected by a touch-sensitive surface at a location corresponding to the configuration interface and/or the representation of the peripheral user interface displayed therein. In some embodiments, the request to configure the user interface represents a request to add a new user interface object to the peripheral interface, remove a user interface object from the peripheral interface, or rearrange a user interface object on the peripheral interface, as will be described in greater detail below.

At block 910, optionally, displaying on the display of the device an updated representation of the user interface occurs while a data connection corresponding to a relationship between the device and the peripheral display unit is not active. In some embodiments, the configuration interface is accessible and fully functional when the device is not actively connected with the peripheral display unit. Accordingly, while no connection is active, a user in some embodiments can optionally access the configuration interface and execute instructions to configure the user interface of the peripheral device. In some embodiments, the configuration interface will display an indication to the user, such as a reconfigured representation of the peripheral interface, that a configuration has occurred, despite the peripheral display unit not being connected to the device. In some embodiments, the device stores data representing any configuration that the user has executed.

At block 912, after detecting the request to configure the user interface of the peripheral display unit, the device transmits instructions to the peripheral display unit to display the user interface generated in accordance with the detected request. In some embodiments, after detecting the request to configure the peripheral interface via the configuration interface, the device transmits data to the peripheral display unit representing an instruction to execute the configuration. In embodiments where the device and peripheral display unit are connected via an active connection when the instruction is detected, the transmission can optionally occur immediately, or very soon, after the instruction.

At block 914, optionally, transmitting instructions to the peripheral display unit occurs when the data connection corresponding to the relationship between the device and the peripheral display unit is established. In some embodiments where the device and peripheral display unit are not connected via an active connection when the instruction is detected, the transmission can optionally occur at a later time in the future, such as upon the next reestablishment of a connection between the device and the peripheral display unit. The transmission of instructions can optionally occur over the data connection associated with any of the relationships discussed above. For example, the transmission of instructions, in some embodiments, occurs over the Wi-Fi data connection of a wireless CarPlay connection. In some embodiments, the user may be unaware that the transmission was delayed from the time of the instruction, because the user will not have interacted with the peripheral at any time before the connection automatically reestablishes itself in accordance with the methods explained above with reference to FIGS. 7A-7H.

Figure 9B:
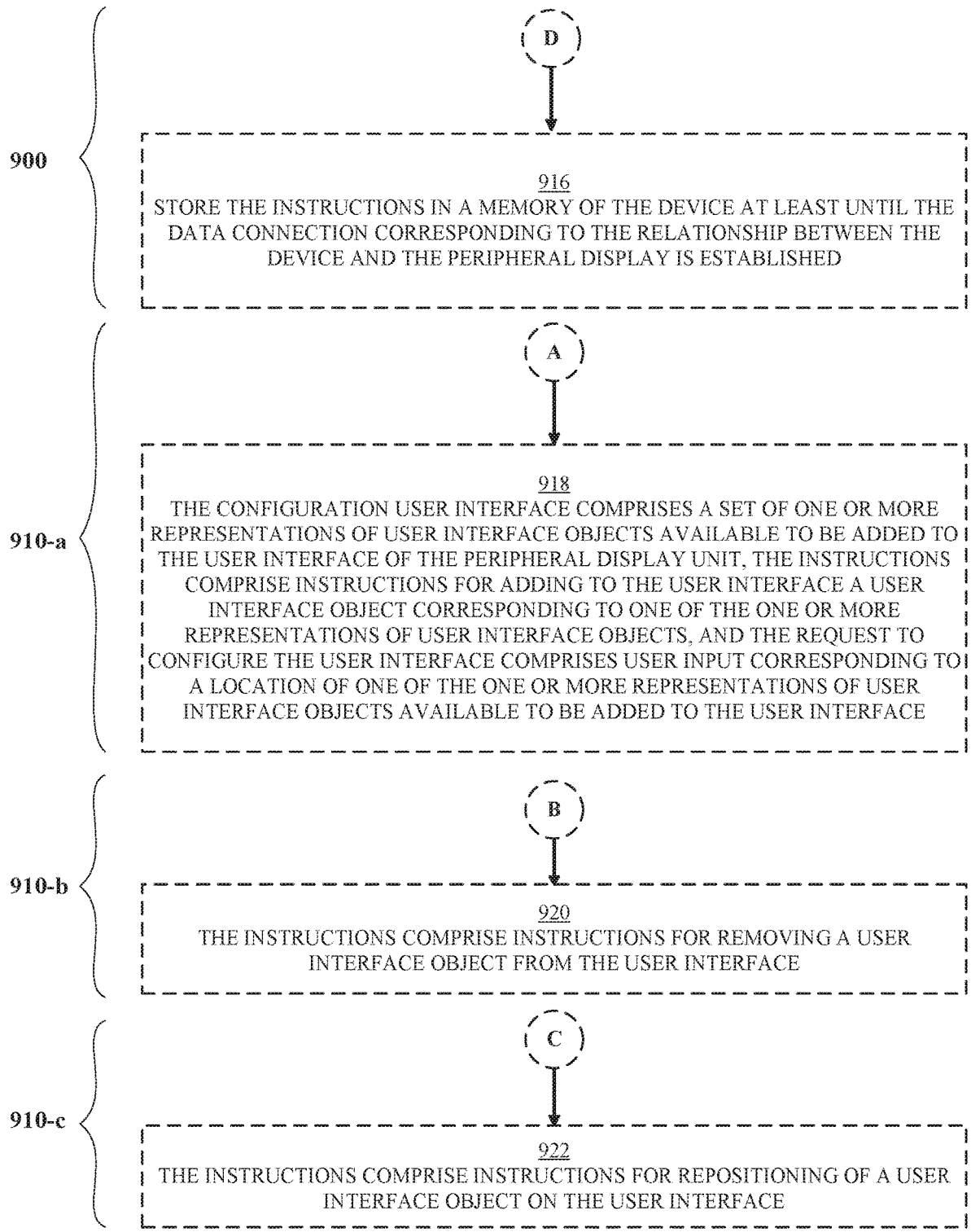

In FIG. 9B, at block 916, optionally, the device stores the instructions in a memory of the device at least until the data connection corresponding to the relationship between the device and the peripheral display is established. In some embodiments, when the configuration instruction is received at a time when a connection between the device and the peripheral display unit is not active, the device stores data on a local memory representing the instruction to configure the peripheral display unit. In some embodiments, the configuration instruction is then transmitted, as explained above with reference to block 914, when the connection is next reestablished. In some embodiments, the configuration instructions are maintained in a memory on the device both before and after the relationship is next reestablished, as data corresponding to the user interface of the peripheral display unit is permanently maintained on the device and served to the peripheral display unit whenever the connection is active.

Attention is now directed to methods 910-a, 910-b, and 910-c in FIG. 9B. Methods 910-a, 910-b, and 910-c are methods, in that they are optional processes performed as part of block 910. That is, the steps in methods 910-a, 910-b, and 910-c primarily expand on the features regarding the configuration instructions transmitted from the device to the peripheral display unit, as explained above with reference to block 910.

As will be explained below, methods 910-a, 910-b, and 910-c represent techniques for adding, removing, and repositioning user interface objects on the peripheral user interface, respectively.

At block 918, optionally, the configuration user interface comprises a set of one or more representations of user interface objects available to be added to the user interface of the peripheral display unit, the instructions comprise instructions for adding to the user interface a user interface object corresponding to one of the one or more representations of user interface objects, and the request to configure the user interface comprises a user input corresponding to a location of one of the one or more representations of user interface objects available to be added to the user interface.

An exemplary set of one or more representations of user interface objects available to be added to the user interface of the peripheral display unit is the set of icons in tray 670 in FIG. 6N. In some embodiments, representations of available user interface objects represent icons that can optionally be added to the peripheral interface, such as icons corresponding to new applications or new functions that have been downloaded by a user of the device or a user of the peripheral display unit. In some embodiments, the representations have been pushed to the configuration interface by a back-end operator of the configuration interface, such as a developer associated with the device or the peripheral display unit.

In some embodiments, a new user interface object is added to a peripheral interface in accordance with an input that drags a representation of a new object onto the representation of the peripheral interface. FIGS. 6N-6P represent an example of an instruction detected at a device user interface to add an icon to the peripheral user interface. In FIG. 6N, user input 674-a is detected. User input 674 is a swipe input that continues as user input 674-2 in FIG. 6O, where it lifts off. In accordance with the input in FIGS. 6N and 6O, exemplary representation 672-a is displayed as moving from tray 670 to window 668. In embodiments in which the device and the peripheral display unit are not connected at the time, the instruction to update the peripheral display unit is not yet transmitted, as illustrated in FIG. 6O, in which peripheral interface 662 is not yet updated. FIG. 6P depicts the instruction to add the new user interface object being transmitted to the peripheral display unit and implemented by the peripheral display unit, as new user interface object 676 is displayed.

At block 920, optionally, the instructions comprise instructions for removing a user interface object from the user interface. In some embodiments, a user interface object is removed from a peripheral display interface in accordance with a gesture that selects a deletion affordance associated with a representation of a user interface icon on a representation of a peripheral user interface.

FIGS. 6Q-6S represent an example of an instruction detected at a device user interface to remove an icon from the peripheral user interface. In FIG. 6Q, user input 680 is detected. User input 674 is a tap or press input detected at a location corresponding to deletion affordance 678, which corresponds to representation 672-a. In accordance with input 680, exemplary representation 672-a ceases to be displayed in window 668 and is displayed in tray 670, as shown in FIG. 6R. In embodiments in which the device and the peripheral display unit are not connected at the time, the instruction to update the peripheral display unit is not yet transmitted, as illustrated in FIG. 6R, in which peripheral interface 662 is not yet updated. FIG. 6S depicts the instruction to remove the user interface object being transmitted to the peripheral display unit and implemented by the peripheral display unit, as user interface object 676 is no longer displayed.

At block 922, optionally, the instructions comprise instructions for repositioning of a user interface object on the user interface. In some embodiments, a user interface object is repositioned on a peripheral display interface in accordance with an input that drags a representation of a user interface object from one location on a representation of the user interface to another location on the representation of the user interface.

FIGS. 6T-6V represent an example of an instruction detected at a device user interface to reposition an icon on the peripheral user interface. In FIG. 6T, user input 682-1 is detected. User input 682 is a swipe input that continues as user input 682-2 in FIG. 6U, where it lifts off. In accordance with the input in FIGS. 6T and 6U, exemplary representation 672-a is displayed as moving from a first position in window 668 to a second position in window 668. In embodiments in which the device and the peripheral display unit are not connected at the time, the instruction to update the peripheral display unit is not yet transmitted, as illustrated in FIG. 6U, in which peripheral interface 662 is not yet updated. FIG. 6V depicts the instruction to add the new user interface object being transmitted to the peripheral display unit and implemented by the peripheral display unit, as user interface object 676 is displayed in its new position.

Attention is now directed to FIGS. 9C-9E, which are flow diagrams illustrating an exemplary process for configuring a user interface of a peripheral display unit. The steps represented in FIGS. 9C-9E occur following blocks 912 and 914 discussed above.

At block 924, the configuration interface further comprises a representation of a second user interface of a second peripheral display unit. In some embodiments, a second representation of a second peripheral display unit is displayed at the same time as the first representation of the first user interface. In some embodiments, the configuration user interface selectively displays different representations of the user interfaces of different peripheral display units one at a time. An exemplary configuration user interface displaying a second representation of a second peripheral display unit is interface 664 in FIG. 6W, which is displaying window 686. Window 686 is a representation of user interface 684, which is the user interface of peripheral display unit 610-*b*. Displaying representations of more than one user interface allows a user to use the configuration interface to configure user interfaces for multiple peripheral display units from a single device. For example, if a user has multiple CarPlay-enabled cars with which be has established relationships with his device, then the user can use a single device to configure the user interface of both cars. Conveniently, this can be done from a single device, and at any time while actively connected to either car or to neither of the cars.

At blocks 926-938, optionally, steps are carried out in which the device detects an input, via the configuration interface, to configure the second peripheral interface. In response to the request, which in some embodiments occurs while the device and the second peripheral are not actively connected via a connection, the device displays an updated representation of the user interface in accordance with the configuration request. Then, after detecting the request, and in some embodiments when the device reestablishes a connection with the second peripheral, the device transmits instructions to the second peripheral to display the second peripheral interface in accordance with the second configuration instruction. In embodiments in which the device and the peripheral are not connected at the time that the configuration instruction is detected, the device stores the instruction locally at least until it is transmitted to the second peripheral. All of these steps can optionally be carried out, in some embodiments, in all of the same manners as described above with reference to the first peripheral user interface and blocks 902-922.

At block 926, optionally, the device detects a second request to configure the second user interface.

At block 928, optionally, in response to detecting the second request to configure the second user interface, the device displays on the display of the device a second updated representation of the second user interface, wherein the second updated representation is generated in accordance with the second detected request.

At block 930, optionally, displaying on the display of the device the second updated representation of the second user interface occurs while a data connection corresponding to the relationship between the device and the second peripheral display unit is not active.

At block 932, optionally, after detecting the second request to configure the second user interface, the device transmits instructions to the second peripheral display unit to display the second user interface in accordance with the detected request.

At block 934, optionally, transmitting second instructions to the second peripheral display unit occurs when the data connection corresponding to the relationship between the device and the second peripheral display unit is established.

At block 936, optionally, the device stores the second instructions in a memory of the device at least until the data connection corresponding to the relationship between the device and the second peripheral display unit is established.

At block 938, optionally, the first instruction and the second instruction are simultaneously stored at the device.

At block 940, the first instruction and the second instruction are simultaneously stored at the device. In some embodiments, the device detects a first instruction for configuring a user interface of a first device, and detects a second instruction for configuring the user interface of a second device. In some embodiments, the device receives both instructions while disconnected from the peripheral display units associated with both peripheral interfaces. In some embodiments, the device stores both instructions on a local memory at the same time, at least until one or both is transmitted to the associated peripheral display unit. Each instruction can optionally be indexed by a file identifier associated with the corresponding peripheral display unit.

Attention is now directed to method 924-*f* in FIG. 9E. Method 924-*f* is an optional process performed as part of block 924. That is, the steps in method 924-*f* primarily expand on the features regarding the second user interface of a second peripheral display unit, as explained above with reference to block 924.

At block 942, optionally, the second user interface comprises one or more user interface objects different from the first user interface. In some embodiments, the user interface objects have a different appearance and/or a different function. In some embodiments, the user interface objects on the second user interface correspond to applications that are unique to the manufacturer or provider of the second peripheral display unit. An example of the user interface objects on different peripheral interfaces being different is depicted by the comparison of user interface objects 663 on first peripheral interface 662 in FIG. 6V and user interface objects 668 in interface 684 in FIG. 6W.

At block 944, optionally, the second user interface comprises an arrangement of user interface objects different from the first user interface. An example of the user interface objects on different peripheral interfaces being in different arrangements is depicted by the comparison of user interface objects 663 on first peripheral interface 662 in FIG. 6V and user interface objects 668 in interface 684 in FIG. 6W.

At block 946, optionally, the second peripheral display unit has one or more of a screen size different from the first peripheral display unit, a screen orientation different from the first peripheral display unit, and a screen resolution different from the first peripheral display unit. An example of such differences is depicted by the comparison of device 610 having screen 618 in FIG. 6V and device 610-*b* having screen 618-*b* in FIG. 6W. The screen size, screen resolution, and screen orientation of display 618 and 618-*b* are all different.

At block 948, optionally, the configuration user interface comprises a second set of representations of one or more user interface objects available to be added to the second user interface, the second instructions comprise instructions for adding to the user interface a user interface object corresponding to one of the one or more representations of user interface objects from the second set, the second request to configure the second user interface comprises a second user input corresponding to a location of the one of the one or more representations of user interface objects from the second set, and the first set and the second set comprise representations of different user interface objects. In some embodiments, a new user interface object is added to the second peripheral interface in accordance with an input that drags a representation of a new object onto the representation of the second peripheral interface. In some embodiments, this process can optionally be carried out in all of the same manners as described above with reference to adding new user interface objects to the first user interface, as in block 918. However, in embodiments in which the reconfiguration interface displays different representations of different peripheral interfaces, the configuration interface can optionally also display a different set of representations of available new user interface icons. In some embodiments, each user interface available for configuration has a corresponding set of representations of available new user interface objects. The available user interface icons can optionally be unique to each peripheral user interface in accordance with different user interface objects made available, in some embodiments, by developers or manufacturers associated with specific peripheral display units. For example, the manufacturers of different cars having built-in peripheral display units can optionally make available different applications that are specifically available to that manufacturer's cars.

It should be understood that the particular order in which the operations in FIGS. 9A-9E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800) are also applicable in an analogous manner to 900 described above with respect to FIGS. 9A-9E. For example, the devices, peripheral display units, relationships, connections, and user interfaces described above with reference to 900 optionally have one or more of the characteristics of the devices, peripheral display units, relationships, connections, and user interfaces described herein with reference to other methods described herein (e.g., methods 700, 800).

In accordance with some embodiments. FIG. 10 shows a functional block diagram of an electronic device 1000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 10 are, optionally, combined or separated into sub-blocks to implement the principles of the various described embodiments. Therefore, the description herein optionally supports any possible combination or separation or further definition of the functional blocks described herein.

As shown in FIG. 10, electronic device 1000 includes display unit 1002 configured to display a user interface, input interface unit 1004 configured to receive input, wireless communication unit 1006 configured to send and/or receive data over a wireless data connection, wireless communication unit 1008 configured to send and/or receive data over a wireless data connection, wired communication unit 1010 configured to send and/or receive data over a wired data connection, and processing unit 1014 coupled to said units. In some embodiments, processing unit 1014 includes receiving unit 1016, establishing unit 1018, detecting unit 1020, receiving enabling unit 1022, displaying enabling unit 1024, providing enabling unit 1026, transferring enabling unit 1028, communicating enabling unit 1030, storing unit 1032, and activating unit 1034.

Processing unit 1014 is configured to receive (e.g., with the receiving unit 1016) a request from a user to authorize a relationship that corresponds to a connection between the device and the peripheral display unit over a first data connection with the peripheral display unit. Processing unit 1014 is further configured to, in response to receiving the request to authorize a relationship, establish (e.g., with the establishing unit 1018) a relationship with the peripheral display unit, wherein establishing the relationship includes enabling receiving (e.g., with the enabling receiving unit 1020) authentication information from the peripheral display unit via a second data connection that is different from the first data connection. Processing unit 1014 is further configured to, while a connection between the device and the peripheral display unit over the first data connection is not active, detect (e.g., with the detecting unit 1020) that the peripheral display unit is available for establishment of a connection, and, in response to detecting that the peripheral display unit is available for establishment of a connection, establish (e.g. with the establishing unit 1018) a connection between the device and the peripheral display unit, wherein the connection is a connection over the first data connection, and wherein establishing the connection between the device and the peripheral display unit comprises enabling providing (e.g., with the providing enabling unit) the authentication information to the peripheral display unit to establish the connection.

In some embodiments, the second data connection is a wired data connection.

In some embodiments, processing unit 1014 is further configured to, while a relationship has not been established with the peripheral display unit, enable receiving (e.g., via receiving enabling unit 1020) a communication from the peripheral display unit over the wired data connection between the device and the peripheral display unit. In some embodiments, processing unit 1014 is further configured to, in response to receiving the communication, enable displaying (e.g., with displaying enabling unit 1022) a first user interface prompting the user to authorize a relationship with the peripheral display unit.

In some embodiments, displaying (e.g., via display unit 1002) the first user interface prompting the user to authorize a relationship comprises displaying a first option corresponding to authorizing a wireless relationship between the device and the peripheral display unit, a second option corresponding to authorizing a wired relationship between the device and the peripheral display unit, and a third option corresponding to authorizing a charging-only connection between the device and the peripheral display unit.

In some embodiments, the request from the user to establish (e.g., via establishing unit 1018) a relationship with the peripheral display unit comprises selection of the first option.

In some embodiments, the authentication information comprises credentials for a wireless data connection distinct from the first data connection.

In some embodiments, the second data connection is a wireless data connection.

In some embodiments, processing unit 1014 is further configured to, while a relationship has not been established (e.g., via establishing unit 1018) with the peripheral display unit: detect (e.g., with detecting unit 1020), via one or more of the first and second data connections, that the peripheral display unit is available for the establishment of a relationship. In some embodiments, processing unit 1014 is further configured to, in response to detecting (e.g., via detecting unit 1020) that the peripheral display unit is available for the establishment of a relationship, enable displaying (e.g., via displaying enabling unit 1022) a fourth option for authorizing a relationship with the peripheral display unit, wherein the request from a user to establish a relationship comprises selection of the fourth option.

In some embodiments, processing unit 1014 is further configured to detect (e.g., with detecting unit 1020) selection of the fourth option. In some embodiments, processing unit 1014 is further configured to enable displaying (e.g., with displaying enabling unit 1022) a second user interface prompting the user to authorize a relationship with the peripheral display unit, wherein the second user interface comprises: a fifth option corresponding to authorizing a wireless relationship between the device and the peripheral display unit, and a sixth option corresponding to authorizing a wired relationship between the device and the peripheral display unit.

In some embodiments, the request from the user to establish (e.g., with establishing unit 1018) a relationship with the peripheral display unit comprises selection of the fifth option.

In some embodiments, the fourth option for authorizing a relationship is an item in a list of Bluetooth-capable devices.

In some embodiments, the fourth option for authorizing a relationship is an item in a list of vehicles with peripheral display units.

In some embodiments, establishing (e.g., with establishing unit 1018) a relationship with the peripheral display unit includes enabling displaying (e.g., with displaying enabling unit 1022) on the display of the device a third user interface prompting the user to enter credentials for the wireless data connection.

In some embodiments, establishing (e.g., with establishing unit 1018) a relationship comprises enabling displaying (e.g., with displaying enabling unit 1022) a fourth user interface providing the user with an option to establish a relationship with the peripheral display unit without syncing device contacts with the peripheral display unit.

In some embodiments, processing unit 1014 is further configured to, while a connection between the device and the peripheral display unit over the first data connection is active, enable transferring with transferring enabling unit 1026) content over the first data connection.

In some embodiments, detecting (e.g., with detecting unit 1020) that the peripheral display unit is available for establishment of a connection occurs while the device is in a locked state.

In some embodiments, establishing (e.g., with establishing unit 1018) a connection between the device and the peripheral display unit occurs while the device remains in a locked state.

In some embodiments, establishing (e.g., with establishing unit 1018) the connection between the device and the peripheral display unit further comprises: enabling communicating (e.g., with communicating enabling unit 1028) with the peripheral display unit via a wireless data connection distinct from the first data connection, wherein a message communicated over the wireless data connection comprises an explicit instruction to establish a connection via the first data connection.

In some embodiments, the instruction to establish (e.g., with establishing unit 1018) a connection via the first data connection is transferred from the peripheral display unit to the device.

In some embodiments, establishing (e.g., with establishing unit 1018) a relationship with the peripheral display unit comprises storing (e.g., with storing unit 1030) an indication of whether to establish a wireless connection, a wired connection, or a charge-only connection.

In some embodiments, the peripheral display unit has a discoverable state and a non-discoverable state, and the peripheral display unit comprises a hardware button configured to cause the peripheral display unit to enter the discoverable state.

In some embodiments, processing unit 1014 is further configured to the hardware button is further configured to activate a native function of the peripheral display unit unrelated to making the unit discoverable.

In some embodiments, the hardware button is further configured to activate (e.g., with activating unit 1032) a function of the device distinct from the native function of the peripheral display and unrelated to making the peripheral display unit discoverable.

In some embodiments, a short press of the hardware button activates a native voice recognition function of the peripheral display unit, and a long press of the hardware button causes the peripheral display unit to enter the discoverable state.

In some embodiments, processing unit 1014 is further configured to, while a connection between the device and the peripheral display unit over the first data connection is active, detect (e.g., with detecting unit 1020) a long press of the hardware button. In some embodiments, processing unit 1014 is further configured to, in response to detecting the long press of the hardware button, activate (e.g., with activating unit 1032) the function of the device.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, electronic device 1100 includes display unit 1102 configured to display a user interface, input interface unit 1104 configured to receive input, wireless communication unit 1106 configured to send and/or receive data over a wireless data connection, wireless communication unit 1108 configured to send and/or receive data over a wireless data connection, wired communication unit 1110 configured to send and/or receive data over a wired data connection, and processing unit 1114 coupled to said units. In some embodiments, processing unit 1114 includes monitoring unit 1116, providing enabling unit 1118, determining unit 1120, detecting unit 1122, and deactivating unit 1124.

Processing unit 1114 is configured to monitor (e.g. with monitoring unit 1116) battery usage of the device, wherein monitoring (e.g., with monitoring unit 1116) battery usage of the device includes monitoring (e.g., with monitoring unit 1116) a charge level of one or more batteries of the device and monitoring (e.g., with monitoring unit 1116) battery usage patterns of the one or more batteries of the device. Processing unit 1114 is further configured to, while monitoring (e.g., with monitoring unit 1116) battery usage of the device, in accordance with a determination that a charge level of the device meets charge-level notification criteria, enable providing (e.g. with providing enabling unit 1118) a charge-level alert that indicates a current charge level of the one or more batteries; and, in accordance with a determination that battery usage of the device meets battery-usage notification criteria different from the charge-level notification criteria, enable providing (e.g., with providing enabling unit 1118) a battery-usage alert that indicates a current battery usage pattern.

In some embodiments, the battery usage patterns being monitored include one or more of: battery amount used since activating a first mode of operation, rate of battery usage since activating a first mode of operation, battery amount used since a past contextual event, rate of battery usage since a past contextual event, predicted time of the battery reaching a predetermined threshold level, and predicted battery level by the time of a future contextual event.

In some embodiments, the first mode of operation comprises a high-power mode of operation.

In some embodiments, the first mode of operation comprises a wireless connection between the device and a peripheral display unit.

In some embodiments, one or more of the charge-level alert and the battery-usage alert are provided (e.g., by providing enabling unit 1118) through the peripheral display unit.

In some embodiments, one or more of the charge-level alert and the battery-usage alert are provided (e.g., by providing enabling unit 1118) through the peripheral display unit only when the device is not being charged.

In some embodiments, the battery-usage notification criteria comprise a criterion that is met when a charge level of the one or more batteries of the device will be below a predefined charge level at a predicted end time of usage of a first mode of operation.

In some embodiments, the battery-usage notification criteria comprise a criterion that is met when a charge level of the one or more batteries of the device will be below a predefined charge level at time of a predefined future event.

In some embodiments, processing unit 1117 is further configured to, determine (e.g., with determining unit 1120) a destination for the device, wherein the battery-usage notification criteria comprise a criterion that is met when a charge level of the one or more batteries of the device will be below a predefined charge level at a predicted time at which the device will arrive at the destination.

In some embodiments, the destination is a destination explicitly identified by the user.

In some embodiments, the destination is a destination predicted based on user behavior.

In some embodiments, the processing 1114 unit is further configured to, in accordance with providing one or more of the charge-level alert and the battery-usage alert, enable providing (e.g., with providing enabling unit 1120) an option to deactivate a first mode of operation. In some embodiments, the processing 1114 unit is further configured to detect (e.g., with detecting unit 1122) selection of the option, and, in accordance with detecting (e.g., with detecting unit 1122) selection of the option, deactivate (e.g., with deactivating unit 1124) the first mode of operation.

In some embodiments, the processing 1114 unit is further configured to, in accordance with a determination that a charge level of the device meets charge-level notification criteria, automatically deactivate (e.g., with deactivating unit 1124) a first mode of operation.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, electronic device 1200 includes display unit 1202 configured to display a user interface, input interface unit 1204 configured to receive input, wireless communication unit 1206 configured to send and/or receive data over a wireless data connection with a peripheral display unit, wireless communication unit 1208 configured to send and/or receive data over a wireless data connection with a peripheral display unit, wired communication unit 1210 configured to send and/or receive data over a wired data connection with a peripheral display unit, and a processing unit 1214 coupled to said units. In some embodiments, the processing unit 1214 includes display enabling unit 1216, detecting unit 1218, transmitting enabling unit 1220, establishing unit 1222, and storing unit 1224.

Processing unit 1214 is configured to enable displaying (e.g., with display enabling unit 1216) on the display unit of the device a configuration interface, wherein the configuration interface comprises a representation of a user interface of a peripheral display unit. Processing unit 1214 is further configured to enable detecting (e.g., with detecting unit 1218) a request to configure the user interface of the peripheral display unit. Processing unit 1214 is further configured to enable, in response to detecting (e.g. with detecting unit 1218) the request to configure the user interface, enable displaying (e.g., with display enabling unit 1216) on the display unit of the device an updated representation of the user interface, wherein the updated representation is generated in accordance with the detected request. Processing unit 1214 is configured to enable, after detecting (e.g., with detecting unit 1218) the request to configure the user interface of the peripheral display unit, transmitting (e.g., with transmitting enabling unit 1220) instructions to the peripheral display unit to display the user interface generated in accordance with the detected request.

In some embodiments, processing unit 1214 is further configured to, before enabling displaying (e.g., with display enabling unit 1216) the configuration interface, establish (e.g., with establishing unit 122) a relationship between the device and the peripheral display unit.

In some embodiments, displaying on the display unit of the device an updated representation of the user interface occurs while a data connection corresponding to a relationship between the device and the peripheral display unit is not active, and transmitting instructions to the peripheral display unit occurs when the data connection corresponding to the relationship between the device and the peripheral display unit is established (e.g., with establishing unit 1222).

In some embodiments, processing unit 1214 is further configured to store (e.g., with storing unit 1224) the instructions in a memory of the device at least until the data connection corresponding to the relationship between the device and the peripheral display is established (e.g., with establishing unit 1222).

In some embodiments, the configuration user interface comprises a set of one or more representations of user interface objects available to be added to the user interface of the peripheral display unit, the instructions comprise instructions for adding to the user interface a user interface object corresponding to one of the one or more representations of user interface objects, and the request to configure the user interface comprises user input corresponding to a location of one of the one or more representations of user interface objects available to be added to the user interface.

In some embodiments, the instructions comprise instructions for removing a user interface object from the user interface.

In some embodiments, the instructions comprise instructions for repositioning of a user interface object on the user interface.

In some embodiments, the configuration interface further comprises a representation of a second user interface of a second peripheral display unit, and the processing unit is further configured to: detect (e.g., with detecting unit 1218) a second request to configure the second user interface; in response to detecting (e.g., with detecting unit 1218) the second request to configure the second user interface, enable displaying (e.g., with display enabling unit 1216) on the display unit of the device a second updated representation of the second user interface, wherein the second updated representation is generated in accordance with the second detected request; and, after detecting (e.g., with detecting unit 1218) the second request to configure the second user interface, enable transmitting (e.g., with transmitting enabling unit 1220) instructions to the second peripheral display unit to display the second user interface in accordance with the detected request.

In some embodiments, displaying on the display of the device the second updated representation of the second user interface occurs while a data connection corresponding to the relationship between the device and the second peripheral display unit is not active, and transmitting second instructions to the second peripheral display unit occurs when the data connection corresponding to the relationship between the device and the second peripheral display unit is established (e.g., with establishing unit 1222).

In some embodiments, processing unit 1214 is further configured to store (e.g., with storing unit 1224) the second instructions in a memory of the device at least until the data connection corresponding to the relationship between the device and the second peripheral display unit is established (e.g., with establishing unit 1222).

In some embodiments, the first instruction and the second instruction are simultaneously stored (e.g., with storing unit 1224)) at the device.

In some embodiments, the second user interface comprises one or more user interface objects different from the first user interface.

In some embodiments, the second user interface comprises an arrangement of user interface objects different from the first user interface.

In some embodiments, the second peripheral display unit has one or more of a screen size different from the first peripheral display unit, a screen orientation different from the first peripheral display unit, and a screen resolution different from the first peripheral display unit.

In some embodiments, the configuration user interface comprises a second set of representations of one or more user interface objects available to be added to the second user interface, the second instructions comprise instructions for adding to the user interface a user interface object corresponding to one of the one or more representations of user interface objects from the second set, the second request to configure the second user interface comprises second user input corresponding to a location of the one of the one or more representations of user interface objects from the second set, and the first set and the second set comprise representations of different user interface objects.

The units of FIGS. 10-12 can optionally be used to implement the various techniques and methods described above. The units of devices 1000, 1100, and 1200 are, optionally, implemented by hardware, software, or a combination of hardware and software to carry out the principles of the various described examples. It is understood by persons of skill in the art that the functional blocks described in FIGS. 10-12 are, optionally, combined or separated into sub-blocks to implement the principles of the various described examples. For example, units 1002-1010, 1102-1110, and 1202-1210 can have associated "controller" units that are operatively coupled with the respective unit and processing unit to enable operation. These controller units are not separately illustrated in FIGS. 10-12 but are understood to be within the grasp of one of ordinary skill in the art who is designing a device having units such as those in devices 1000, 1100, or 1200. The description herein thus optionally supports combination, separation, and/or further definition of the functional blocks described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

The operations in the information processing methods described above are, optionally, implemented by running one or more functional modules in information processing apparatus such as general purpose processors (e.g., as described above with respect to FIGS. 1A and 3) or application-specific chips.

The operations described above with reference to FIGS. 7A-7H, 8A-8D, and 9A-9D are, optionally, implemented by components depicted in FIGS. 1A-1B or FIG. 10, 11, or 12. For example, receiving operation 702, establishing operation 704, detecting operation 708, establishing operation 710, receiving operation 716, displaying operation 718, displaying operation 720, displaying operation 722, displaying operation 724, detecting operation 734, displaying operation 736, detecting operation 744, displaying operation 746, transferring operation 768, detecting operation 780, activating operation 782, monitoring operation 802, providing operation 808, providing operation 810, determining operation 824, providing operation 830, detecting operation 832, deactivating operation 834, deactivating operation 836, establishing operation 902, displaying operation 904, detecting operation 906, displaying operation 908, transmitting operation 912, storing operation 916, detecting operation 926, displaying operation 928, transmitting operation 934, and/or storing operation 938 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An electronic device, comprising:
   a display device;
   one or more processors;
   a memory; and
   one or more programs, wherein the one or more programs are stored in the memory and configured to be executed by the one or more processors, the one or more programs including instructions for:
   displaying, via the display device, a configuration interface, wherein the configuration interface comprises representations of a plurality of applications that are to be included in a generated user interface for display on a peripheral display unit, wherein the configuration interface includes:
   a first portion that includes a first representation of a first application that is included in a first set of representations of applications and an affordance for removing the first representation of the first application from the first set of representations of applications; and
   a second portion that includes a second set of representations of applications:
   detecting a request to configure the user interface of the peripheral display unit that includes detecting an input that corresponds to selection of the affordance, and
   in response to detecting the request to configure the user interface that includes detecting the input that corresponds to selection of the affordance:
   displaying, via the display device, an updated configuration interface, that includes ceasing to display the first representation of the first application in the first set of representations of applications and displaying the first representation of the first application in the second set of representations of applications; and
   generating, at the electronic device a peripheral user interface for the peripheral display unit in accordance with the detected request, wherein the first representation of the first application is not included in the generated peripheral user interface; and,
   after detecting the request to configure the user interface of the peripheral display unit, transmitting first instructions to the peripheral display unit to display the generated peripheral user interface.

2. The electronic device of claim 1, wherein the one or more programs include instructions for:
   before displaying the configuration interface, establishing a relationship between the electronic device and the peripheral display unit.

3. The electronic device of claim 1, wherein:
   displaying, via the display device, the updated configuration interface occurs while a data connection corresponding to a relationship between the electronic device and the peripheral display unit is not active, and
   transmitting the first instructions to the peripheral display unit occurs when the data connection corresponding to the relationship between the electronic device and the peripheral display unit is established.

4. The electronic device of claim 3, wherein the one or more programs include instructions for:
   storing the first instructions in a memory of the electronic device at least until the data connection corresponding to the relationship between the electronic device and the peripheral display is established.

5. The electronic device of claim 1, wherein:
   the configuration interface comprises a first set of representations of applications that are available to be added to the user interface;
   the first instructions comprise instructions for adding, to the user interface, a representation of an application corresponding to at least one representation of the first set of representations of applications that are available to be added to the user interface; and
   the request to configure the user interface of the peripheral display unit comprises user input corresponding to a location of the representation of the application corresponding to the at least one representation of the first set of representations of applications that are available to be added to the user interface.

6. The electronic device of claim 1, wherein the first instructions comprise instructions for repositioning one or more representations of applications on the user interface.

7. The electronic device of claim 1, wherein the configuration interface further comprises a second configuration interface of a second user interface of a second peripheral display unit, and wherein the one or more programs include instructions for:
   detecting a second request to configure the second user interface;
   in response to detecting the second request, displaying, via the display device, a second updated configuration interface, wherein the second updated configuration interface is generated in accordance with the second detected request; and
   after detecting the second request to configure the second user interface, transmitting second instructions to the second peripheral display unit to display the second user interface in accordance with the second detected request.

8. The electronic device of claim 7, wherein:
   displaying, via the display device, the second updated configuration interface occurs while a data connection corresponding to the relationship between the electronic device and the second peripheral display unit is not active, and
   transmitting the second instructions to the second peripheral display unit occurs when the data connection corresponding to the relationship between the electronic device and the second peripheral display unit is established.

9. The electronic device of claim 8, wherein the one or more programs include instructions for:

storing the second instructions in a memory of the electronic device at least until the data connection corresponding to the relationship between the electronic device and the second peripheral display unit is established.

10. The electronic device of claim 9, wherein the first instructions and the second instructions are simultaneously stored at the electronic device.

11. The electronic device of claim 7, wherein the second user interface comprises one or more representations of applications different from the user interface, an arrangement of the representations of applications different from the user interface, or any combination thereof.

12. The electronic device of claim 7, wherein the second peripheral display unit has one or more of a screen size different from the first peripheral display unit, a screen orientation different from the first peripheral display unit, and a screen resolution different from the first peripheral display unit.

13. The electronic device of claim 7, wherein:
the second configuration interface comprises a second set of representations of applications that are available to be added to the second user interface,
the second instructions comprise instructions for adding, to the second, user interface, a representation of an application corresponding to at least one representation from the second set of representations of applications,
the second request to configure the second user interface comprises a second user input corresponding to a location of the representation of the application corresponding to at least one representation from the second set of representations of applications that are available to be added to the second user interface, and
the first set of representations of applications that are available to be added to the user interface and the second set of representations of application that are available to be added to the second user interface comprise representations of different applications.

14. A non-transitory computer-readable storage medium storing one or more programs configured to be executed by one or more processors of an electronic device with a display and a touch-sensitive surface, the one or more programs including instructions for:
displaying, via the display device, a configuration interface, wherein the configuration interface comprises representations of a plurality of applications that are to be included in a generated user interface for display on a peripheral display unit, wherein the configuration interface includes:
a first portion that includes a first representation of a first application that is included in a first set of representations of applications and an affordance for removing the first representation of the first application from the first set of representations of applications; and
a second portion that includes a second set of representations of applications:
detecting a request to configure the user interface of the peripheral display unit that includes detecting an input that corresponds to selection of the affordance; and
in response to detecting the request to configure the user interface that includes detecting the input that corresponds to selection of the affordance:
display, via the display device, an updating configuration interface, that includes ceasing to display the first representation of the first application in the first set of representations of applications and displaying the first representation of the first application in the second set of representations of applications; and
generating, at the electronic device, a peripheral user interface for the peripheral display unit in accordance with the detected request, wherein the first representation of the first application is not included in the generated peripheral user interface; and
after detecting the request to configure the user interface of the peripheral display unit, transmitting first instructions to the peripheral display unit to display the generated peripheral user interface.

15. The non-transitory computer-readable storage medium of claim 14, wherein the one or more programs include instructions for:
before displaying the configuration interface, establishing a relationship between the electronic device and the peripheral display unit.

16. The non-transitory computer-readable storage medium of claim 14, wherein:
displaying, via the display device, the updated configuration interface occurs while a data connection corresponding to a relationship between the electronic device and the peripheral display unit is not active, and
transmitting the first instructions to the peripheral display unit occurs when the data connection corresponding to the relationship between the electronic device and the peripheral display unit is established.

17. The non-transitory computer-readable storage medium of claim 16, wherein the one or more programs include instructions for:
storing the first instructions in a memory of the electronic device at least until the data connection corresponding to the relationship between the electronic device and the peripheral display is established.

18. The non-transitory computer-readable storage medium of claim 14, wherein:
the configuration interface comprises a first set of representations of applications that are available to be added to the user interface;
the first instructions comprise instructions for adding, to the user interface, a representation of an application corresponding to at least one representation of the first set of representations of applications that are available to be added to the user interface; and
the request to configure the user interface of the peripheral display unit comprises user input corresponding to a location of the representation of the application corresponding to the at least one representation of the first set of representations of applications that are available to be added to the user interface.

19. The non-transitory computer-readable storage medium of claim 14, wherein the first instructions comprise instructions for repositioning one or more representations of applications on the user interface.

20. The non-transitory computer-readable storage medium of claim 14, wherein the configuration interface further comprises a second configuration interface of a second user interface of a second peripheral display unit, and wherein the one or more programs include instructions for:
detecting a second request to configure the second user interface;
in response to detecting the second request, displaying, via the display device, a second updated configuration interface, wherein the second updated configuration interface is generated in accordance with the second detected request; and after detecting the second request to configure the second user interface, transmitting second instructions to the second peripheral display unit to display the second user interface in accordance with the second detected request.

21. The non-transitory computer-readable storage medium of claim 20, wherein:
displaying, via the display device, the second updated configuration interface occurs while a data connection corresponding to the relationship between the electronic device and the second peripheral display unit is not active, and
transmitting the second instructions to the second peripheral display unit occurs when the data connection corresponding to the relationship between the electronic device and the second peripheral display unit is established.

22. The non-transitory computer-readable storage medium of claim 21, wherein the one or more programs include instructions for:
storing the second instructions in a memory of the electronic device at least until the data connection corresponding to the relationship between the electronic device and the second peripheral display unit is established.

23. The non-transitory computer-readable storage medium of claim 22, wherein the first instructions and the second instructions are simultaneously stored at the electronic device.

24. The non-transitory computer-readable storage medium of claim 20, wherein the second user interface comprises one or more representations of applications different from the user interface, an arrangement of the representations of applications different from the user interface, or any combination thereof.

25. The non-transitory computer-readable storage medium of claim 20, wherein the second peripheral display unit has one or more of a screen size different from the first peripheral display unit, a screen orientation different from the first peripheral display unit, and a screen resolution different from the first peripheral display unit.

26. The non-transitory computer-readable storage medium of claim 20, wherein:
the second configuration interface comprises a second set of representations of applications that are available to be added to the second user interface,
the second instructions comprise instructions for adding, to the second user interface, a representation of an application corresponding to at least one representation from the second set of representations of applications,
the second request to configure the second user interface comprises a second user input corresponding to a location of the representation of the application corresponding to at least one representation from the second set of representations of applications that are available to be added to the second user interface, and
the first set of representations of applications that are available to be added to the user interface and the second set of representations of applications that are available to be added to the second user interface comprise representations of different applications.

27. A method, comprising:
at an electronic device with a display device:
displaying, via the display device, a configuration interface, wherein the configuration interface comprises representations of a plurality of applications that are to be included in a generated user interface for display on a peripheral display unit, wherein the configuration interface includes:
a first portion that includes a first representation of a first application that is included in a first set of representations of applications and an affordance for removing the first representation of the first application from the first set of representations of applications; and
a second portion that includes a second set of representations of applications;
detecting a request to configure the user interface of the peripheral display unit that includes detecting an input that corresponds to selection of the affordance; and
in response to detecting the request to configure the user interface that includes detecting the input that corresponds to selection of the affordance:
displaying, via the display device, an updated configuration interface, that includes ceasing to display the first representation of the first application in the first set of representations of applications and displaying the first representation of the first application in the second set of representations of applications; and
generating, at the electronic device, a peripheral user interface for the peripheral display unit in accordance with the detected request, wherein the first representation of the first application is not included in the generated peripheral user interface; and
after detecting the request to configure the user interface of the peripheral display unit, transmitting first instructions to the peripheral display unit to display the generated peripheral user interface.

28. The method of claim 27, wherein the one or more programs include instructions for:
before displaying the configuration interface, establishing a relationship between the electronic device and the peripheral display unit.

29. The method of claim 27, wherein:
displaying, via the display device, the updated configuration interface occurs while a data connection corresponding to a relationship between the electronic device and the peripheral display unit is not active, and
transmitting the first instructions to the peripheral display unit occurs when the data connection corresponding to the relationship between the electronic device and the peripheral display unit is established.

30. The method of claim 29, wherein the one or more programs include instructions for:
storing the first instructions in a memory of the electronic device at least until the data connection corresponding to the relationship between the electronic device and the peripheral display is established.

31. The method of claim 27, wherein:
the configuration interface comprises a first set of representations of applications that are available to be added to the user interface;
the first instructions comprise instructions for adding, to the user interface, a representation of an application corresponding to at least one representation of the first set of representations of applications that are available to be added to the user interface; and
the request to configure the user interface of the peripheral display unit comprises user input corresponding to a location of the representation of the application corresponding to the at least one representation of the first set of representations of applications available to be added to the user interface.

32. The method of claim 27, wherein the first instructions comprise instructions for repositioning one or more representations of applications on the user interface.

33. The method of claim 27, wherein the configuration interface further comprises a second configuration interface of a second user interface of a second peripheral display unit, and wherein the one or more programs include instructions for:
   detecting a second request to configure the second user interface;
   in response to detecting the second request, displaying, via the display device, a second updated configuration interface, wherein the second updated configuration interface is generated in accordance with the second detected request; and
   after detecting the second request to configure the second user interface, transmitting second instructions to the second peripheral display unit to display the second user interface in accordance with the second detected request.

34. The method of claim 33, wherein:
   displaying, via the display device, the second updated configuration interface occurs while a data connection corresponding to the relationship between the electronic device and the second peripheral display unit is not active, and
   transmitting the second instructions to the second peripheral display unit occurs when the data connection corresponding to the relationship between the electronic device and the second peripheral display unit is established.

35. The method of claim 34, wherein the one or more programs include instructions for:
   storing the second instructions in a memory of the electronic device at least until the data connection corresponding to the relationship between the electronic device and the second peripheral display unit is established.

36. The method of claim 35, wherein the first instructions and the second instructions are simultaneously stored at the electronic device.

37. The method of claim 33, wherein the second user interface comprises one or more representations of applications different from the user interface, an arrangement of the representations of applications different from the user interface, or any combination thereof.

38. The method of claim 33, wherein the second peripheral display unit has one or more of a screen size different from the first peripheral display unit, a screen orientation different from the first peripheral display unit, and a screen resolution different from the first peripheral display unit.

39. The method of claim 33, wherein:
   the second configuration interface comprises a second set of representations of applications that are available to be added to the second user interface,
   the second instructions comprise instructions for adding, to the user interface, a representation of an application corresponding to at least one representation from the second set of representations of applications,
   the second request to configure the second user interface comprises a second user input corresponding to a location of the representation of the application corresponding to at least one representation from the second set of representations of applications that are available to be added to the second user interface, and
   the first set and the second set of representations of applications comprise representations of different applications.

* * * * *

UNITED STATES PATENT AND TRADEMARK OFFICE
CERTIFICATE OF CORRECTION

PATENT NO. : 11,019,193 B2
APPLICATION NO. : 16/407590
DATED : May 25, 2021
INVENTOR(S) : Richard R. Dellinger et al.

It is certified that error appears in the above-identified patent and that said Letters Patent is hereby corrected as shown below:

In the Claims

In Column 77, Line 41, Claim 1, delete "applications:" and insert -- applications; --, therefor.

In Column 77, Line 44, Claim 1, delete "affordance," and insert -- affordance; --, therefor.

In Column 77, Line 56, Claim 1, delete "device" and insert -- device, --, therefor.

In Column 77, Line 61, Claim 1, delete "and," and insert -- and --, therefor.

In Column 79, Line 25, Claim 13, delete "second," and insert -- second --, therefor.

In Column 79, Line 57, Claim 14, delete "applications:" and insert -- applications; --, therefor.

Signed and Sealed this
Fourteenth Day of June, 2022

Katherine Kelly Vidal
*Director of the United States Patent and Trademark Office*